(12) United States Patent  
Hayashi et al.

(10) Patent No.: US 8,468,376 B2
(45) Date of Patent: *Jun. 18, 2013

(54) INTEGRATED DEVICE, LAYOUT METHOD THEREOF, AND PROGRAM

(75) Inventors: Hiroshi Hayashi, Kanagawa (JP); Yasushi Fukuda, Kanagawa (JP); Kei Ito, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/398,503

(22) Filed: Feb. 16, 2012

(65) Prior Publication Data

US 2012/0151181 A1 Jun. 14, 2012

Related U.S. Application Data

(63) Continuation of application No. 12/283,057, filed on Sep. 9, 2008, now Pat. No. 8,140,874.

(30) Foreign Application Priority Data

Sep. 13, 2007 (JP) ................................. 2007-238516

(51) Int. Cl.  
*G06F 1/32* (2006.01)
(52) U.S. Cl.  
USPC .......................................................... 713/320
(58) Field of Classification Search  
USPC ................................................ 713/300–340  
See application file for complete search history.

(56) References Cited

U.S. PATENT DOCUMENTS

| 5,394,556 | A | * | 2/1995 | Oprescu ......................... 709/220 |
|5,440,749|A|*|8/1995|Moore et al. ................... 712/206|
|5,452,277|A| |9/1995|Bajorek et al.|
|5,564,015|A|*|10/1996|Bunnell ........................ 714/47.2|
|5,623,698|A| |4/1997|Stephenson et al.|
|5,687,382|A| |11/1997|Kojima et al.|
|6,529,406|B1| |3/2003|Namekawa|
|6,757,806|B2| |6/2004|Shim|
|6,879,528|B2|*|4/2005|Takeuchi et al. .............. 365/200|
|7,072,637|B2| |7/2006|Makela et al.|
|7,234,074|B2| |6/2007|Cohn et al.|
|7,301,843|B2|*|11/2007|Tsukude ........................ 365/222|
|7,359,963|B1|*|4/2008|Huang et al. ................... 709/223|
|7,418,553|B2|*|8/2008|Yoshimi ........................ 711/133|
|7,596,392|B2| |9/2009|Makela et al.|
|7,783,910|B2|*|8/2010|Felter et al. ................... 713/340|

(Continued)

FOREIGN PATENT DOCUMENTS

JP 62219130 A * 9/1987  
JP 10-116913 A 5/1998

(Continued)

OTHER PUBLICATIONS

Office Action for Japanese Application No. 2007-238516 issued Jun. 16, 2009.

*Primary Examiner* — Paul R Myers  
(74) *Attorney, Agent, or Firm* — Wolf, Greenfield & Sacks, P.C.

(57) ABSTRACT

An integrated device includes at least one data processing device and at least one memory macro accessible by the data processing device. The data processing device and the memory macro are laid out so that a memory address and a power consumption have a correlation.

17 Claims, 48 Drawing Sheets

| U.S. PATENT DOCUMENTS | | | | FOREIGN PATENT DOCUMENTS | | |
|---|---|---|---|---|---|---|
| 7,975,097 B2 | 7/2011 | Narayan et al. | | JP | 2001-085641 A | 3/2001 |
| 7,975,124 B2 * | 7/2011 | Justiss et al. | 711/173 | JP | 2003-524323 A | 8/2003 |
| 8,156,284 B2 * | 4/2012 | Vorbach et al. | 711/118 | JP | 3599197 | 9/2004 |
| 8,156,309 B2 * | 4/2012 | Steiss | 711/207 | JP | 2006-221432 A | 8/2006 |
| 2009/0077403 A1 | 3/2009 | Hayashi et al. | | | | |
| 2009/0164203 A1 * | 6/2009 | Norman | 703/24 | | | |

* cited by examiner

LAYOUT IMAGE

INTERCONNECTION LOAD MODEL

FIG. 6

EXAMPLE OF PARAMETER LIST

| PARAMETER LIST | | |
|---|---|---|
| PARAMETER | No | NUMBER OF ACCESSES |
| aaa | 1 | 5 |
|  | 2 | 10 |
| bbb | 1 | 0 |
|  | 2 | 2 |
| .. | ... | .. |

| PARAMETER LIST OF DATA PROCESSING DEVICE 1 | | |
|---|---|---|
| PARAMETER | No | NUMBER OF ACCESSES |
| aaa | 1 | 5 |
| bbb | 1 | 7 |
| ccc | 1 | 0 |
|  | 1 | 2 |
| .. | ... | .. |

FIG. 13

| PARAMETER LIST | | |
|---|---|---|
| PARAMETER | No | NUMBER OF ACCESSES |
| A[0] | 1 | 1 |
| ... | 1 | 1 |
| A[255] | 1 | 1 |
| B[0] | 1 | 10 |
| ... | 1 | 10 |
| B[255] | 1 | 10 |
| C[0] | 1 | 97 |
| ... | 1 | 97 |
| C[255] | 1 | 97 |

FIG. 17

| PARAMETER LIST | | |
|---|---|---|
| PARAMETER | No | NUMBER OF ACCESSES |
| A[0] | 1 | 200 |
| ... | 1 | 200 |
| A[255] | 1 | 200 |
| B[0] | 0 | 65 |
| ... | 0 | 65 |
| B[255] | 0 | 65 |
| C[0] | 0 | 5 |
| | 1 | 2 |
| C[1] | 0 | 5 |
| | 1 | 2 |
| ... | 0 | 5 |
| | 1 | 2 |
| C[255] | 0 | 5 |
| | 1 | 2 |

MEMORY MAP

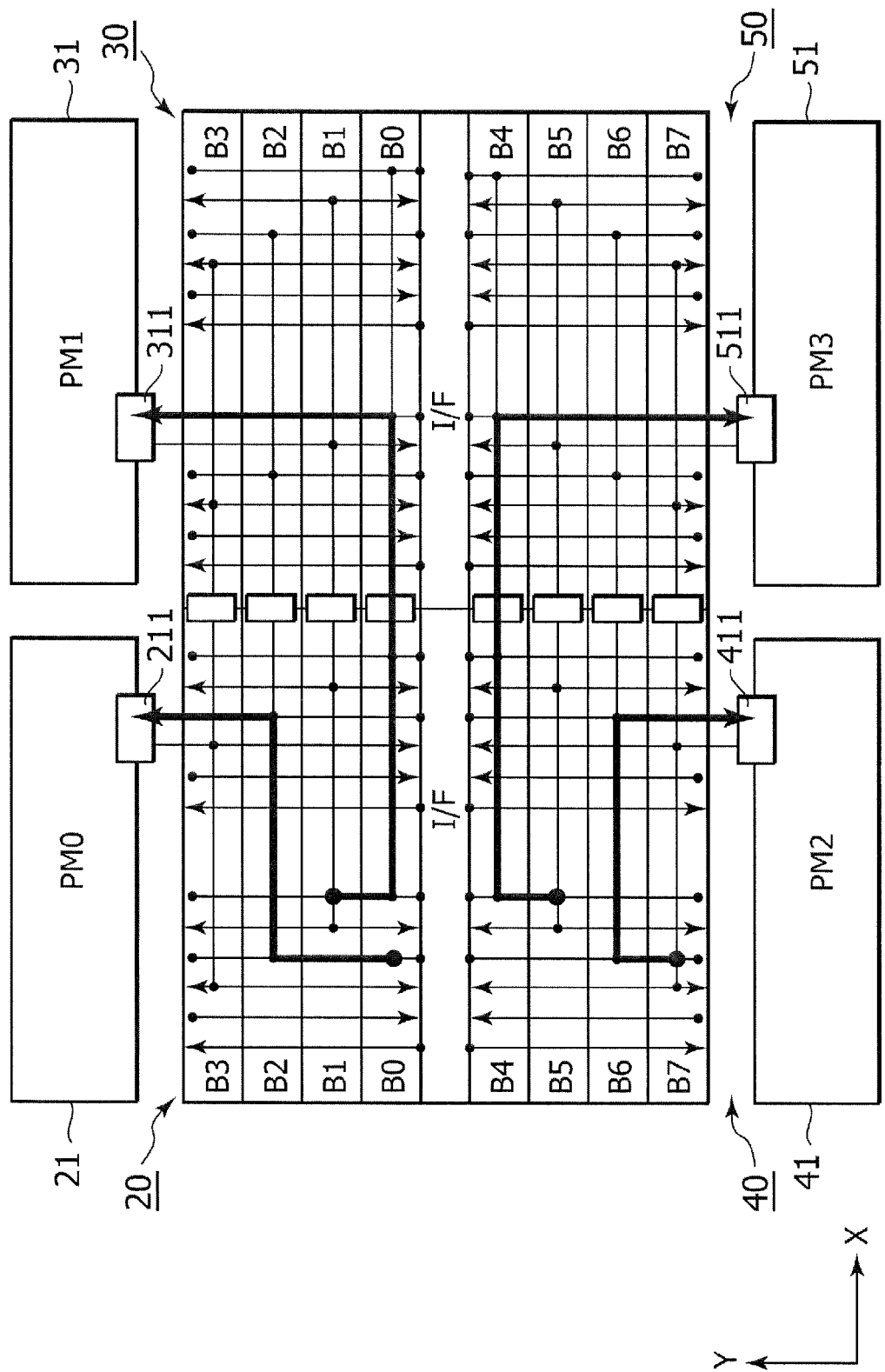

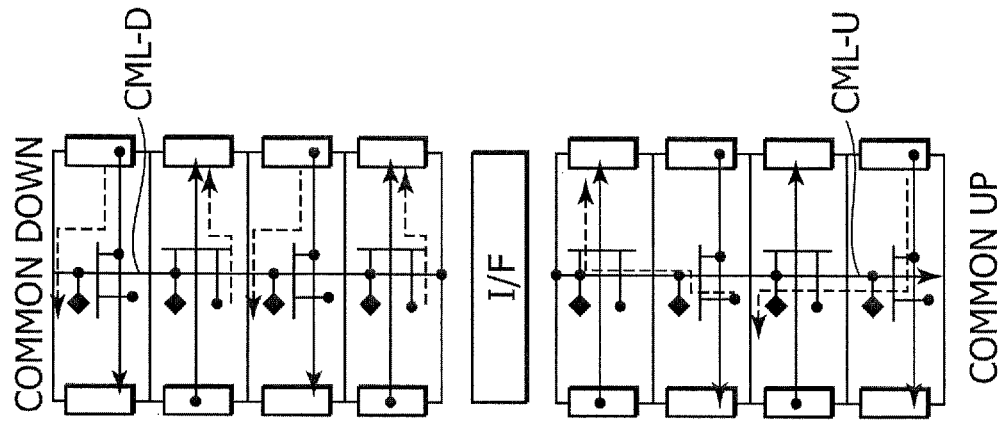
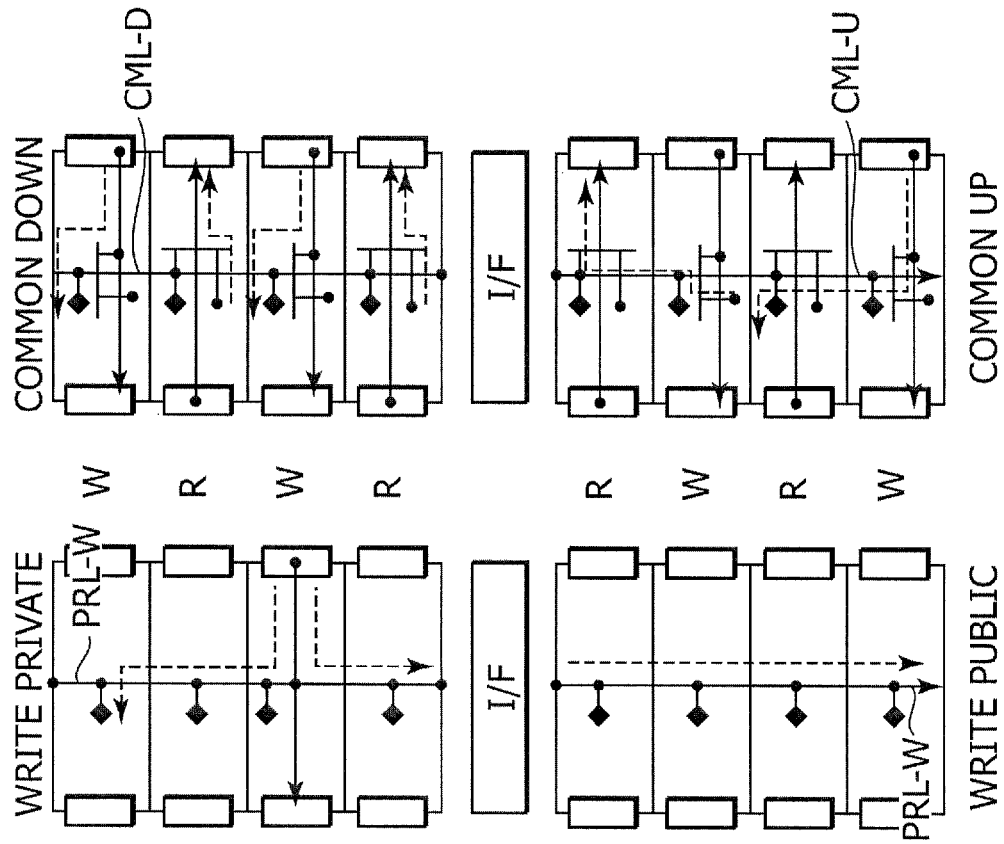
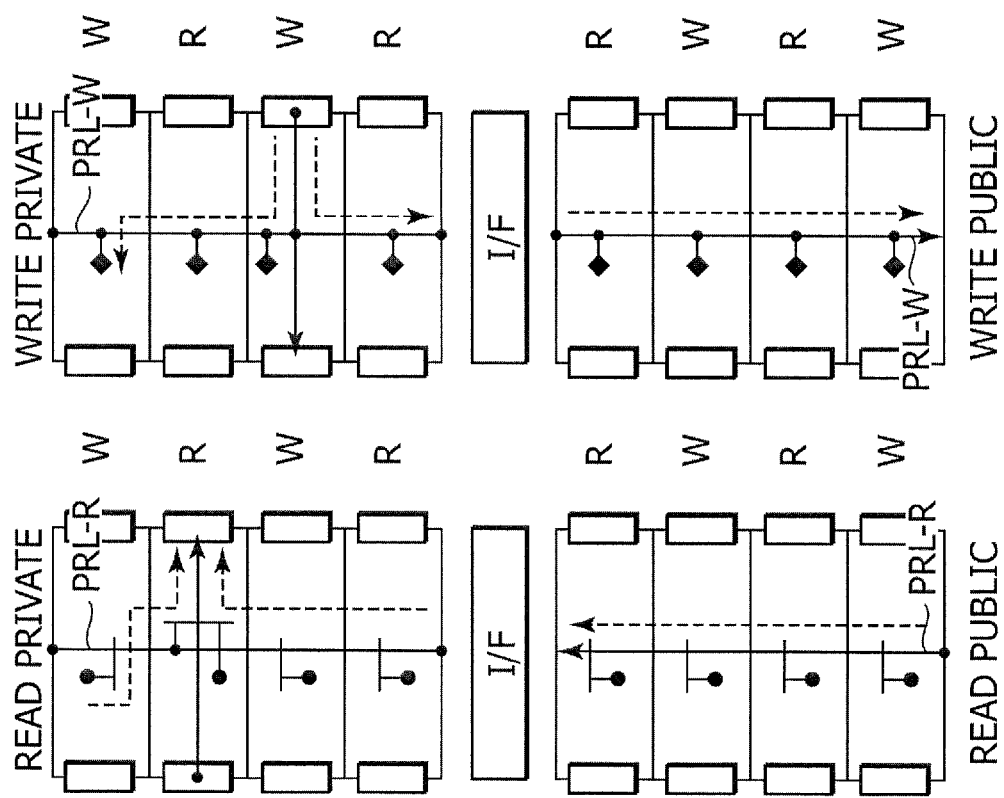

FIG. 29

| BNK 0 (4) |
| BNK 1 (5) |
| BNK 2 (6) |
| BNK 3 (7) |
| I/F |
| BNK 8 (C) |
| BNK 9 (D) |
| BNK A (E) |
| BNK B (F) |

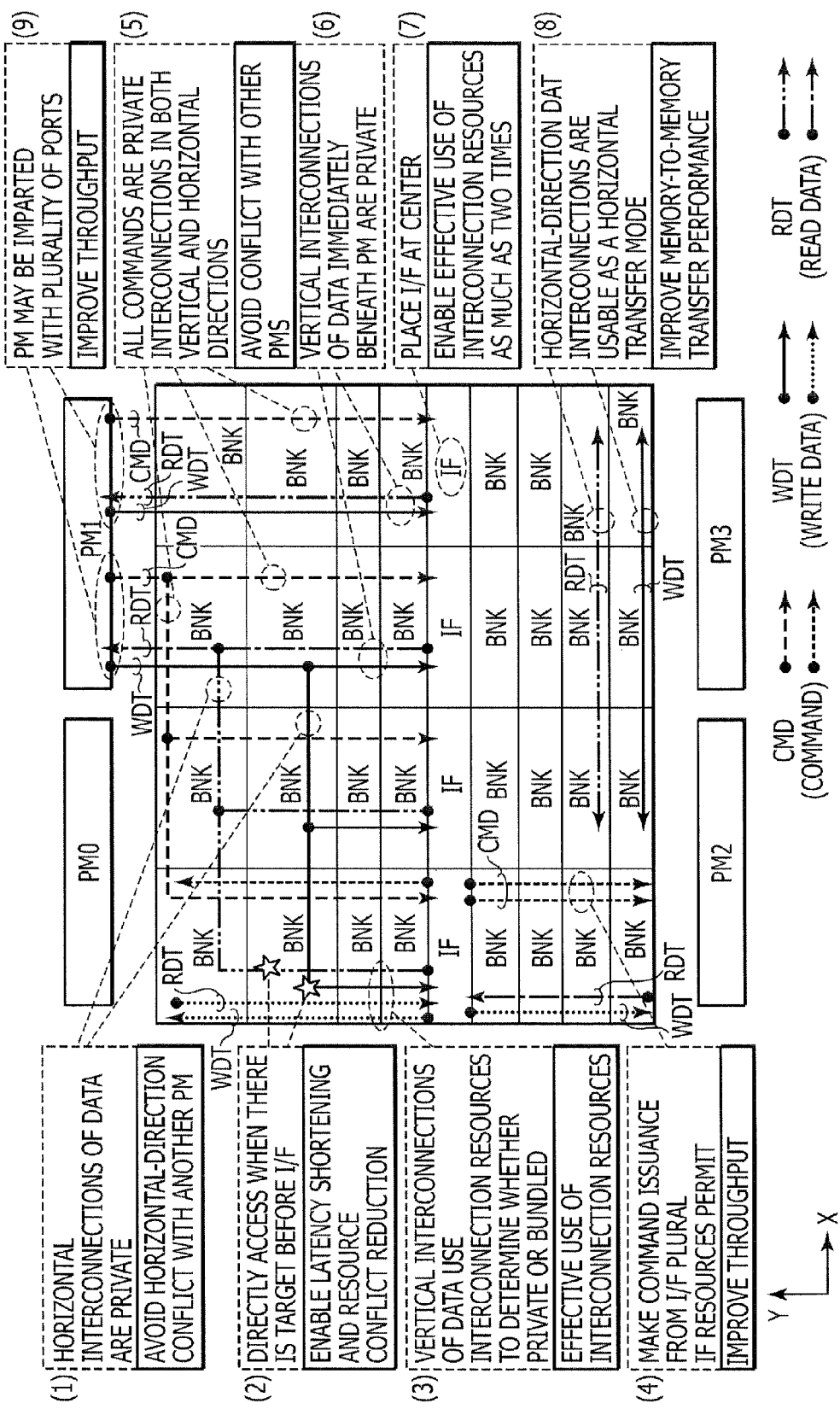

INTEGRATED DEVICE, LAYOUT METHOD THEREOF, AND PROGRAM

CROSS REFERENCES TO RELATED APPLICATIONS

This application is a continuation of U.S. patent application Ser. No. 12/283,057, titled "INTEGRATED DEVICE, LAYOUT METHOD THEREOF, AND PROGRAM," filed on Sep. 9, 2008, which claims the priority benefit under 35 U.S.C. §119 of Japanese Patent Application JP 2007-238516, filed on Sep. 13, 2007. The entire contents of these applications are hereby incorporated by reference in their entireties.

BACKGROUND OF THE INVENTION

1. Field of the Invention

The present invention relates to an integrated device having an embedded system in which a memory including a processing device such as a processor is combined in a single chip, a layout method thereof, and a program, and in particular, relates to a power control of the system.

2. Description of Related Art

A power control of a semiconductor integrated circuit is mainly performed such that special hardware for use in a power control such as a power gate and a clock gate is provided and the hardware is controlled to achieve a power optimization.

There is also a technique, such as a cache memory, in which a memory hierarchy is provided and often-accessed data is placed to a nearby hierarchy to enhance the power efficiency. An example of the technique includes the following technique as a power analysis technique of a general processor system.

In this technique, a data access activity at an application software level is profiled on a modeled memory architecture, whereby a logical power optimization is performed according to a cache hit rate or an access status of data on each source code line.

SUMMARY OF THE INVENTION

However, in the general technique listed at the first, the addition of the special hardware and the addition of management method for the hardware, etc., result in an increased outlay on development cost and products cost.

In the technique listed at the second, the same power penalty is used within the same hierarchy, and thus, a difference in efficiency due to a physical location within the hierarchy is not yet taken into consideration.

In the technique listed at the third, a physical power load of an individual access is not yet taken into consideration, and a precise optimization could not be achieved.

Accordingly, it is desirable to provide: an integrated device capable of taking into consideration even a physical location within a memory hierarchy while preventing a cost increase, taking into consideration even a physical power load of an individual access, and achieving a detailed power optimization; a layout method thereof; and a program.

In accordance with a first aspect of the present invention, there is provided a data processing device which includes: at least one data processing device and at least one memory macro accessible by the data processing device. The data processing device and the memory macro are laid out so that a memory address and a power consumption have a correlation.

A first data may be stored in an area which consumes a power less than a power consumed by an area for a second data, wherein a number of times that the first data is larger than a number of times that the second data is accessed.

The correlation between the memory address and the power consumption may be determined by an interconnection length.

A first data may be stored in a memory area having a data transmission distance from the data processing device shorter than a data transmission distance between a memory area for a second data and the data processing device, wherein a number of times that the first data is accessed is larger than a number of times that the second data is accessed.

A logical address accessed by a subject application may correspond to a physical address of a memory such that a data transmission distance between the data processing device and the memory is determined in accordance with a number of accesses by the subject application.

A data of larger number of accesses estimated by an application program analysis may be allocated to a physical address having a data transmission distance from the data processing device shorter than a data transmission distance between a data of smaller number of accesses estimated by the application program analysis and the data processing device.

A physical address mapping may be performed to optimize a power during an application program execution, by using parameter information created during an application program analysis, and access information on a parameter during the application program execution.

The data processing device may include at least one input/output port. The memory macro may include a plurality of memory banks and memory interfaces for connecting the data processing device and each of the memory banks. The input/output port of the data processing device, each of the memory interfaces, and each of the memory banks may be connected by connecting interconnections.

The connecting interconnections may include a command information interconnection and a data interconnection, each of which has a multilayer interconnect structure. The command information interconnection may be formed by a private interconnection. At least a part of the data interconnections may be formed by a private interconnection.

The memory interfaces may be arranged in a position opposing to an arranged position arranged in the data processing device by interposing a disposed area of the memory macro. Each of the memory macro may be arranged in parallel in a second direction approximately orthogonal to a first direction, which is a connecting direction between the data processing device and the memory interfaces. The input/output port of the data processing device, each of the memory interfaces, and each of the memory banks may be connected by interconnections wired in the first direction and the second direction to be in a matrix in a plurality of areas of the memory macro. The data interconnection includes at least the second direction wired interconnection formed by a private interconnection.

In accordance with a second aspect of the present invention, there is provided a layout method of an integrated device including at least data processing device and at least one memory macro accessible by the data processing device, the method which includes laying out the data processing device and the memory macro so that a memory address and a power consumption have a correlation.

A first data may be stored in an area which consumes a power less than a power consumed by an area for a second data, wherein a number of times that the first data is accessed is larger than a number of times that the second data is accessed.

In accordance with a third aspect of the present invention, there is provided a program for use in an integrated device including at least one data processing device and at least one memory macro accessible by the data processing device, the program causing a computer to execute a method of including laying out the data processing device and the memory macro so that a memory address and a power consumption have a correlation.

In accordance with a fourth aspect of the present invention, there is provided a program for use in an integrated device including at least one data processing device and at least memory macro accessible by the data processing device, the program causing a computer to execute a method of including laying out the data processing device and the memory macro so that a memory address and a power consumption have a correlation, and storing a first data in an area which consumes a power less than a power consumed by an area for a second data, a number of times that the first data is accessed being larger than a number of times that the second data is accessed.

An embodiment of the present invention is applied when a general data processing system configured by a data processing device such as a processor and a memory is implemented as an LSI. Thus, an embodiment of the present invention enables a power optimization by programming by devising a relative layout of the processor and the memory. Such effects may be achieved not only between memory layers but also within the same layer of memory.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

FIG. 6 is a table showing an example of a parameter list of the process in FIG. 5;

FIG. 13 is a table showing a parameter list associated with FIG. 12;

FIG. 17 is a table showing a parameter list associated with FIG. 16;

FIG. 25 is a diagram for describing that the integrated device of the embodiment may be capable of improving a throughput without increasing an area as compared to a case where X-bars are simply mapped;

FIGS. 26A-C are diagrams showing, as a connecting interconnection of the embodiment, three modes: a private interconnection PRL (as illustrated in each of FIGS. 26A and 26B); a public interconnection PBL (as illustrated in each of FIGS. 26A and 26B); and a common interconnection CML (as illustrated in FIG. 26C):

FIG. 29 is a diagram showing a configuration example of a memory macro in which a memory interface I/F is shared in a memory system arranged in a Y direction (first direction);

FIG. 50 is a diagram collectively showing a basic configuration of the integrated device and characteristics of connecting interconnections according to an embodiment of the present invention.

DETAILED DESCRIPTION OF EMBODIMENTS

In association with drawings, an embodiment of the present invention is described below.

Figure 1:
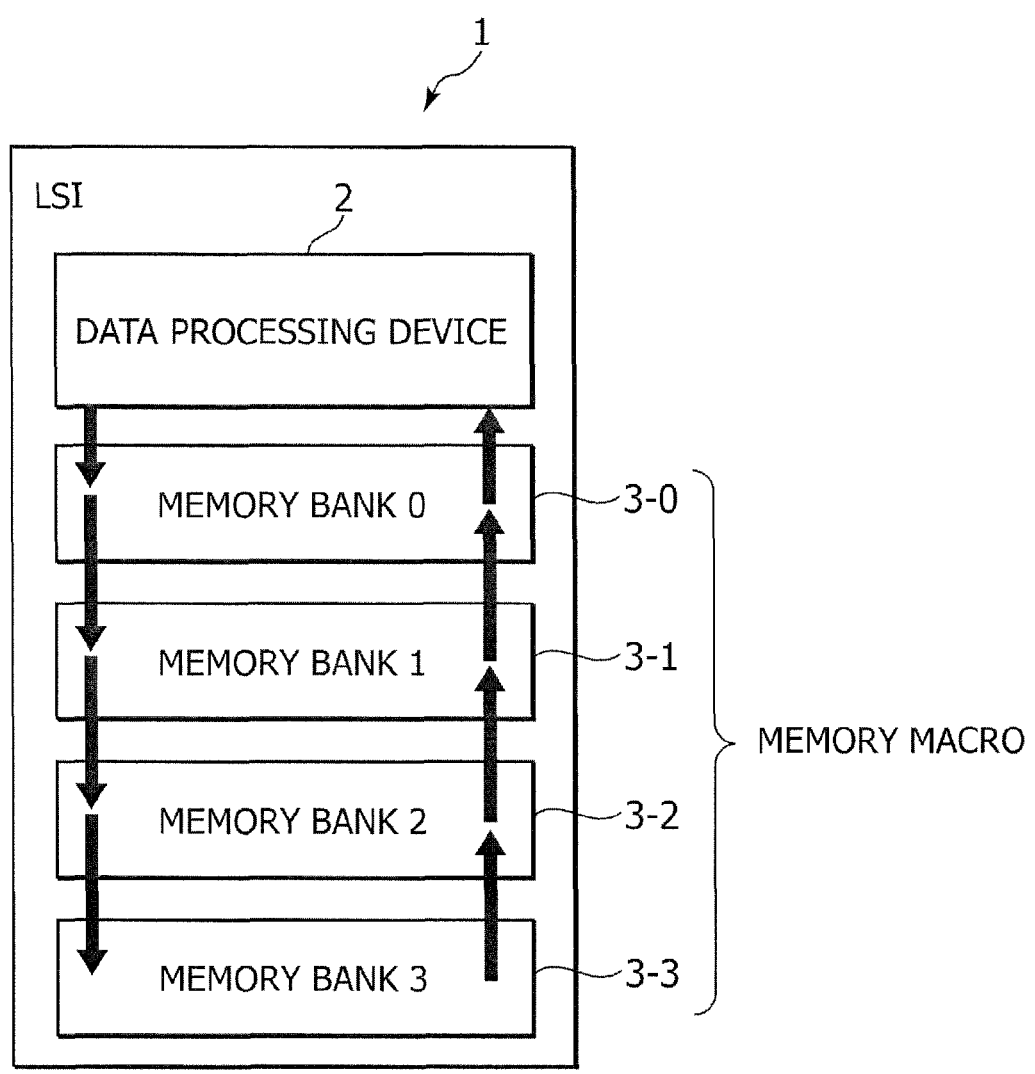
FIG. 1 is a basic system configuration diagram of an integrated device according to an embodiment of the present invention.

FIG. 1 is a basic system configuration diagram of an integrated device according to an embodiment of the present invention.

An integrated device 1 shows a basic configuration, and includes a data processing device 2 such as a processor, and a memory macro 3 having a plurality (four in an example in FIG. 1) of memory banks 3-0 to 3-3 accessible from the data processing device 2.

In the integrated device 1 according to an embodiment of the present invention, the data processing device 2 and the memory banks 3-0 to 3-3 are laid out so that a memory address and power consumption have a correlation. The integrated device 1 is configured so that data having a large number of accesses (i.e. the number of times that the data is accessed from the integrated device 1 is large) is placed (near) in an area which consumes a small amount of power to achieve a low power consumption.

In other words, according to an embodiment of the present invention, in an integrated device in which a distance (data transmission distance) to a data processing device such as a processor is determined in advance and various predetermined distances exist to correspond to the individual physical addresses, a logical address accessed by a subject application is allocated to a physical address of a memory having a shortest possible data transmission distance to the data processing device according to a number of accesses, thereby reducing the power consumption.

The correlation between the memory address and the power consumption is determined by an interconnection length, an interconnection width, an interconnection material, and the like. When the interconnection width and the interconnect-ion material are the same, the correlation is determined by the interconnection length.

A power optimization may also be enabled by directly optimizing the physical address (without an address conversion table). Executing means in this case includes a programmer and a compiler.

Another way of optimization is that there is an address conversion table for converting a logical address into a physical address and a setting value of the address conversion table is used to enable the optimization. Executing means in this case includes a programmer, a compiler, means for holding an access history, etc.

The data processing device 2 performs a process to achieve a minimum power consumption on the basis of the memory macro 3 and information about power consumption obtained when accessing the memory macro 3.

The integrated device 1 is configured to reduce a power consumption by allocating data having a large number of accesses to an address which consumes a smaller amount of power.

A specific power saving control method of the power optimization in the integrated device 1 according to an embodiment will be described below.

Firstly, a basic concept will be described.

The integrated device 1 according to an embodiment of the present invention is applied when a general processor system configured by a data processing device such as a processor, and a memory is implemented as an LSI, etc. The integrated device 1 devises a relative layout of the processor and the memory to enable the power optimization by programming. The integrated device 1 exhibits an effect not only between memory layers but also within the same layer of memory.

Basic contents are as follows:

1): An electric power required for a data transfer correlates with a physical distance between the data processing device 2 such as a processor, etc., and a memory element in which data is stored.

Accordingly, with respect to the data processing device 2, a physical layout configuration such that a memory address and a distance of a data transmission (transfer) have a correlation is established.

As a result, the power consumption with respect to an address accessed by a programmer is explicitly recognized. By being perceptively recognized, the memory allocation is determined to perform coding, thereby enabling a power optimization at a programming level.

A specific example of a layout technique in which the memory address and the data transmission (transfer) distance are caused to have a correlation is described in detail later.

The range of applicability of an embodiment of the present invention may include the following:

2): When this principle is introduced to the compiler, an automatic generation of an object code for the power optimization is easily enabled.

For example, when the compiler compiles, if a parameter having a high number of accesses is placed to a physically near memory, an enhancement of the electric power efficiency is enabled.

The parameter having a high number of accesses may be estimated by profiling during the compiling. Generally, a local parameter said to be tended to have a high number of accesses during a program execution, or a parameter or the like which explicitly performs a high number of accesses during programming may be estimated as a candidate.

In contrary, in the case of an image processing application such as an image filtering, image data is often read into a processor only once when it is processed.

Just placing a stack area where the local parameter is placed to a physically near memory could provide an effective low-power consumption.

3): In a system to support a virtual address, there is a virtual address controlling unit for converting a logical address into a physical address. When a relationship between a distance and a power consumption is added to an address conversion algorism of the virtual address controlling unit, the power optimization may be enabled during the program execution.

In this case, profile information on a parameter created during compiling the program and access information on a parameter during the program execution may be used to enable physical address mapping for the power optimization during the program execution. Thus, it may become possible to be compatible with even a program in which a parameter is not determined statically, e.g., a multithreaded program, etc.

A correction of the address conversion algorism of the virtual address controlling unit may be possible by a correction only within this block.

Accordingly, it may achieve a system in which no load is applied to the compiler and a low power consumption execution is possible while maintaining a binary compatibility with an existing system.

4): With respect to the foregoing item 3), besides the power correlation generated by the layout between the memory address and the distance, if a correlation table between the memory address and the power consumption is additionally imparted, a factor other than the distance may be considered.

For example, a difference in quality of an interconnection material by the memory address may be considered to be compatible also with a more complicated physical model.

Subsequently, the power saving control method will be described more specifically.

Firstly, as a basic principle, an interconnection length and a transfer power are described.

Figure 2:
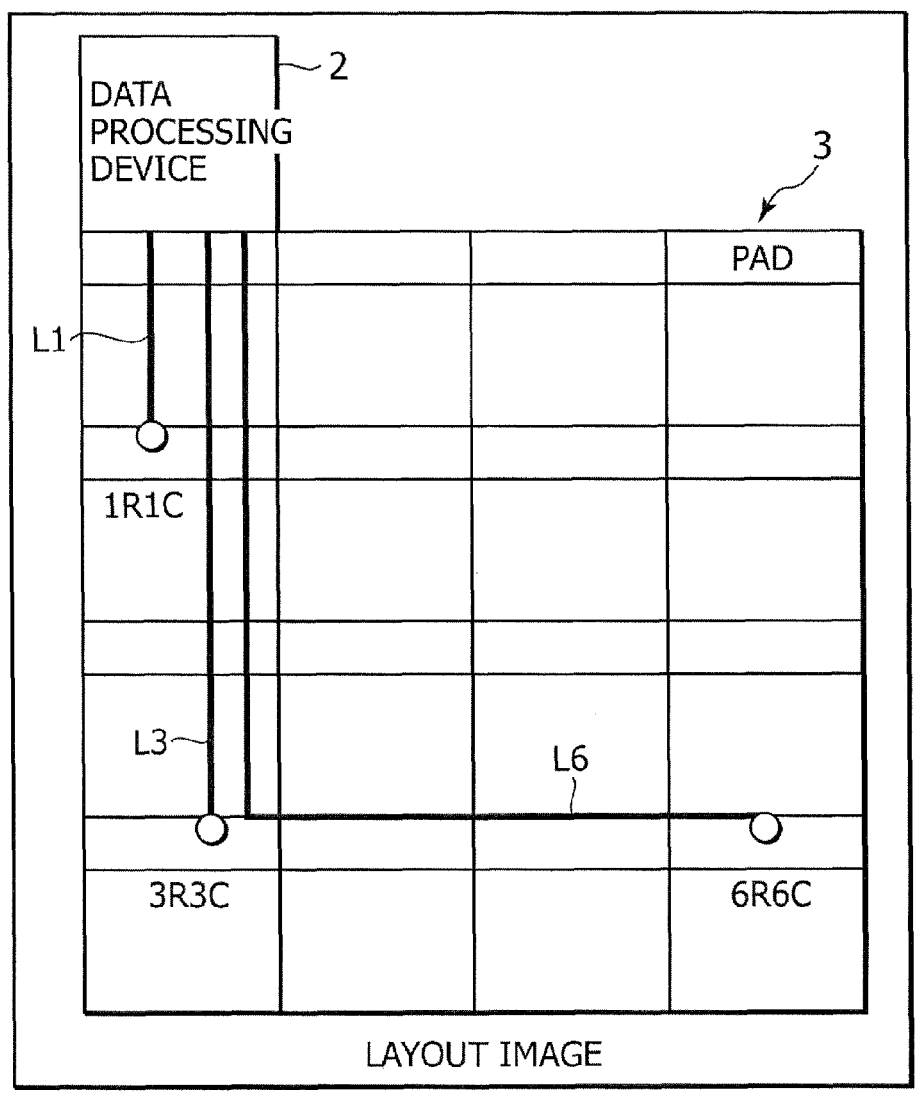
FIG. 2 is a diagram showing a layout image of a data processing device and each memory macro of a memory array.

FIG. 2 is a diagram showing a layout image of the data processing device and each memory macro of a memory array.

Figure 3:
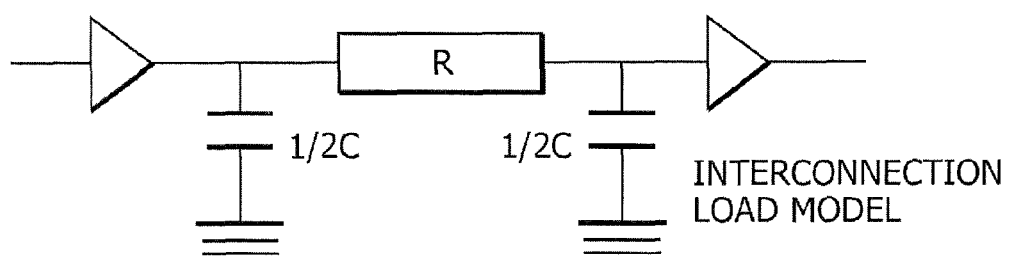
FIG. 3 is a diagram showing an interconnection load model.

FIG. 3 is a diagram showing an interconnection load model.

Power consumption p is proportional to a product of a capacitance c and a frequency f.

From the interconnection load model, the power consumption is proportional to the interconnection length.

The correlation between the memory address and the power consumption is determined by an interconnection length, an interconnection width, an interconnection material, etc.

When the interconnection width and the interconnection material are the same, the correlation is determined solely by the interconnection length. Thus, on an integrated circuit (on an LSI), it may consider that the interconnection length is dominant.

Total power consumption P is given by the following expression, where interconnection lengths to the memory macro are L1/L2/ . . . /Lm, and the numbers of accesses to each memory macro are N1/N2/ . . . /Nm:

$$P = k \sum_m (Lm \times Nm) \quad \text{[Expression 1]}$$

where k denotes a constant.

Since the numbers of accesses N1/N2/ . . . /Nn are determined by an application program, when the interconnection lengths L1/L2/ . . . /Ln are selected and the memory allocation is performed to reduce the total power consumption P to a minimum, the power optimization during the program execution may be achieved.

Subsequently, a basic algorism for reducing the total power consumption P to a minimum is described.

Figure 4:
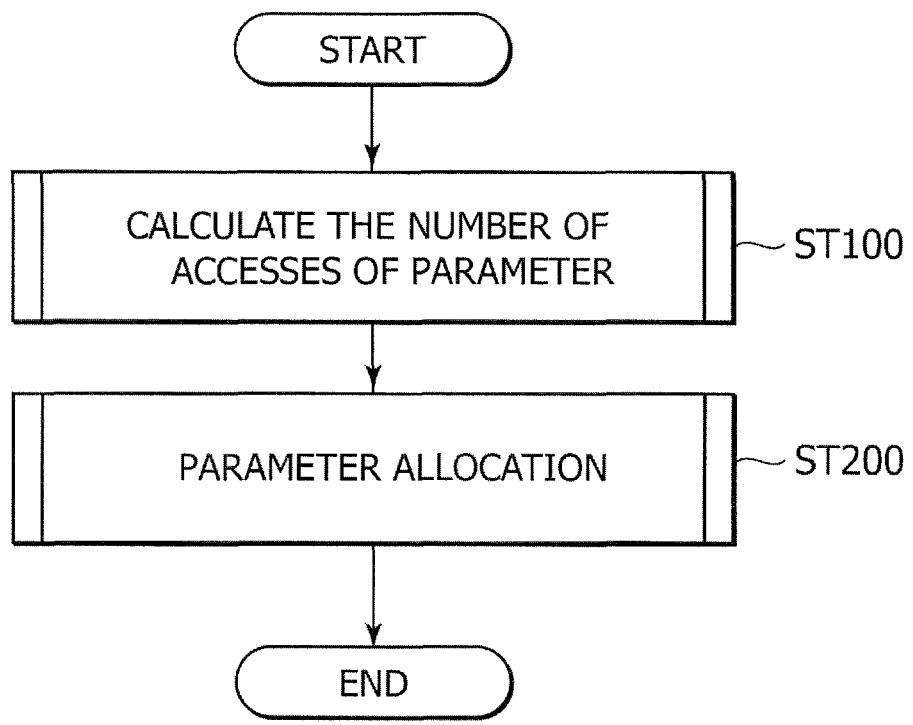
FIG. 4 is a flowchart showing a basic algorism for reducing a total power consumption P to a minimum.

FIG. 4 is a flowchart showing the basic algorism for reducing the total power consumption P to a minimum.

This process is formed basically of step ST100 of calculating a number of accesses of a parameter and step ST200 of performing an allocation of the parameter.

Problem:

Evaluate an arrangement of each parameter for reducing a total power consumption for accessing all parameters to a minimum.

DEFINITION

A power consumption (p) for accessing a certain parameter i is proportional to a product of an interconnection length (l) and the number of accesses (n).

$$p(i) \propto l(i) * n(i) \quad \text{[Expression 2]}$$

l: a data-transfer path length to a location to be arranged
n: the number of accesses The number of parameters is finite, and when the number is represented by M, the total power consumption (P) for accessing all the parameters is given by the following expression.

$$P=k\Sigma(i=0,M)\{l(i)*n(i)\} \quad \text{[Expression 3]}$$

Solution

At the step ST100 of a flowchart in FIG. 4, n(i) is obtained.

Subsequently, at the step ST200, all l(i)s for reducing the total power consumption (P) to a minimum are evaluated for all the given n(i)s.

Hereinafter, specific solutions at the step ST100 and the step ST200 of the basic algorism will be described.

Solution at Step ST100

The number of accesses n(i) of each parameter is obtained.
(Method 1):

It is possible to determine whether or not the parameter i is included in a loop by analyzing the program during compiling.

For example, in C/C++, if a "do" statement, a "while" statement, or a "for" statement appears, a loop body immediately ({ . . . }) thereafter may be determined as a portion included in the loop.

When the number of times of all loops may be known by the program analysis, if the number of times is used, the number of accesses may be calculated.

(Method 2):

When there is even one loop of which the number of times of loops is unknown, a programmer may estimate the number of times of loops from a tendency of the application and use the number of times to calculate the number of accesses.

(Method 3):

When there is even one loop of which the number of times of loops is unknown, the following weighing may be applied to calculate the number of accesses. Generally, a parameter within a loop has a greater number of accesses than that outside the loop, and thus, in accordance therewith, a relative positional relationship is to be determined.

The parameter n(i) is determined as follows:
[Expression 4]

If not included in the loop: n(i)=1; and
If included in the loop: n(i)=100;

It may suffice to establish a relationship that the value in the case of being included in the loop is larger than that in the case of not being included. The relationship may not always be 100:1.

(Method 4):

If there is a loop within the loop (nesting), by setting n(i) to a further larger value, a more detailed power control may be enabled.

[Expression 5]

If not being included in the loop: n(i)=1;
If being included in the loop: n(i)=100; and
Further, if it is an N-time loop: n(i)=100*N;

(Method 5):

By using means for recording an access history for each parameter during the program execution, the number of accesses may be measured.

In each the above-described methods, with respect to a condition branching in the program, an estimated branch probability previously determined by the following methods, etc., is used to calculate the number of accesses.

In a method a, for example, a predicted value by the programmer is used.

In a method b, a statistical estimated branch probability, e.g., "If/else" at 50 each; "for/while" for a backward branch probability at 90; and a forward branch probability at 10, are used.

Figure 5:
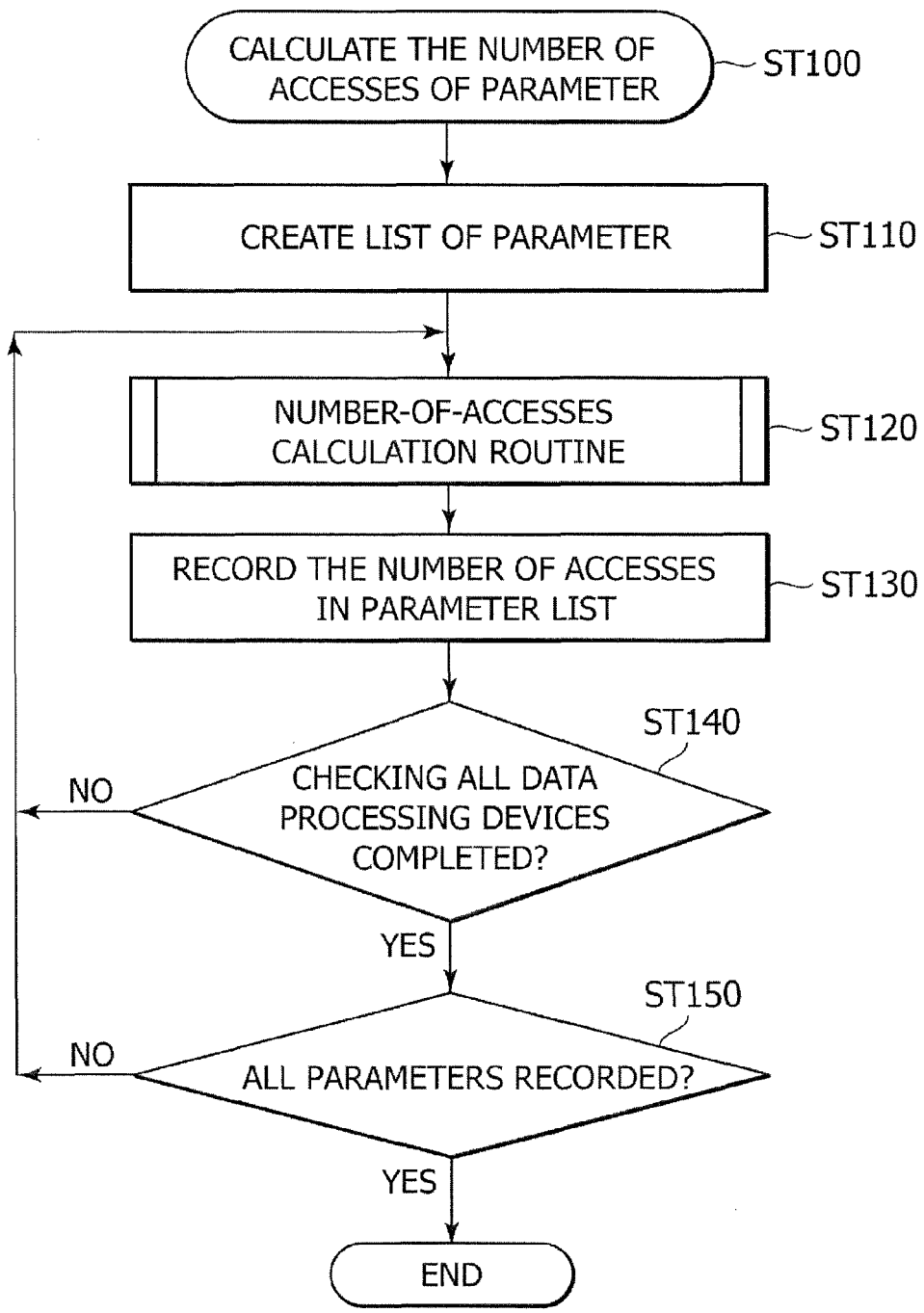
FIG. 5 is a flowchart showing a specific process at step ST100 in FIG. 4.

FIG. 5 is a flowchart showing a specific process at step ST100 in FIG. 4.

FIG. 6 is a table showing an example of a parameter list of the process in FIG. 5.

FIG. 5 shows a process flow to conform to a plurality of data processing devices.

In items in the parameter list of FIG. 6, "parameter" indicates a parameter name; "No" indicates a number of the data processing device which accesses to one or more memory macros; and "number of accesses" indicates the number of times to be accessed, respectively.

At the step ST100 of calculating a number of accesses of the parameter, the list of parameters shown in FIG. 6 is created (ST110), and a number-of-accesses calculation routine process is performed (ST120). Input of the number-of-accesses calculation routine process is a parameter and output thereof is a number of accesses.

Subsequently, a number of accesses of the parameter list is recorded (ST130).

It is determined whether checking all the data processing devices is complete (ST140), and when the completion is determined, it is determined whether all the parameters are recorded in the parameter list (ST150).

When it is determined that all the parameters are recorded in the parameter list, the process is ended.

At the steps ST140 and ST150, when a negative determination result is obtained, the above-described processes are repeated from the number-of-accesses calculation routine process at the step ST120.

Figure 7:
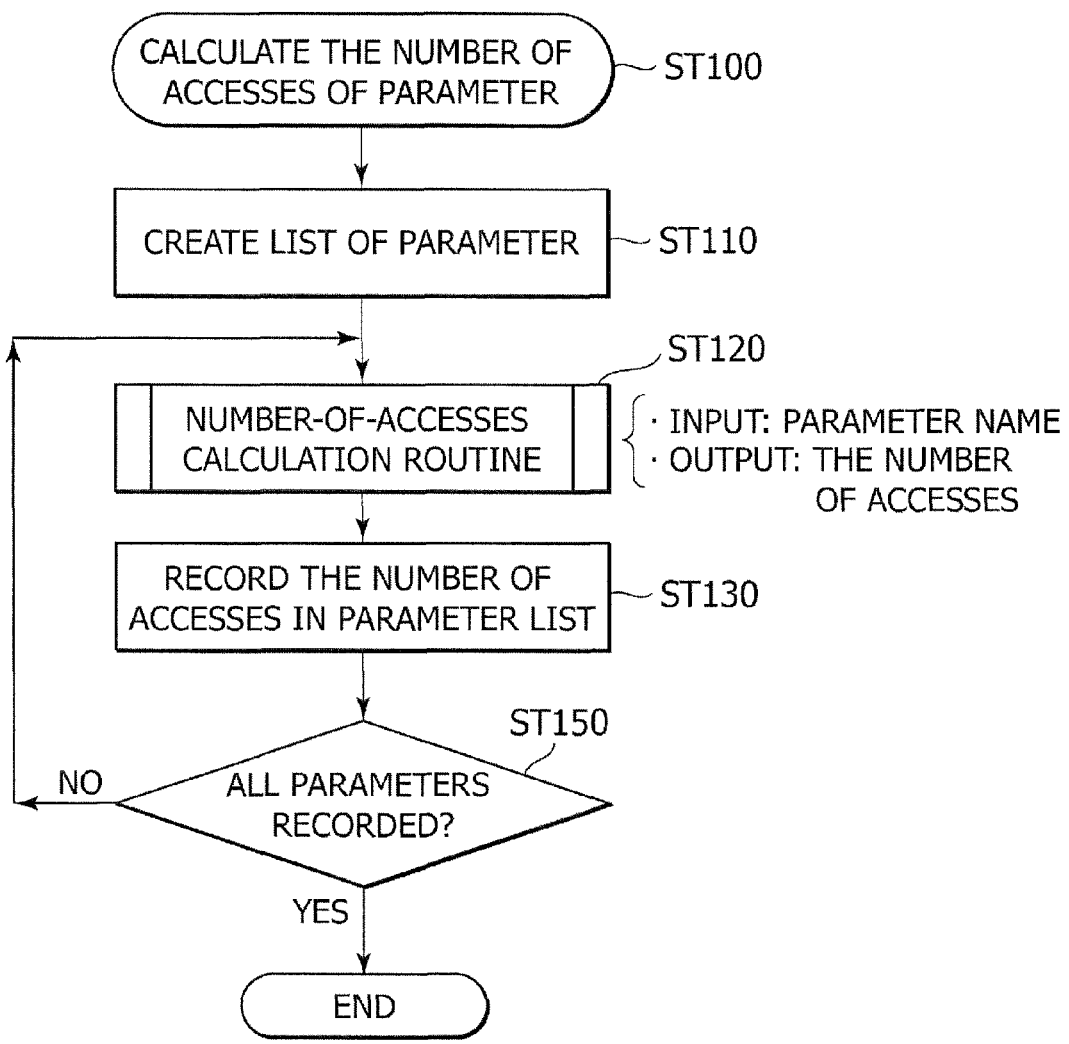
FIG. 7 is a flowchart showing a specific process in a case where the parameter at the step ST100 in FIG. 4 is a local parameter.

FIG. 7 is a flowchart showing a specific process in a case where the parameter at the step ST100 in FIG. 4 is a local parameter.

Figures 8, 9:
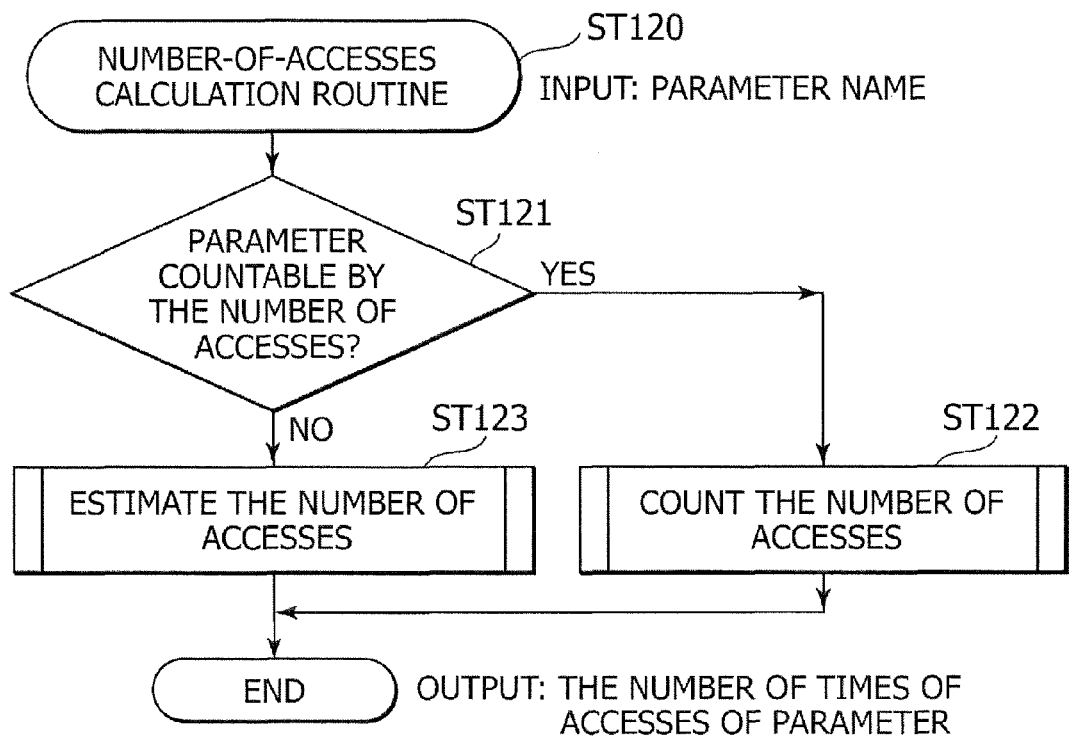
FIG. 8 is a table showing an example of a parameter list of the process in FIG. 7.
FIG. 9 is a flowchart showing a number-of-accesses calculation routine process at step ST120 in FIG. 5 and FIG. 7.

FIG. 8 is a table showing an example of a parameter list of the process in FIG. 7.

If the parameter is the local parameter (or if a system has one data processing device), there is one data processing device which accesses to one or more memory macros, and thus, the process may be simplified. That is, the process at the step ST140 in FIG. 5 becomes unnecessary, and thus, the process may be simplified.

FIG. 9 is a flowchart showing the number-of-accesses calculation routine process at the step ST120 in FIG. 5 and FIG. 7.

In the number-of-accesses calculation routine process at the step ST120, it is determined whether it is possible to count the parameter by a number of accesses (ST121).

When it is determined that the parameter may be counted by a number of accesses at the step ST121, the (method 1) described in the solution at the step ST100 of the above-described basic algorism, for example, is adopted to count a number of accesses (ST122).

When it is determined that the parameter may not be counted by a number of accesses at the step ST121, any one of the (method 2), (method 3), and (method 4) described in the solution at the step ST100 of the above-described basic algorism, for example, is adopted to estimate a number of accesses (ST123).

Subsequently, a specific solution of the step ST200 of the basic algorism is described.

Solution at Step ST200

1): If there is one data processing device.

(Method 1)

A full-search method is employed.

All combinations of given n(i) the number of which is i and selectable l(i) the number of which is J are searched to evaluate a minimum total power consumption P.

(Method 2)

Numerical analysis is performed.

The n(i) having a larger value is successively allotted to the l(i) having a smaller value.

2): If there are a plurality (nP) of data processing devices.

[ ]

$$P(i,u) \propto l(i,u) * n(i,u)$$

u: the number of data processing devices
P=kΣ(u=0,nP)Σ(i=0,M){l(i,u)*n(i,u)}

(Method 1)

A full-search method is employed.

All combinations of given n(i) the number of which is i and selectable l(i) the number of which is J are searched to obtain a minimum total power consumption P.

(Method 2)

Numerical analysis is performed.

Using a mathematical method, a combination which provides a minimum total power consumption P is determined.

A calculation amount may become less as compared to using the total retrieval.

As described above, the power saving control method according to an embodiment of the present invention is specifically described.

As an example of a memory access system if there is one data processing device; that of a memory access system if there are two data processing devices; that of a parameter allocation in these cases; that of a layout method for correlating the memory address and the data transmission distance, a configuration example of the memory system will be more specifically described below.

Figure 10:
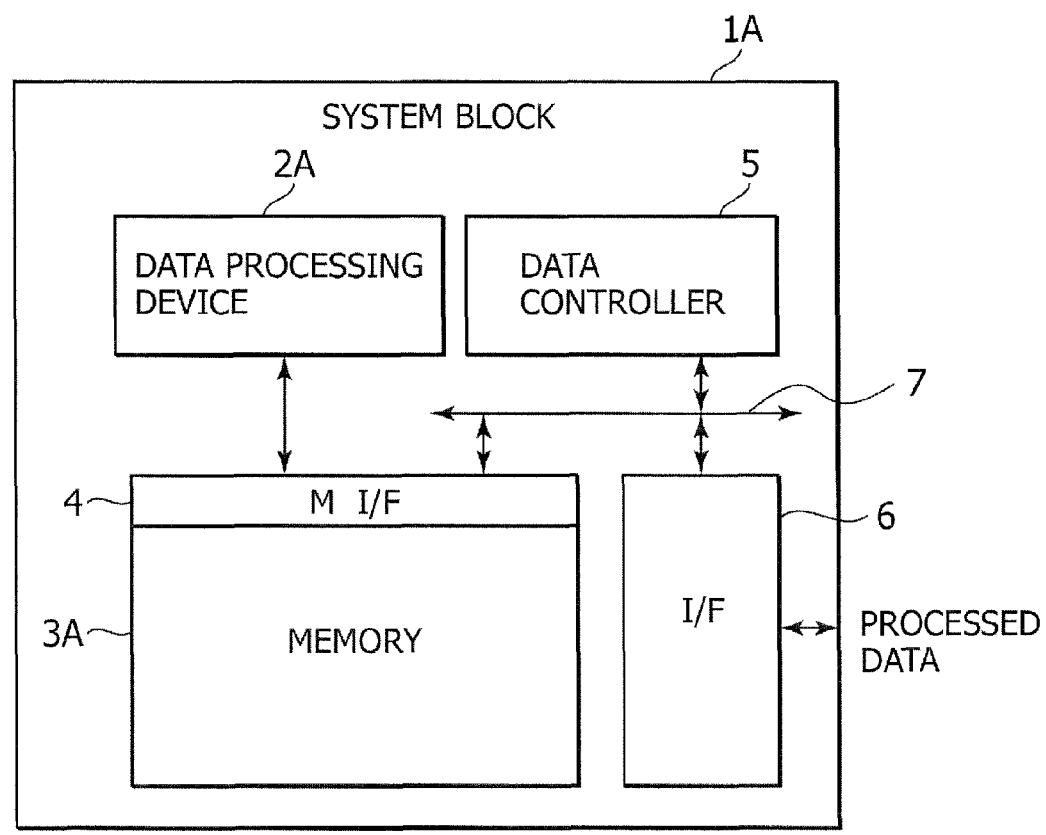
FIG. 10 is a block diagram showing a configuration example of a memory access system in a case where there is one data processing device.

FIG. 10 is a block diagram showing a configuration example of the memory access system when there is one data processing device.

Figure 11:
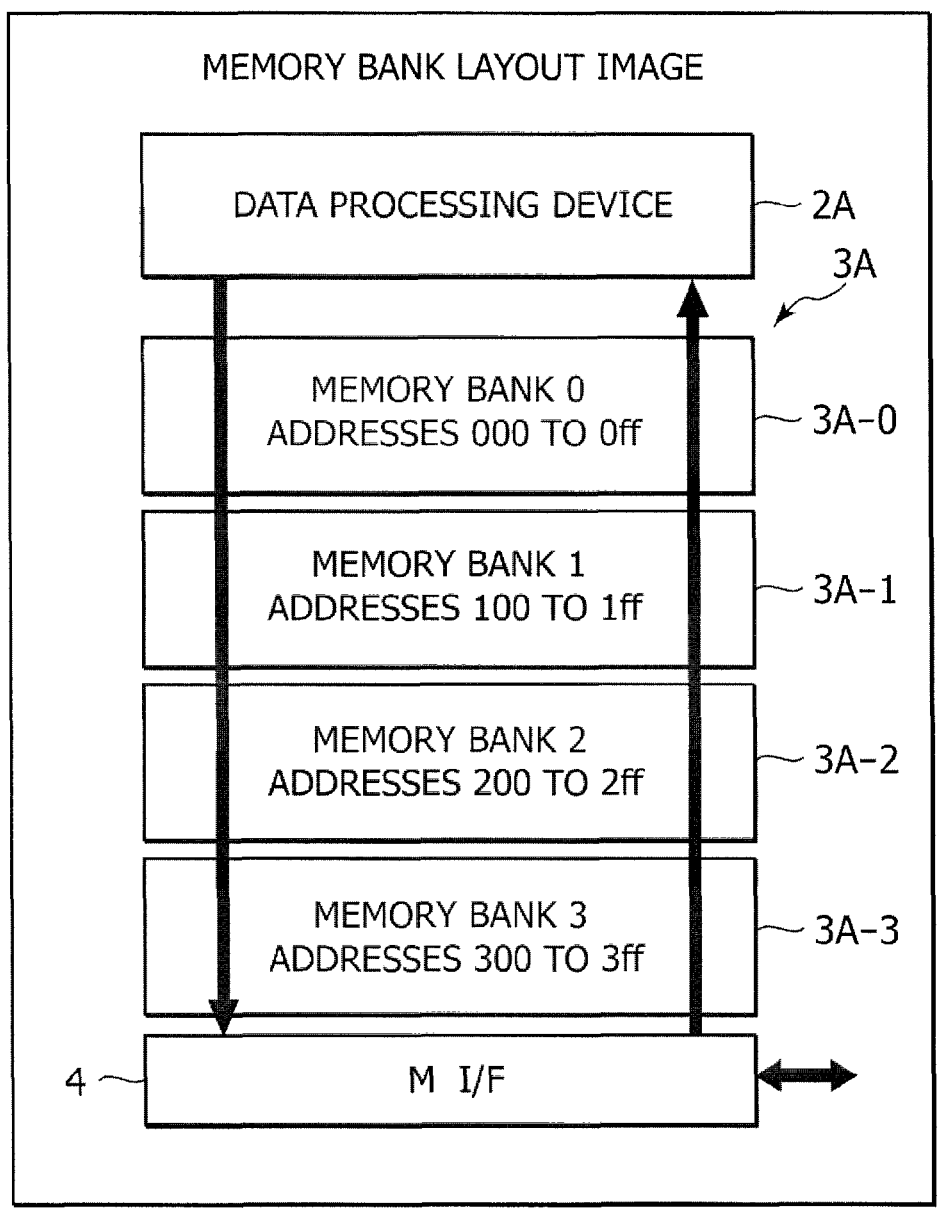
FIG. 11 is a diagram showing a layout image of a memory macro including a plurality of memory banks in the system of FIG. 10.

FIG. 11 is a diagram showing a layout image of a plurality of memory banks in the system of FIG. 10.

As shown in FIG. 10, a memory access system 1A includes: a data processing device 2A; a memory 3A including memory banks 3A-0 to 3A-3; a memory interface (MI/F) 4; a data controller 5; an external interface (I/F) 6; and a bus 7.

In the system 1A, loading and storing data into the memory 3A are executed by the data controller 5 such as a DMA.

The data processing device 2A including a computing unit reads out the data on the memory 3A via the memory interface 4 to compute, and writes back a computed result to the memory 3A via the memory interface 4.

As shown in FIG. 11, in terms of layout, the memory interface 4 is arranged in a position to oppose an allocation position of the data processing device 2A while sandwiching an allocation area of the memory macro 3A therebetween.

The memory banks 3A-0 to 3A-3 are configured as 2 k-bit (8 bits×256) memory banks, for example. Addresses are in hexadecimal (Hex), and are each allotted addresses (byte addresses) 0 to ffH.

The memory bank 3A-0 is assigned the addresses 000 to 0ff; the memory bank 3A-1 is assigned the addresses 100 to 1ff; the memory bank 3A-2 is assigned the addresses 200 to 2ff; and the memory bank 3A-2 is assigned the addresses 300 to 3ff.

In this case, regarding a relationship (interconnection length) of a distance to the data processing device 2A, the memory bank 3A-0 is nearest; the memory bank 3A-1 is the second nearest; the memory bank 3A-2 is the third nearest; and the memory bank 3A-3 is the farthest.

In the embodiment, the layout is so designed that the memory address and the power consumption have a correlation. Thus, in this example, data having a large number of accesses is placed in an area which consumes a low power, for example, in the memory bank 3A-0 or 3A-1, and data having a small number of accesses is placed in the memory bank 3A-3 or 3A-2, for example, thereby lowering the power consumption.

Figure 12:
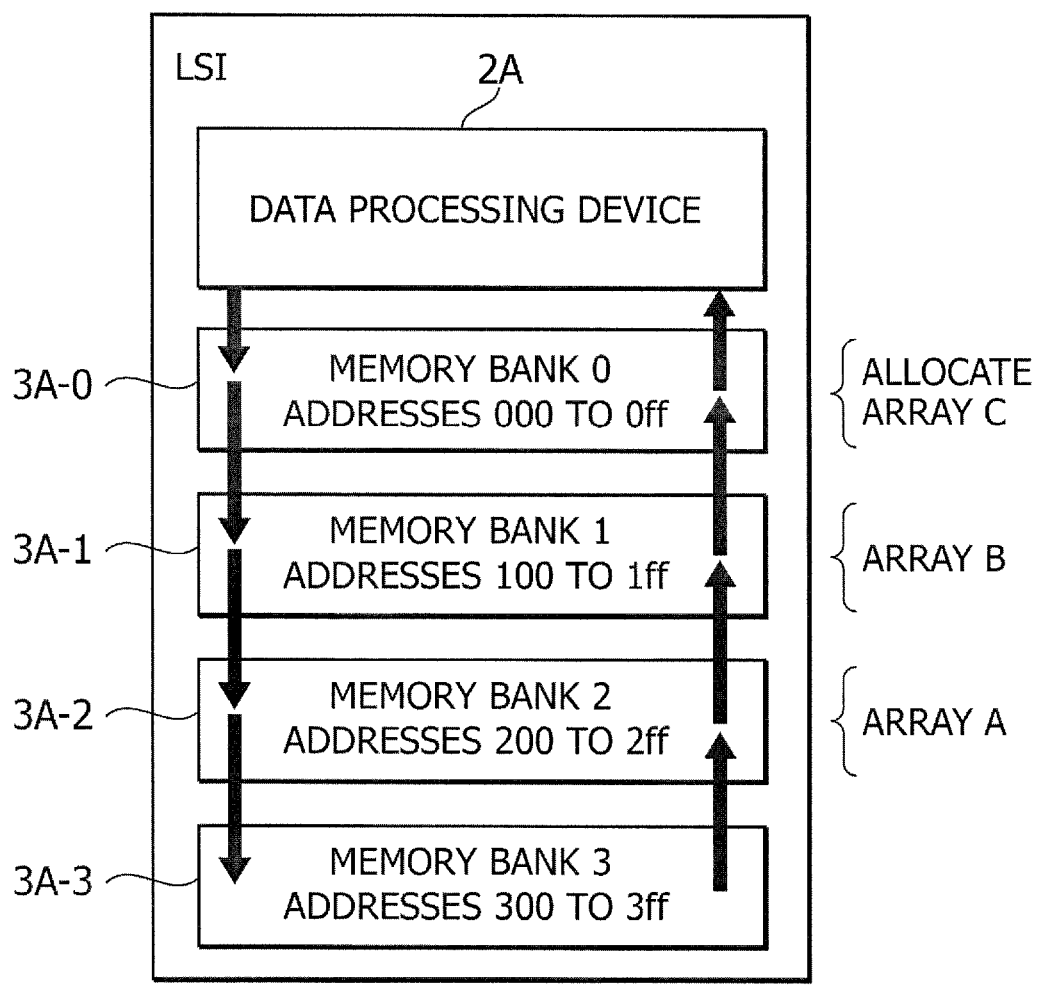
FIG. 12 is a diagram showing an example of a parameter allocation to a memory in a case where there is one data processing device in FIG. 10 and FIG. 11.

FIG. 12 is a diagram showing an example of the parameter allocation to a memory if there is one data processing device in FIG. 10 and FIG. 11.

FIG. 13 is a table showing a parameter list associated with FIG. 12.

This example shows a case where arrays A, B, and C each having 256 elements are read and written for 1 time, 10 times, and 97 times, respectively.

In the embodiment, the layout is so designed that the memory address and the power consumption have a correlation. Thus, the array C having a large number of accesses, i.e., 97 times, is allocated (placed) in the memory bank 3A-0, for example; the array B having a small number of accesses, i.e., 10 times, is allocated (placed) in the memory bank 3A-1; and the array data A having the smallest number of accesses is allocated (placed) in the memory bank 3A-2. As a consequence, the power consumption is reduced.

Figure 14:
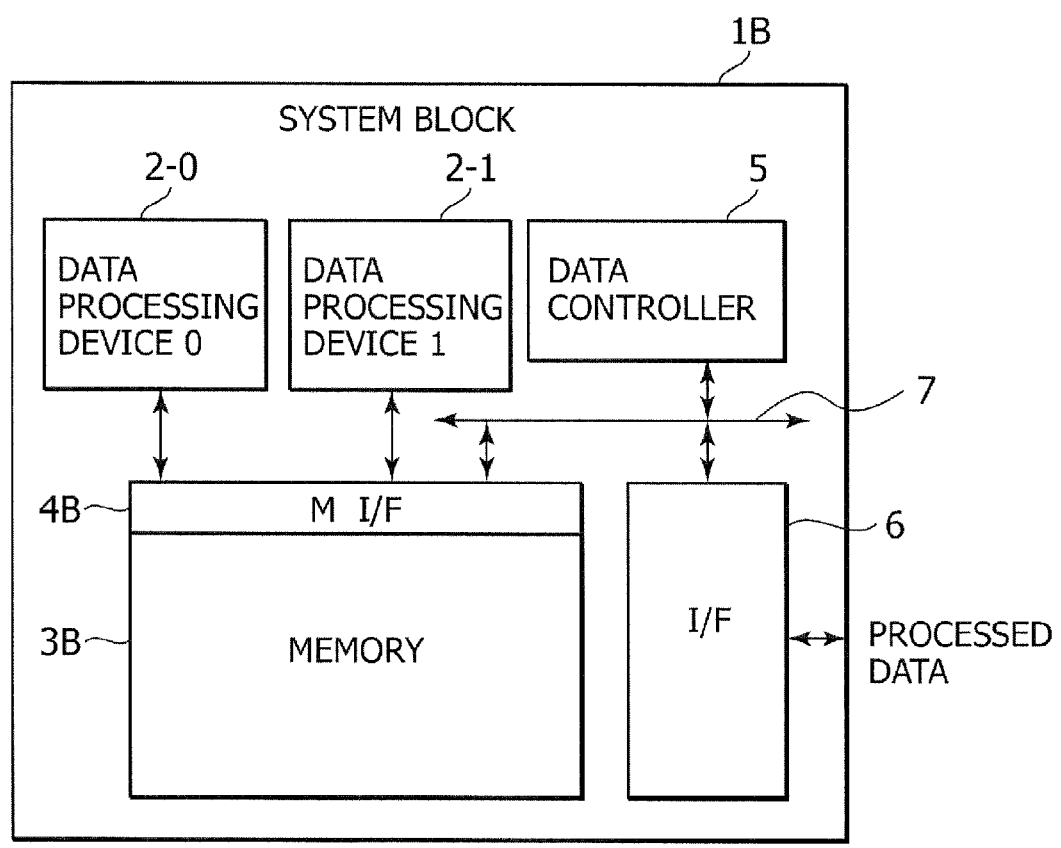
FIG. 14 is a block diagram showing a configuration example of a memory access system in a case where there are two data processing devices.

FIG. 14 is a block diagram showing a configuration example of the memory access system when there are two data processing devices.

Figure 15:
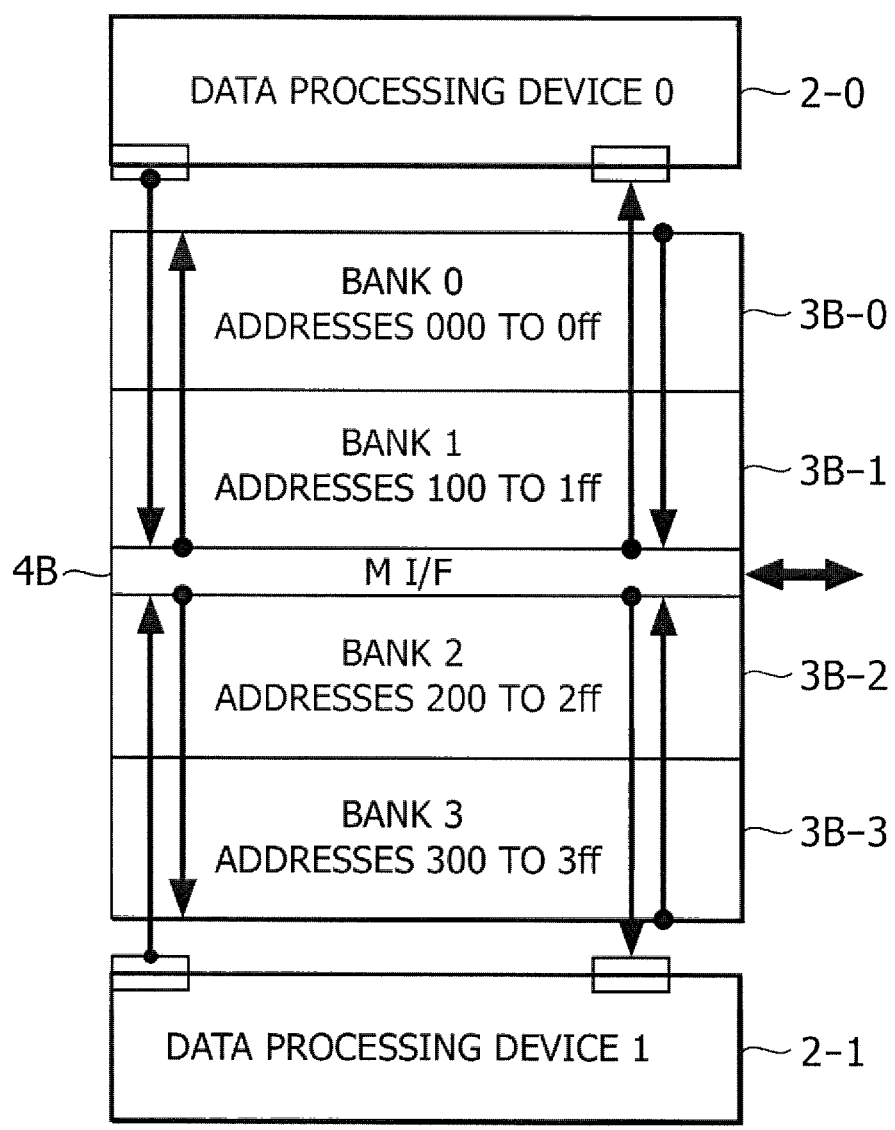
FIG. 15 is a diagram showing a layout image of a memory macro including a plurality of memory banks in the system of FIG. 14.

FIG. 15 is a diagram showing a layout image of a memory macro including a plurality of memory banks in the system of FIG. 14.

A memory access system 1B differs from the memory access system 1A in FIG. 10 in that two data processing devices 2-0 and 2-1 are provided.

The data processing devices 2-0 and 2-1 including a computing unit read out data on a memory 3B via a memory interface 4B to compute, and write back a computed result to the memory 3B via the memory interface 4B.

In this example, as shown in FIG. 15, in terms of layout, the memory interface 4B is placed between an allocation area of a memory bank 3B-1 of a memory macro 3B and an allocation area of a memory bank 3B-2 thereof.

That is, in terms of layout, the memory interface 4B is placed in a position to oppose an allocation position of the data processing device 2-0 while sandwiching the allocation areas of the memory banks 3B-0 and 3B-1 of the memory macro 3B therebetween.

Similarly, in terms of layout, the memory interface 4B is placed in a position to oppose an allocation position of the data processing device 2-1 while sandwiching the allocation areas of the memory banks 3B-3 and 3B-2 of the memory macro 3B therebetween.

Thus, the memory interface 4B is shared in the data processing devices 2-0 and 2-1, and has an arbitration function of the data processing devices 2-0 and 2-1 and a function as a data input/output interface to and from each memory bank 3B-0 to 3B-3.

In the embodiment, the layout is so designed that the memory address and the power consumption have a correlation. Thus, in this embodiment, data having a large number of accesses to the data processing device 2-0 is placed in the memory bank 3B-0 which is an area which consumes a low power, and data having a small number of accesses is placed in the memory bank 3B-1.

Similarly, data having a large number of accesses to the data processing device 2-1 is placed in the memory bank 3B-3, i.e., an area which consumes a low power, and data having a small number of accesses is placed in the memory bank 3B-2.

Thus, the reduction in power consumption is achieved.

Figure 16:
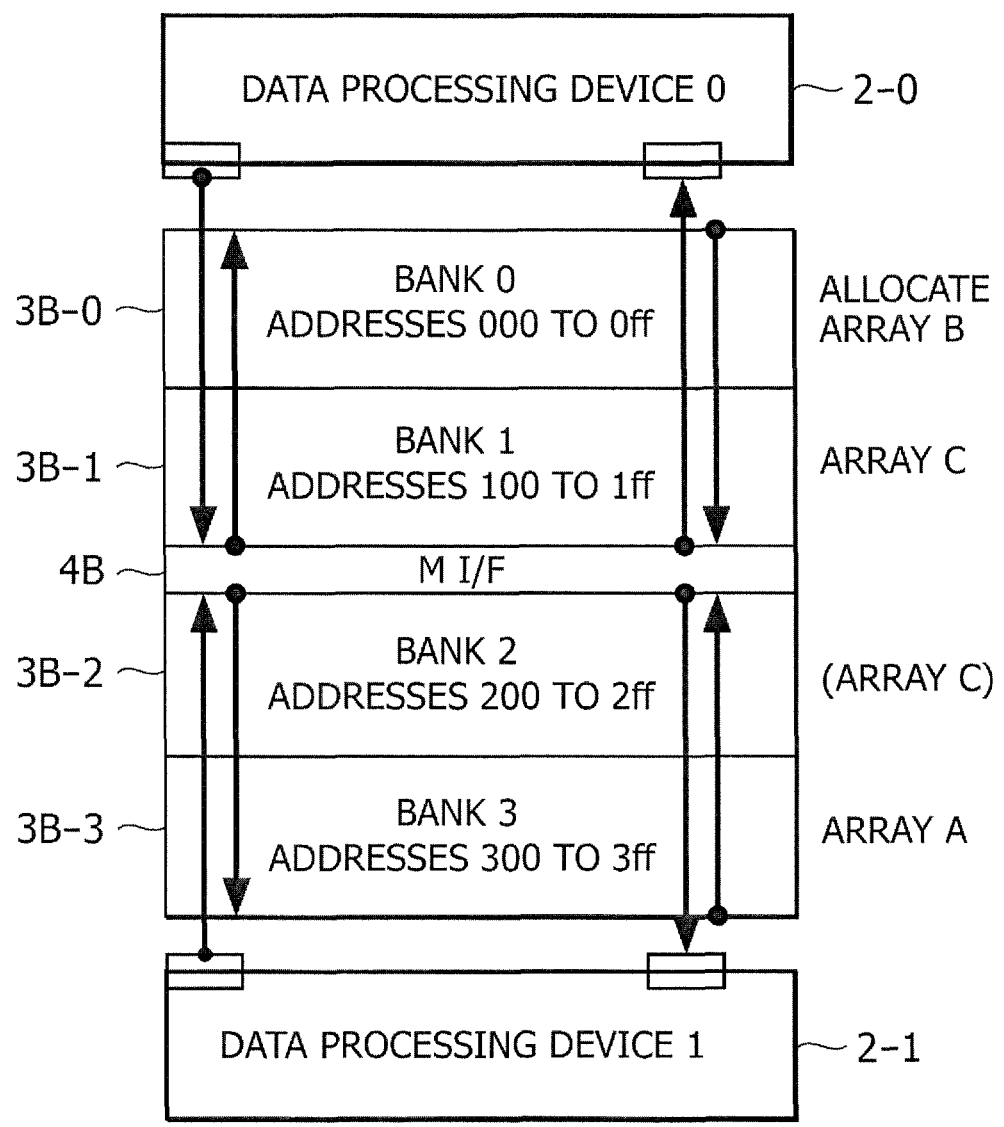
FIG. 16 is a diagram showing an example of the parameter allocation to a memory in FIG. 14 and FIG. 15.

FIG. 16 is a diagram showing an example of the parameter allocation to the memory in FIG. 14 and FIG. 15.

FIG. 17 is a table showing a parameter list associated with FIG. 16.

This example shows a case where the arrays A, B, and C each having 256 elements are read and written for number of times described below, respectively.

That is, this is a case where the array A is read and written by the data processing device 2-1 for 200 times; the array B is done so by the data processing device 2-0 for 65 times; the array C is done so by the data processing device 2-0 for 5 times and is done so by the data processing device 2-1 for 2 times.

In the embodiment, the layout is so designed that the memory address and the power consumption have a correlation. Thus, the array A having a large number of accesses, i.e., 200 times, to the data processing device 2-1 is allocated (placed) in the memory bank 3B-3. The array data C having a small number of accesses, i.e., 2 times, to the data processing device 2-1 is allocated (placed) in the memory bank 3B-2.

The array B having a large number of accesses, i.e., 65 times, to the data processing device 2-0 is allocated (placed) in the memory bank 3B-0, and the array data C having a small number of accesses, i.e., 5 times, to the data processing device 2-0 is allocated (placed) in the memory bank 3B-1.

Thus, the reduction in power consumption is achieved.

Subsequently, a parameter allocation method according to an embodiment of the present invention is described.

For the parameter allocation method, a first method of allocating an unshared parameter and a shared parameter, in this order; a second method of allocating all parameters together; a third method of allocating a local parameter and a global parameter, in this order may be employed.

Figure 18:
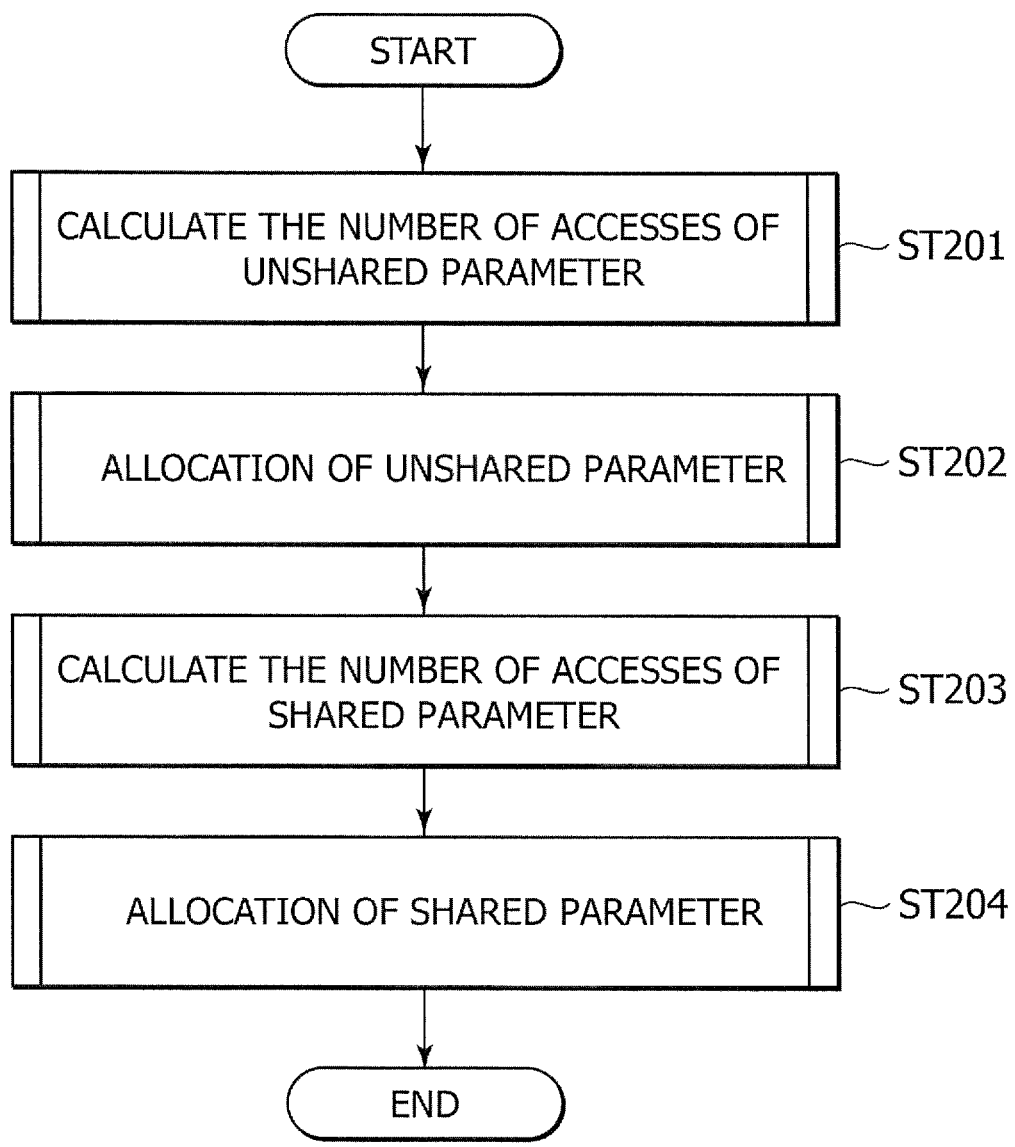
FIG. 18 is a flowchart showing a first method of the parameter allocation according to an embodiment of the present invention.

FIG. 18 is a flowchart showing the first method of the parameter allocation according to an embodiment of the present invention.

In the first method, a number of accesses of the unshared parameter is calculated (ST201), and the unshared parameter is allocated (ST202).

A number of accesses of the shared parameter is calculated (ST203), and the shared parameter is allocated (ST204).

Thus, in the first method, the allocation is performed the unshared parameter and the shared parameter, in this order.

Figure 19:
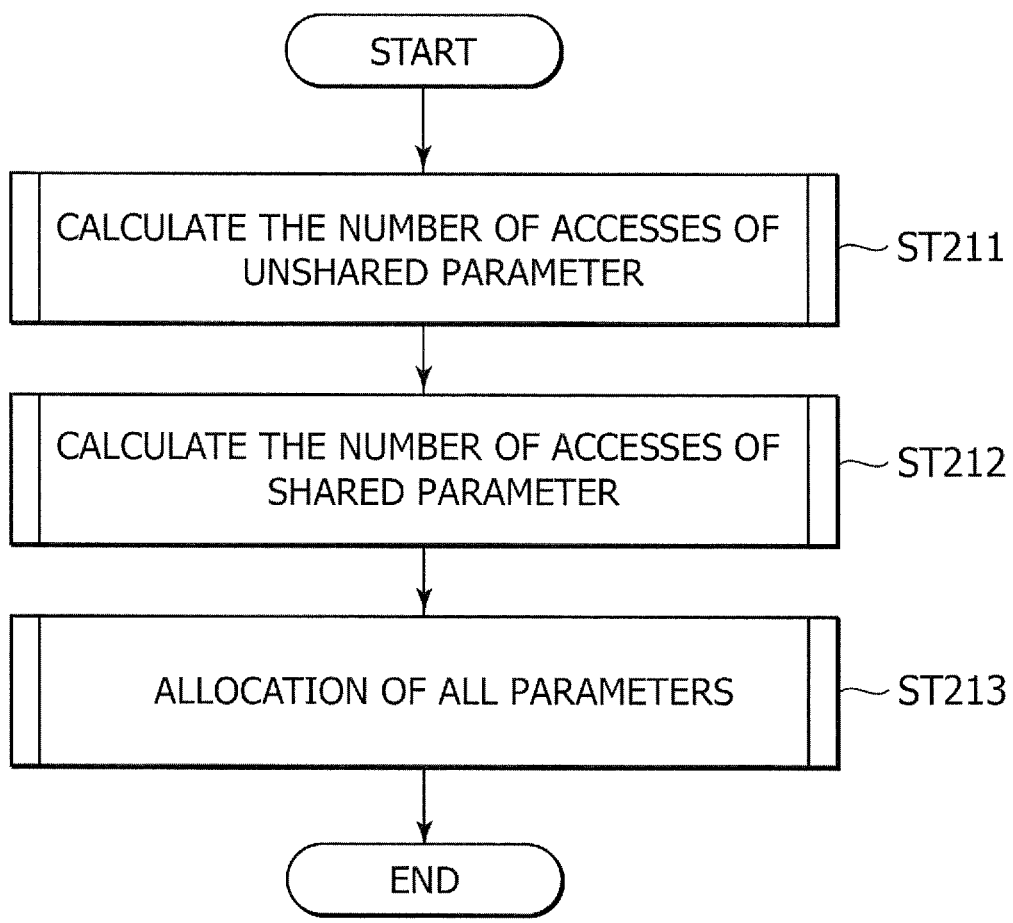
FIG. 19 is a flowchart showing a second method of the parameter allocation according to an embodiment of the present invention.

FIG. 19 is a flowchart showing the second method of the parameter allocation according to an embodiment of the present invention.

In the second method, a number of accesses of the unshared parameter is calculated (ST211), a number of accesses of the shared parameter is calculated (ST212), and all the parameters are allocated (ST213).

Thus, in the second method, all the parameters are allocated together.

Subsequently, an example of an integrated device in which the integrated device according to an embodiment of the present invention is applied as a more specific memory system configuration is described.

Figure 20:
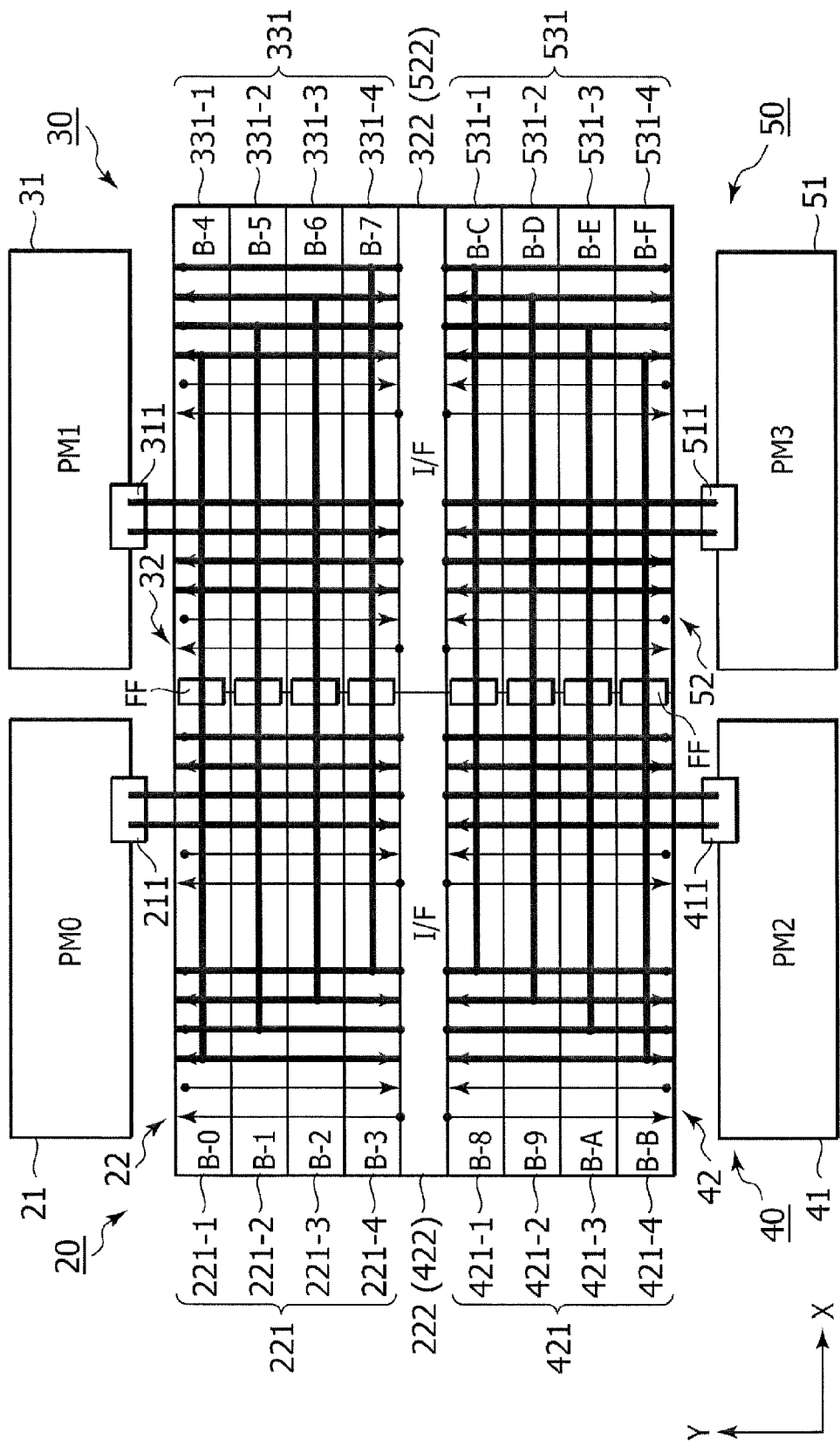
FIG. 20 is a system configuration diagram showing one example of an integrated device adopting a memory system according to an embodiment of the present invention.

FIG. 20 is a system configuration diagram showing one example of the integrated device using the memory system according to an embodiment of the present invention.

An integrated device 10 of FIG. 20 has, as main components, a plurality (4 in FIG. 20) of access clusters 20, 30, 40, and 50.

The respective access clusters 20 to 50 have processing modules 21, 31, 41, and 51, as the data processing devices, and memory macros (memory systems) 22, 32, 42, and 52, respectively.

The memory macro 22 of the access cluster 20 includes a plurality (4 in FIG. 20) of memory banks 221-1 to 221-4. In FIG. 20, to avoid complications in the figure, the memory banks 221-1 to 221-4 are indicated as B-0, B-1, B-2, and B-3.

The memory macro 32 of the access cluster 30 includes a plurality (4 in FIG. 20) of memory banks 331-1 to 331-4. In FIG. 20, to avoid complications in the figure, the memory banks 331-1 to 331-4 are indicated as B-4, B-5, B-6, and B-7.

The memory macro 42 of the access cluster 40 includes a plurality (4 in FIG. 20) of memory banks 421-1 to 421-4. In FIG. 20, to avoid complications in the figure, the memory banks 421-1 to 421-4 are indicated as B-8, B-9, B-A, and B-B.

The memory macro 52 of the access cluster 50 includes a plurality (4 in FIG. 20) of memory banks 531-1 to 531-4. In FIG. 20, to avoid complications in the figure, the memory banks 531-1 to 531-4 are indicated as B-C, B-D, B-E, and B-F.

Figure 21:
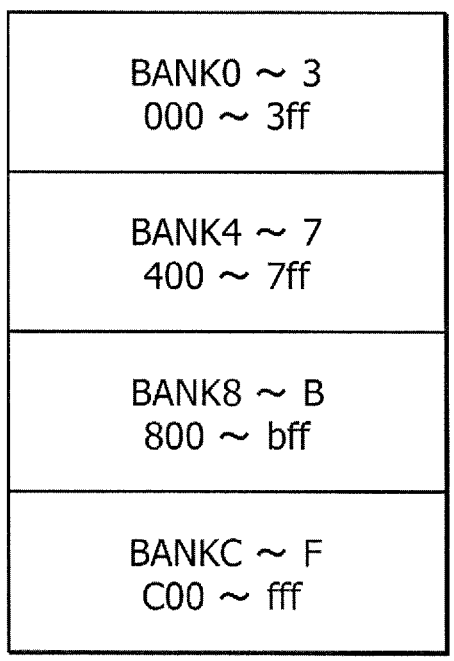
FIG. 21 is a diagram showing a memory map of the integrated device in FIG. 20.

FIG. 21 is a diagram showing a memory map of the integrated device in FIG. 20.

In this example, addresses 000 to 3ff are assigned in hexadecimal to the memory banks 221-1 to 221-4 (B-0, B-1, B-2, and B-3) of the access cluster 20.

Addresses 400 to 7ff are assigned in hexadecimal to the memory banks 331-1 to 331-4 (B-4, B-5, B-6, and B-7) of the access cluster 30.

Addresses 800 to bff are assigned in hexadecimal to the memory banks 421-1 to 421-4 (B-8, B-9, B-A, and B-B) of the access cluster 40.

Addresses c00 to fff are assigned in hexadecimal to the memory banks 531-1 to 531-4 (B-C, B-D, B-E, and B-F) of the access cluster 50.

In this case also, according to the above-described power saving control method, the layout is so designed that the memory address and the data transmission distance have a correlation, i.e., the memory address and the power consumption have a correlation.

Herein, a description of a specific layout thereof is omitted.

Figure 22:
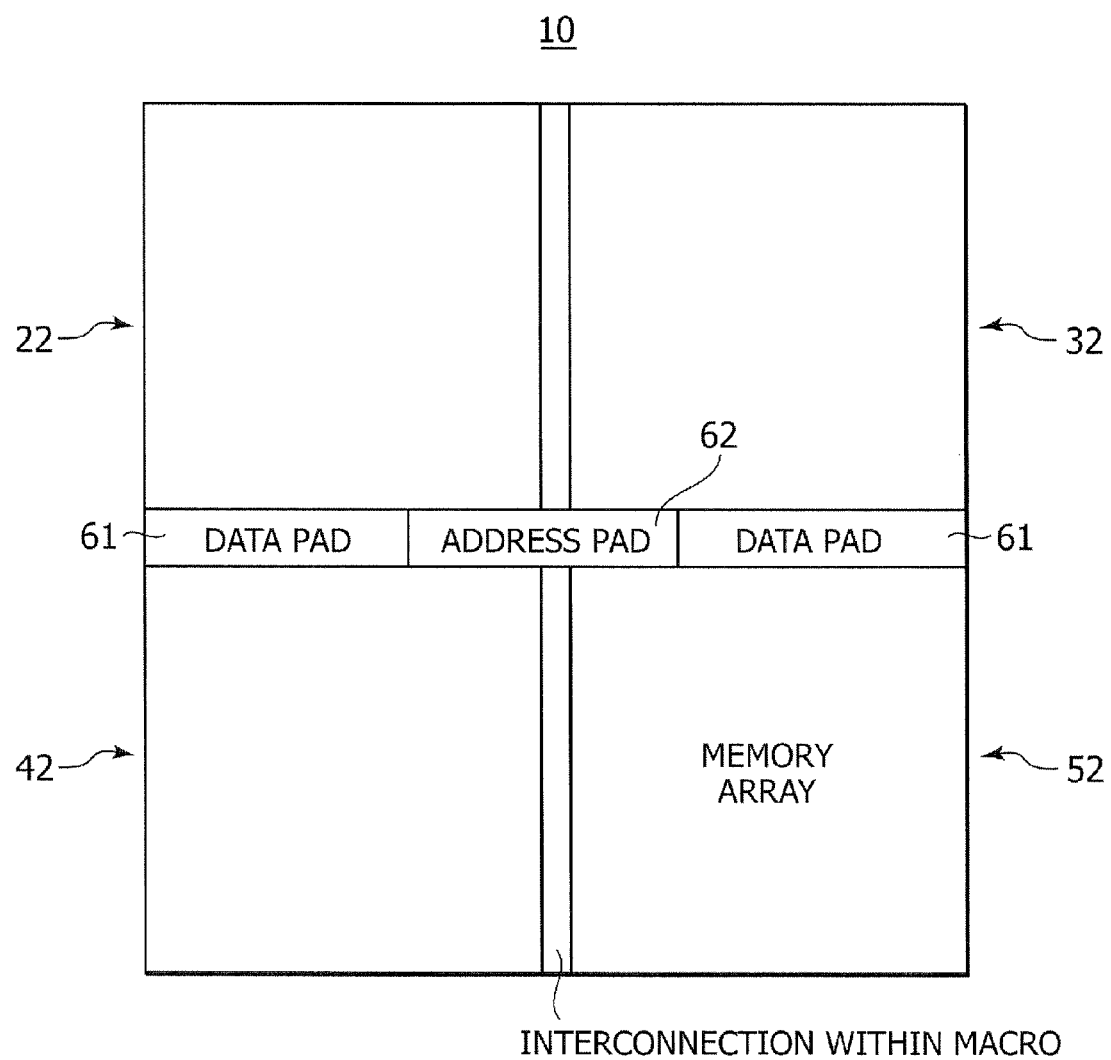
FIG. 22 is a diagram for describing an overview of an interconnection example of a memory macro of the integrated device in FIG. 20.

FIG. 22 is a diagram for describing an overview of an interconnection example of the memory macro of the integrated device in FIG. 20.

In this example, interconnections to the memory macros 22, 32, 42, and 52 are connected via a data pad 61 and an address pad 62 to another block, as shown in FIG. 22.

Hereinafter, a configuration example of a memory system in which the power saving control method according to an embodiment of the present invention may be adopted is specifically described.

The access cluster 20 includes: the processing module (PM0) 21, as the data processing device including a computing unit having one (or a plurality of) input/output port(s) 211; and a memory macro (memory system) 22 such as a DRAM and an SRAM accessible by the processing module 21.

The memory macro 22 includes a memory macro 221 including a plurality of banks 221-1 to 221-n (in this example, n=4) aligned in a Y direction (first direction) of a rectangular coordinate system set in FIG. 20; and a memory interface (I/F) 222 for matching a data transfer between the respective banks 221-1 to 221-$n$ of the memory macro 221 and the processing module 21, performing access control to the respective banks 221-1 to 221-$n$, and so on.

The memory interface 222 is placed in a position to oppose an allocation position of the processing module 21 while sandwiching an allocation area of the memory macro 221 therebetween.

The input/output port 211 of the processing module 21, the respective memory interfaces 222, and the respective memory banks 221-1 to 221-$n$ are connected by interconnections wired in a matrix (lattice state) in the Y direction (first direction) and an X direction (second direction) in (an upper layer of) the allocation area of the memory macro 221.

In an example of FIG. 20, the input/output port 211 of the processing module 21 and the memory interface 222 are connected linearly by a connecting interconnection in the Y direction (first direction).

In the connecting interconnections, command information interconnections (command address interconnections) and data interconnections (write data interconnections and read data interconnections or common interconnections) are multilayer-interconnected. The connecting interconnection will be explained in detail later.

The access cluster 30 includes the processing module (PM1) 31 having one (or a plurality of) input/output port(s) 311; and a memory macro (memory system) 32 such as a DRAM and an SRAM accessible by the processing module 31.

The memory macro 32 includes a memory macro 321 including a plurality of banks 321-1 to 321-$n$ (in this example, n=4) aligned in the Y direction (first direction) of the rectangular coordinate system set in FIG. 20; and a memory interface (I/F) 322 for matching a data transfer between the respective banks 321-1 to 321-$n$ of the memory macro 321 and the processing module 31, performing access control to the respective banks 321-1 to 321-$n$, and so on. In the figure, to avoid complications, notations of banks, etc., of the memory macro 321 are omitted.

The memory interface 322 is placed in a position to face an allocation position of the processing module 31 while sandwiching an allocation area of the memory macro 321 therebetween.

The input/output port 311 of the processing module 31, the respective memory interfaces 322, and the respective memory banks 321-1 to 321-$n$ are connected by connecting interconnections wired in a matrix (lattice state) in the Y direction (first direction) and the X direction (second direction) in (an upper layer of) the allocation area of the memory macro 321.

In the example of FIG. 20, the input/output port 311 of the processing module 31 and the memory interface 322 of the memory macro 32 are connected linearly by the connecting interconnection in the Y direction (first direction).

In the connecting interconnections, command information interconnections (command address interconnections) and data interconnections (write data interconnections and read data interconnections or common interconnections) are multilayer-interconnected. The connecting interconnection will be explained in detail later.

The access cluster 30 is placed in parallel with the access cluster 20 in the X direction (second direction). The memory banks respectively corresponding to a matrix arrangement of the memory macros are connected by buses wired in the X direction (second direction).

The respective banks 321-1 to 321-$n$ of the memory macro 321 of the access cluster 30 and the respective banks 221-1 to 221-$n$ of the memory macro 221 of the access cluster 20 are each placed in parallel in the X direction to have equal two-dimensional heights in the Y direction.

In the connecting interconnections between the respective banks 321-1 to 321-$n$ of the memory macro 321 and the respective banks 221-1 to 221-$n$ of the memory macro 221 placed in parallel in the X direction, flip-flops FF are placed as buffers.

The access cluster 40 includes a processing module (PM2) 41 having one (or a plurality of) input/output port(s) 411, and a memory macro (memory system) 42 such as a DRAM and an SRAM accessible by the processing module 41.

The memory macro 42 includes a memory macro 421 including a plurality of banks 421-1 to 421-$n$ (in this example, n=4) aligned in the Y direction (first direction) of the rectangular coordinate system set in FIG. 20; and a memory interface (I/F) 422 for matching a data transfer between the respective banks 421-1 to 421-$n$ of the memory macro 421 and the processing module 41, performing access control to the respective banks 421-1 to 421-$n$, and so on.

The memory interface 422 is placed in a position to oppose an allocation position of the processing module 41 while sandwiching an allocation area of the memory macro 421 therebetween.

The input/output port 411 of the processing module 41, the memory interface 422, and the respective memory banks 421-1 to 421-$n$ are connected by connecting interconnections wired in a matrix (lattice form) in the Y direction (first direction) and the X direction (second direction) in (an upper layer of) the allocation area of the memory macro 421.

In the example of FIG. 20, the input/output port 411 of the processing module 41 and the memory interface 422 of the memory macro 42 are connected linearly by the connecting interconnection in the Y direction (first direction).

In the connecting interconnections, command information interconnections (command address interconnections) and data interconnections (write data interconnections and read data interconnections or common interconnections) are multilayer-interconnected. The connecting interconnection will be explained in detail later.

The access cluster 20 and the access cluster 40 are symmetrically placed via the interface in the Y direction (first direction). The memory interfaces 222 and 422 placed in respectively corresponding positions are connected.

In the embodiment, the respective memory systems of a plurality of symmetrically placed access clusters 20 and 40 share the memory interface.

Specifically, the memory interface 222 of the memory macro 22 and the memory interface 422 of the memory macro 42 are configured to share each other.

The shared memory interfaces include an arbitrating unit for arbitrating accesses to the other memory systems. The arbitrating unit will be explained later.

The access cluster 50 includes a processing module (PM3) 51 having one (or a plurality of) input/output port(s) 511, and a memory macro (memory system) 52 such as a DRAM and an SRAM accessible by the processing module 51.

The memory macro 52 includes a memory macro 521 including a plurality of banks 521-1 to 521-$n$ (in this example, n=4) aligned in the Y direction (first direction) of the rectangular coordinate system set in FIG. 20, and a memory interface (I/F) 522 for matching a data transfer between the respective banks 521-1 to 521-$n$ of the memory macro 521 and the processing module 51, performing access control to the respective banks 521-1 to 521-$n$, and so on. In the figure, to avoid complications, notations of banks, etc., of the memory macro 521 are omitted.

The memory interface 522 is placed in a position to oppose an allocation position of the processing module 41 while sandwiching an allocation area of the memory macro 521 therebetween.

The input/output port 511 of the processing module 51, the memory interface 522, and the respective memory banks 521-1 to 521-*n* are connected by connecting interconnections wired in a matrix (lattice state) in the Y direction (first direction) and the X direction (second direction) in (an upper layer of) the allocation area of the memory macro 521.

In the example of FIG. 20, the input/output port 511 of the processing module 51 and the memory interface 522 of the memory macro 52 are connected linearly by the connecting interconnection in the Y direction (first direction).

In the connecting interconnections, command information interconnections (command address interconnections) and data interconnections (write data interconnections and read data interconnections or common interconnections) are multilayer-interconnected. The connecting interconnection will be explained in detail later.

The access cluster 50 is placed in parallel with the access cluster 40 in the X direction (second direction). The memory banks respectively corresponding to a matrix arrangement of the plurality of memory macros are connected by buses wired in the X direction (second direction).

The respective banks 521-1 to 521-*n* of the memory macro 521 of the access cluster 50 and the respective banks 421-1 to 421-*n* of the memory macro 421 of the access cluster 40 are each placed in parallel in the X direction to have equal two-dimensional heights in the Y direction.

In the connecting interconnections between the respective banks 521-1 to 521-*n* of the memory macro 521 and the respective banks 421-1 to 421-*n* of the memory macro 421 placed in parallel in the X direction, flip-flops FF are placed as buffers.

The access cluster 30 and the access cluster 50 are symmetrically placed via the interface in the Y direction (first direction). The memory interfaces 322 and 522 placed in respectively corresponding positions are connected.

In the embodiment, the respective memory systems of a plurality of symmetrically placed access clusters 30 and 50 share the memory interface.

Specifically, the memory interface 322 of the memory macro 32 and the memory interface 522 of the memory macro 52 are configured to share each other.

The shared memory interfaces include arbitrating units for arbitrating accesses to the other memory systems. The arbitrating units will be explained later.

The integrated device 10 of the embodiment described above is configured to have the following characteristics.

The integrated device 10 utilizes a configuration such that memories and logics are combined in a single chip to map a bus system by general cross bars (X-bars) on the memory, as shown in FIG. 20.

In recent manufacturing technology, the number of interconnection layers increases resulting from an increase in logic circuit scale. In memory circuits, however, even if the scale increases, only a few number of required interconnection layers increase. As a result, the interconnection layers on an upper side of the memories are often left unused. When the unused space is utilized to pass the interconnections of the bus system on the memory system, the bus system may be constructed with nearly no increase in memory area.

In the embodiment, to avoid a frequency decrease resulting from an increase in interconnection length, the buses forming the connecting interconnections are pipelined.

Further, to avoid an increase in interconnection area, the interconnections between the respective processing modules and memory systems are not connected on a one-to-one basis, but are wired commonly.

The memory interface I/F of each memory system is placed at a layout center in the Y direction (first direction). This is to make the distance between each processing module and each memory interface I/F equal and the shortest, thereby reducing an amount of interconnections.

When the memory interfaces I/F exists at the layout center, resources within the memory may be effectively utilized twice as much. This is because the resources within the memory are divided into two in the Y direction (first direction) and X direction (second direction) configurations of the plurality of access clusters 20, 30, 40, and 50 of FIG. 20, when the memory interface I/F is defined as a boundary, and thus, even when a plurality of accesses occur simultaneously to an identical memory, the simultaneous access may be possible if the accesses are made to different directions when the memory interface I/F is defined as a boundary.

In FIG. 20, the connecting interconnections in the X direction (second direction or horizontal direction) run vertically in the X direction (second direction) starting with the respective processing modules PM (0 to 3) to access to all the memory systems.

Figure 23:
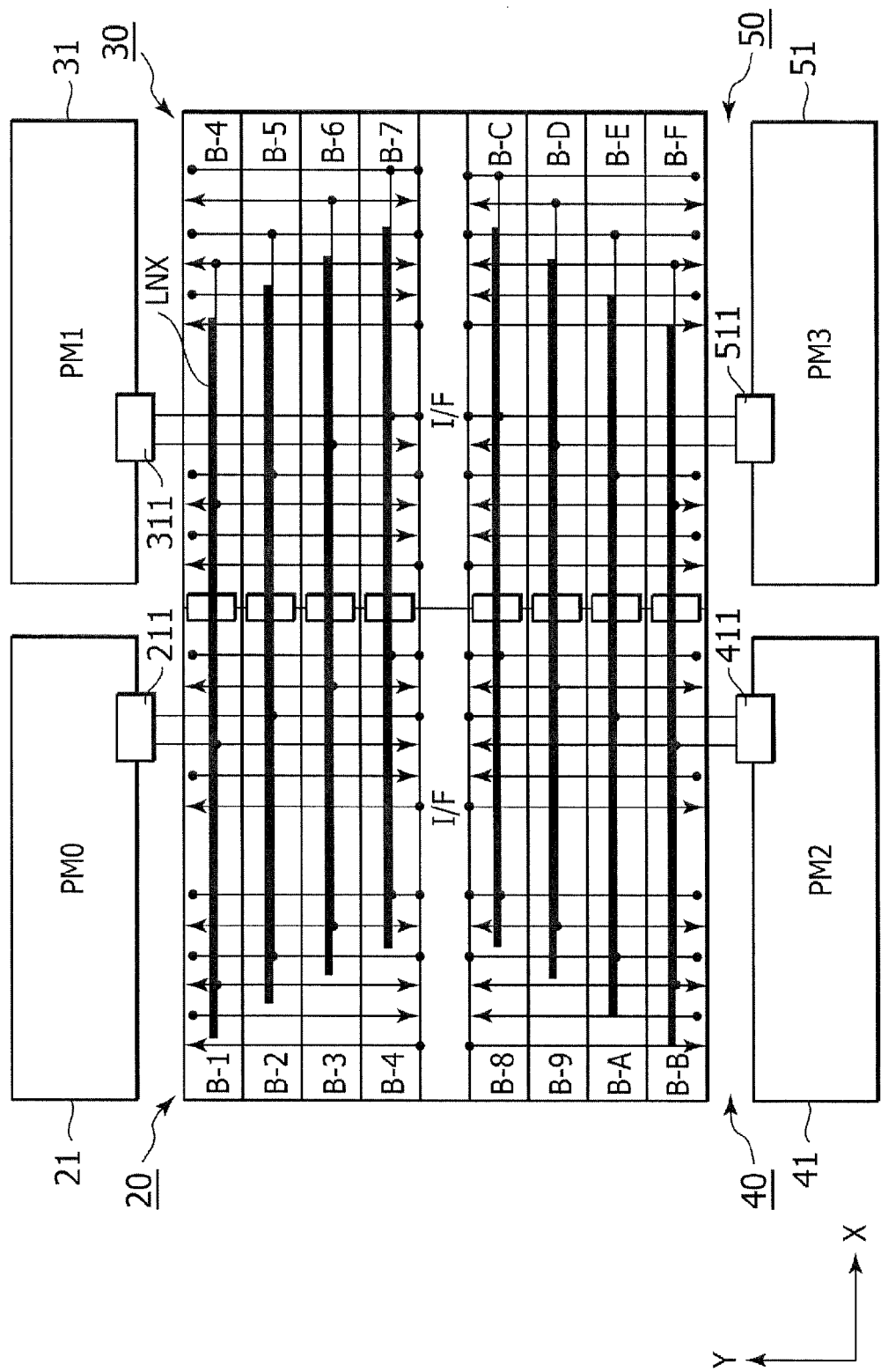
FIG. 23 is a diagram showing an example in which connecting interconnections in an X direction (second direction or horizontal direction) in FIG. 20 are utilized to perform an X direction (second direction) memory-to-memory transfer.

When the interconnections are utilized, as indicated by interconnections LNX in FIG. 23, it may perform also a memory-to-memory transfer in the X direction (second direction).

The same interconnections in the X direction (second direction) are merely switched between a connection mode of FIG. 20 and a connection mode of FIG. 23 by setting the mode, and thus, a high-speed memory-to-memory transfer may be achieved with almost no area increase.

This X-direction transfer mode (horizontal transfer mode) may be deleted for applications not requiring this transfer mode.

Figure 24:
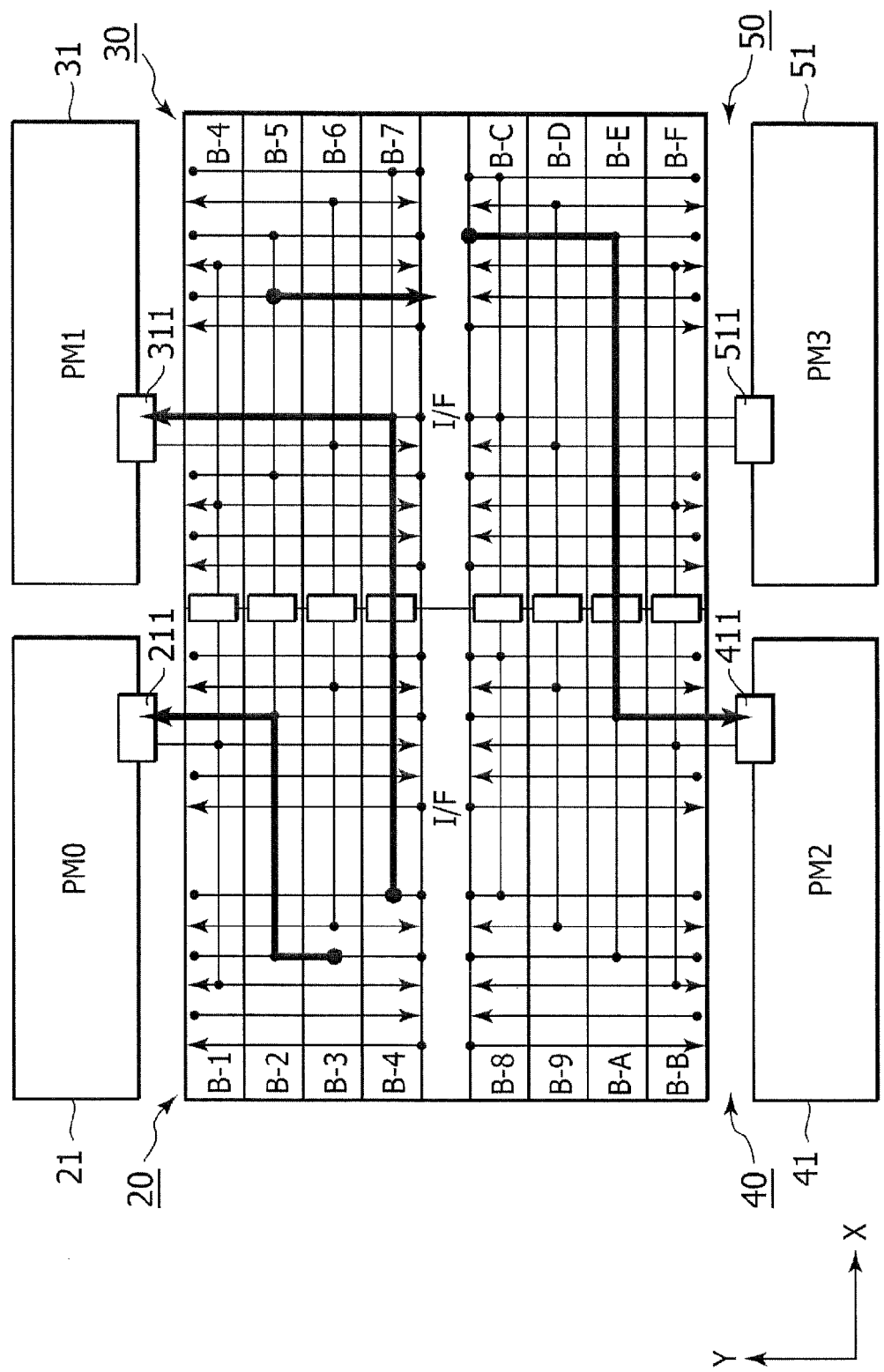
FIG. 24 is a diagram for describing that it is possible to make a direct access when there is an access-destination bank between a data bus and a memory interface I/F in the integrated device in FIG. 20.

The integrated device 10 maps the bus system on the memory systems, and thus, as shown in FIG. 24, when there is any access-destination bank between the data bus and the memory interface I/F, a direct access may be possible.

In an example of FIG. 24, the processing module 21 (PM0) of the access cluster 20 accesses the bank 221-2 of the memory macro 221 at a left end, and the processing module 31 (PM1) of the access cluster 30 accesses the bank 221-1 of the same memory macro 221.

As a result, shortening of access latency may be achieved.

In the integrated device 10 of the embodiment, as long as there is an access destination in progress of a route, even if the simultaneous access is made to the identical memory, such access may be possible if the banks are different and interconnections LNY in the Y direction (first direction or vertical direction) do not conflict.

As a result, as shown in FIG. 24 and FIG. 25, as compared to a case where the X-bars are simply mapped, a throughput may be improved without increasing the area.

As described above, in an example of FIG. 24, the processing module 21 (PM0) of the access cluster 20 accesses the bank 221-2 of the memory macro 221 at a left end, and the processing module 31 (PM1) of the access cluster 30 accesses the bank 221-1 of the same memory macro 221.

In the embodiment, as shown in FIG. 25, the simultaneous access may be achieved with a substantially comparable area, and shortening of the latency may also be achieved.

Further, the interconnections in the X direction (second direction or horizontal direction) may need to be individually (privately) provided in the respective processing modules PM. However, according to a required performance and permitted resources (areas), the interconnections in the Y direction (first direction or vertical direction) may be provided in three modes, i.e., a private interconnection PRL, a public interconnection PBL, and a common interconnection CML, as shown in FIGS. 26A to 26C and FIGS. 27A to 27C.

In the private interconnection, as shown in FIGS. 26A and 26B, individual (dedicated) interconnections are laid to the respective processing modules PM, whereby the highest performance may be achieved. However, a largest amount of interconnection resources (areas) may become necessary.

In the public interconnection, when accessing an area beyond the memory interface I/F, read data interconnections and write data interconnections of the respective processing modules PM may be shared.

For example, when accessing an area below the processing modules 21 and 31 (PM0, PM1) of the access clusters 20 and 30 on an upper side in the figure, the interconnections may be shared by bundling the ones for read and write operations together.

When the simultaneous access occurs, the access may be made by only the number of public systems. However, the area may be suppressed.

In the common interconnections, the interconnections are shared in the direction toward the memory interface I/F (up) and that away from the same (down), respectively. Differentiation of a read operation and a write operation may not be necessary. As shown in FIG. 26C, as long as the directions coincide, the resources may be shared among all the processing modules PM.

Figure 27C:
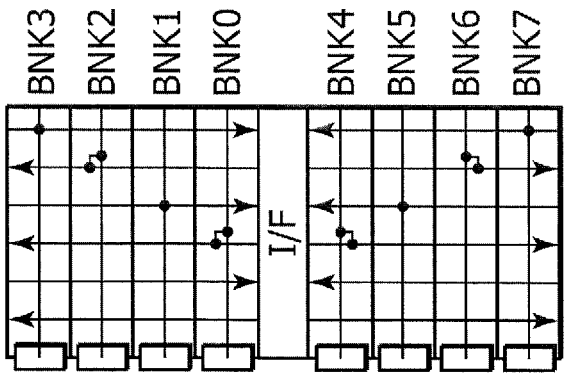
FIGS. 27A-C are diagrams showing an embodiment of the private interconnection PRL, the public interconnection PBL, and the common interconnection CML, as shown in FIGS. 27A to 27C, respectively.
Figure 27B:
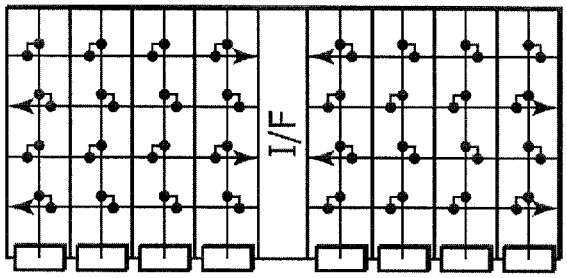
Figure 27A:
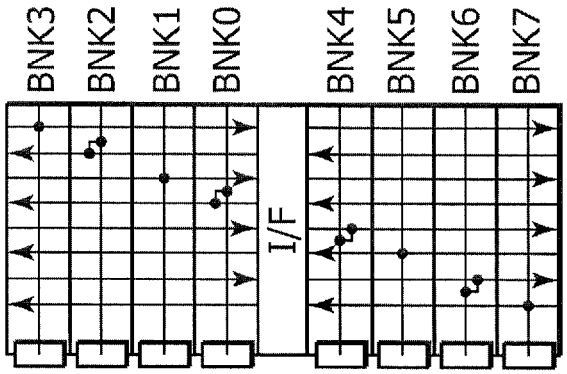

Embodiments implemented by the private interconnections, the public interconnections, and the common interconnections shown in FIGS. 26A to 26C are shown in FIGS. 27A to 27C, respectively.

The integrated device 10 in FIG. 20 shows, as one example, a case where the processing modules 21, 31, 41, and 51 of the respective access clusters have one input/output ports 211, 311, 411, and 511 each. It may also be possible to configure to impart the respective processing modules 21, 31, 41, and 51 with a plurality of input/output ports.

Figure 28:
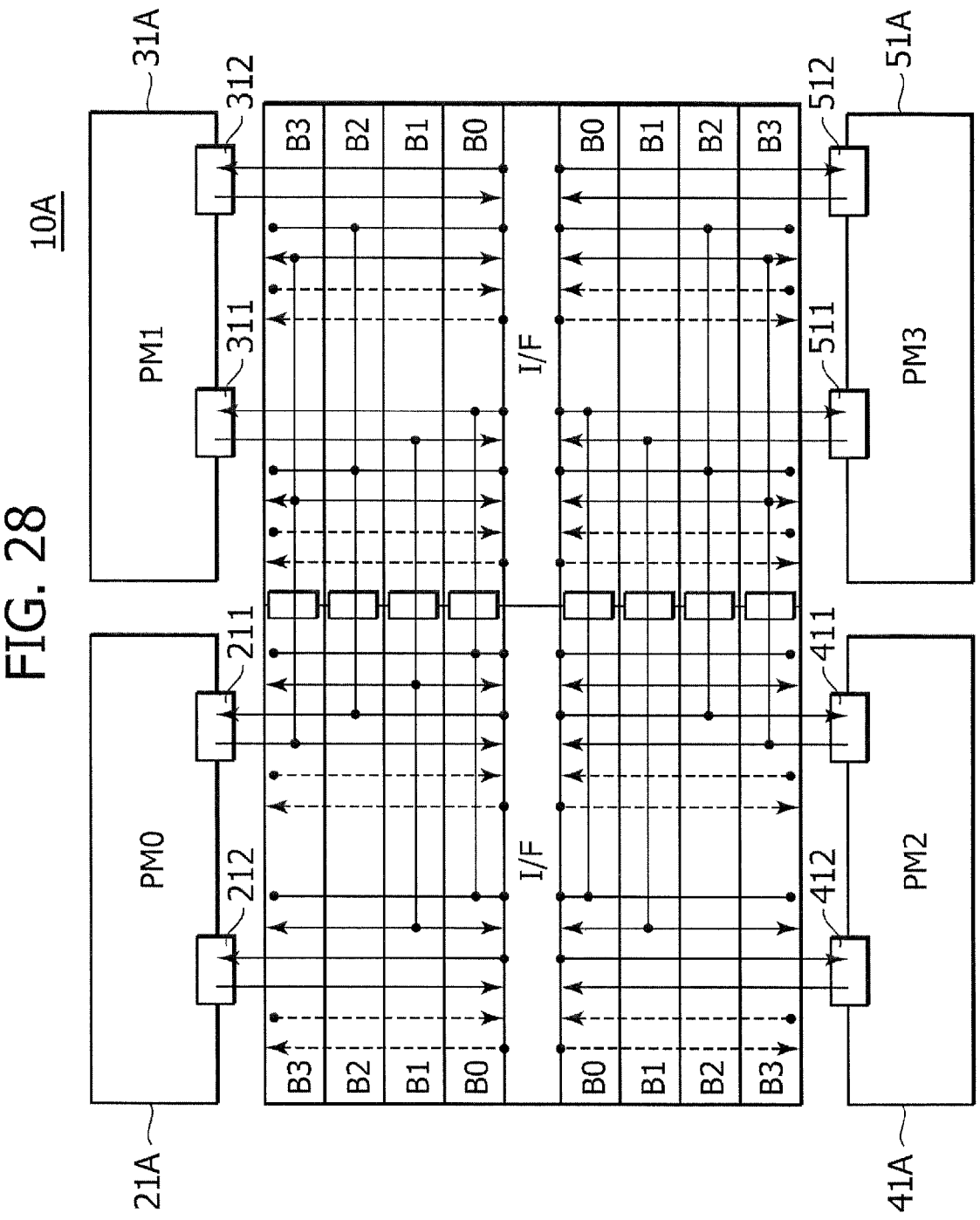
FIG. 28 is a diagram showing a configuration example of an integrated device in which the respective processing modules have a plurality of input/output ports.

FIG. 28 is a diagram showing a configuration example of an integrated device in which each processing module includes a plurality of input/output ports.

In an integrated device 10A of FIG. 28, processing modules 21A, 31A, 41A, and 51A of respective access clusters 20A, 30A, 40A, and 50A include two input/outputs ports: 211 and 212; 311 and 312; 411 and 412; and 511 and 512 each.

Thus, when each processing module PM includes a plurality of ports, the throughput may further be improved. In this case, as shown in FIG. 28, only access-destination areas are divided, and thus, there is almost no increase in area.

In the integrated device 10 of FIG. 20, there is shown, as one example, a configuration including the four access clusters. However, it may also be possible to adopt a configuration including one, two, six, or six or more access clusters.

As described above, the description is given mainly of the system configuration of the integrated device. Hereinafter, while overlapping portions may be found, specific descriptions are further given of the bank configuration, the connecting interconnection, and a configuration and a function of the memory interface.

<Memory Macro Configuration>

In the embodiment, as shown in FIG. 29, the memory macro includes a plurality of memory banks BNK and one memory interface I/F.

In the embodiment, the memory interface I/F is shared by memory systems arranged in the Y direction (first direction).

As shown in FIG. 29, the banks, in principle, equal in number (i.e., half the number of the banks each) are placed physically from a center, i.e., the memory interface I/F.

<Bank Configuration>

Figure 30:
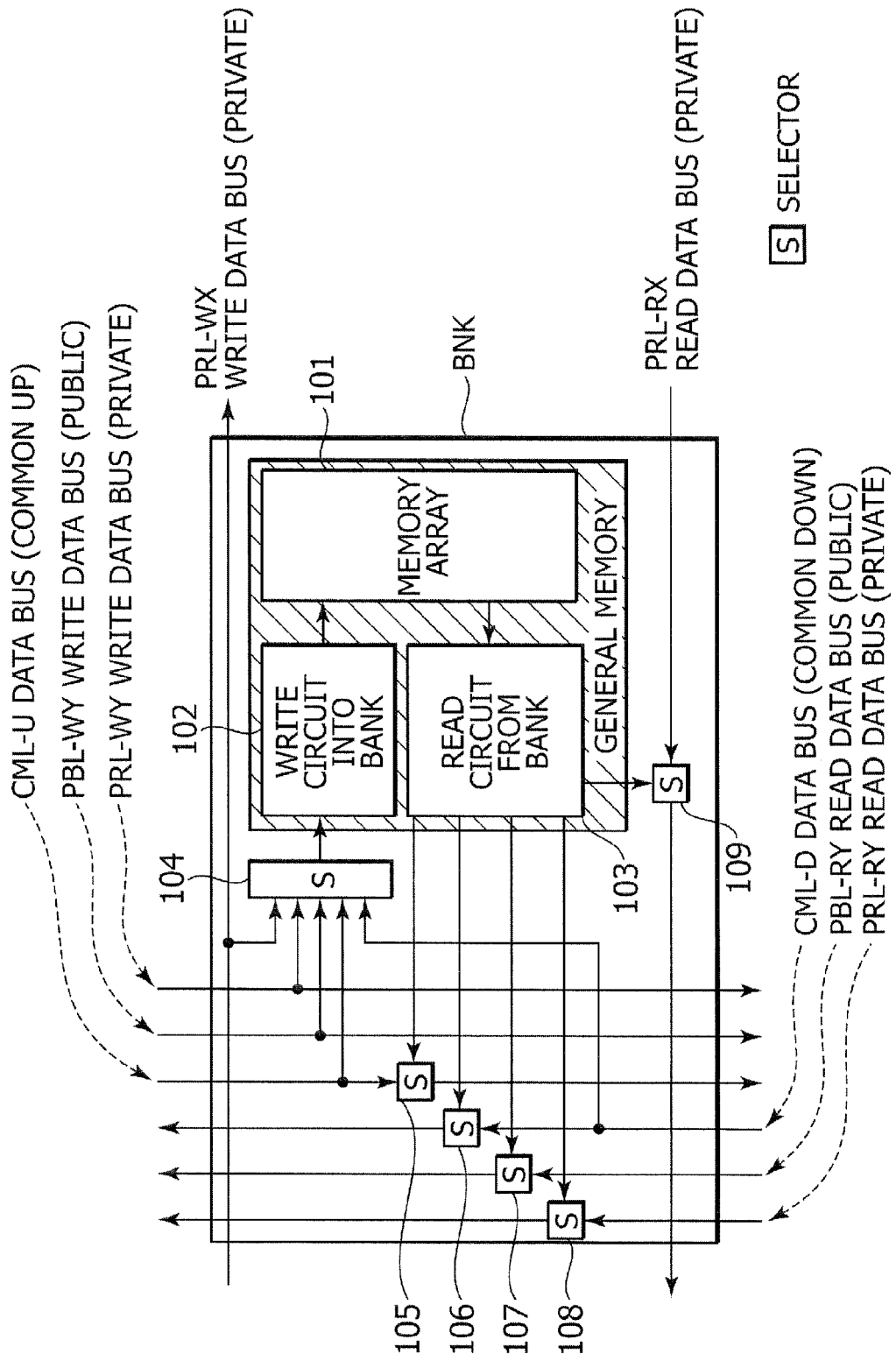
FIG. 30 is a diagram showing a configuration example of a memory bank according to an embodiment of the present invention.

FIG. 30 is a diagram showing a configuration example of the memory bank according to an embodiment of the present invention.

Each bank BNK includes a memory array 101, a write circuit 102, a read circuit 103, and selectors (S) 104 to 109.

In FIG. 30, PRL-WX indicates a private write data bus (interconnection) in the X direction (second direction or horizontal direction); PRL-RX indicates a private read data bus in the X direction (second direction or horizontal direction); PRL-WY indicates a private write data bus in the Y direction (first direction or vertical direction); PBL-WY indicates a public write data bus in the Y direction (first direction or vertical direction); PRL-RY indicates a private read data bus in the Y direction (first direction or vertical direction); PBL-RY indicates a public read data bus in the Y direction (first direction or vertical direction); CML-U indicates a common command address bus in an up direction in the Y direction (first direction or vertical direction); and CML-D indicates a common command address bus in a down direction in the Y direction (first direction or vertical direction), respectively.

Figure 31:
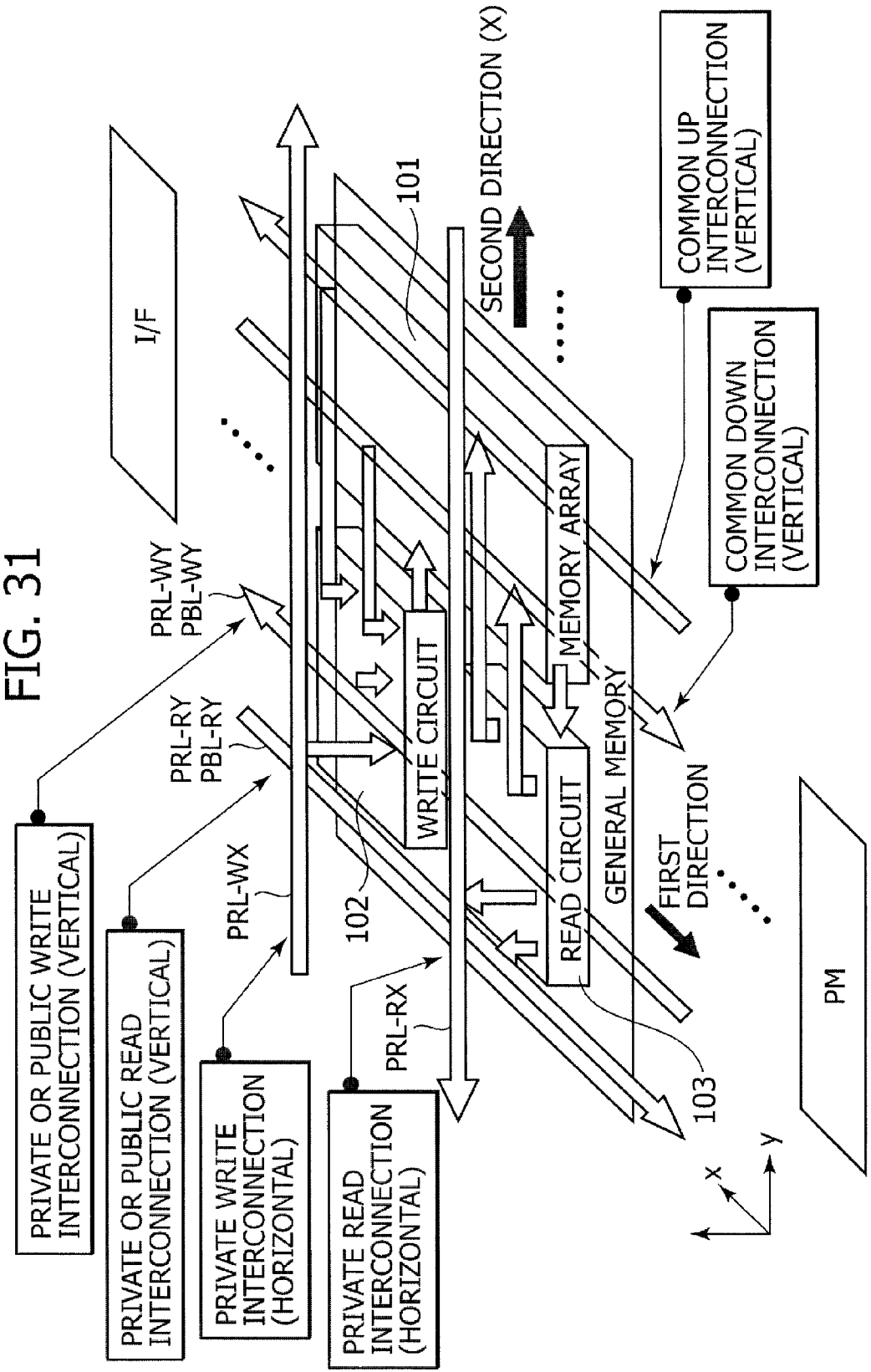
FIG. 31 is a diagram showing a stereoscopic state in which command information interconnections (command address interconnections) and data interconnections (write data interconnections and read data interconnections or common interconnections) are multilayer-interconnected on a bank in an embodiment of the present invention.

In the embodiment, the command information interconnections (command address interconnections) and the data interconnections (write data interconnections and read data interconnections, or common interconnections) are multilayer-interconnected. A stereoscopic state of the interconnections multilayer-interconnected on the bank BNK is shown in FIG. 31.

In each bank BNK, from the write data bus PRL-WX in the horizontal direction (X direction); the write data buses (private, public) PRL-WY and PBL-WY in the vertical direction (Y direction); and the common command address buses CML-U and CML-D (up, down) in the vertical direction, information about writing is selectively sent through the selector 104 to the write circuit 102.

Further, to the read bus PRL-RX in the horizontal direction (X direction); the read data buses (private, public) PRL-RY and PBL-RY in the vertical direction (Y direction); and the common command address buses CML-U and CML-D (up, down) in the vertical direction, the data is selectively transferred via the selectors 105 to 109.

<Horizontal Direction (X direction, Second Direction) Command Address Bus Interconnection>

The command address buses CML-X include information such as an access-destination macro, a bank, an address, read/write, a write mask, an ID, and a burst length.

Figure 32:
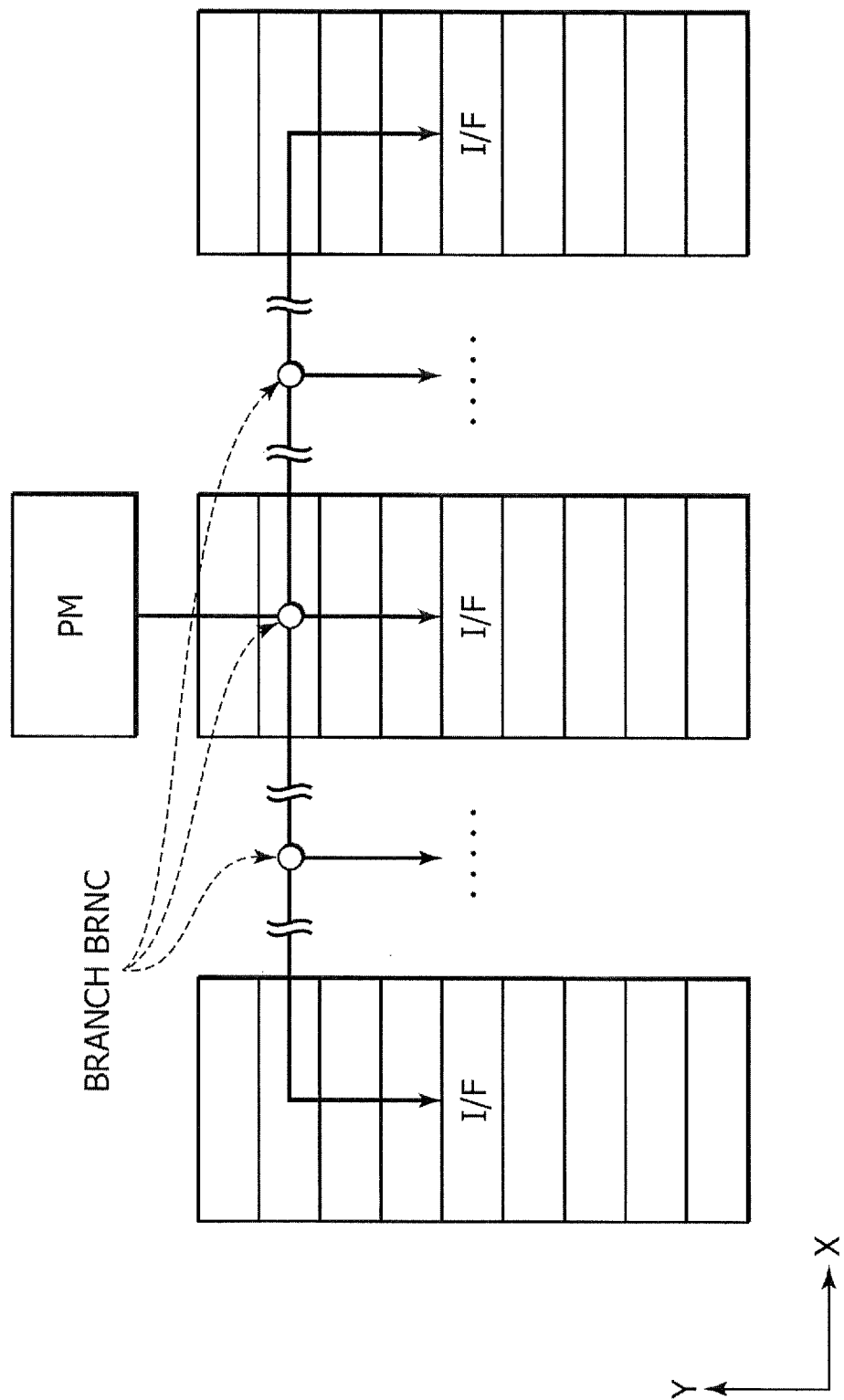
FIG. 32 is a diagram for describing a command address bus interconnection in the horizontal direction (X direction, second direction)

The command address buses CML-X are connected to the memory macros of all memory systems in the X direction (second direction or horizontal direction) from the respective processing modules PM, as shown in FIG. 32.

A huge amount of interconnections may result between the processing modules PM and the respective memory interfaces I/F when a "Point to Point" (hereinafter, abbreviated as a "P2P") connection is used. Accordingly, the common connection is used.

The horizontal direction (X direction) is dedicated (private) for each processing module PM. The connection is branched at the respective branches BRNC according to the access-destination macros.

After being branched, the private bus interconnections are connected to the memory interfaces I/F.

<Horizontal Direction (X direction, Second Direction) Write Data Bus Interconnections>

Figure 33:
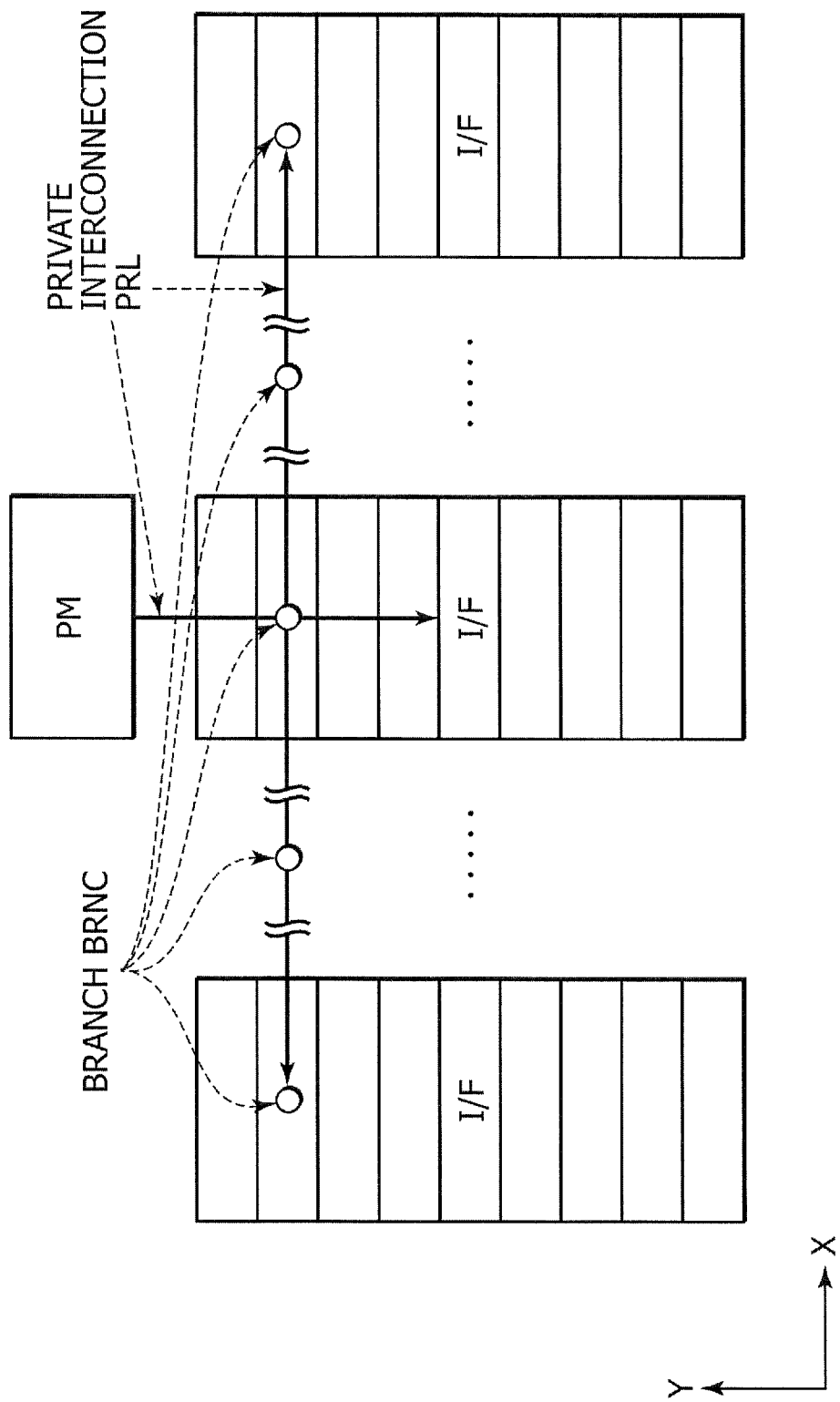
FIG. 33 is a diagram for describing a write data bus interconnection in the horizontal direction (X direction, second direction)

The write data buses PRL-WX in the horizontal direction are the private interconnections, and as shown in FIG. 33, these are not connected by P2P for each access destination, but shared.

The vertical direction (Y direction, first direction) interconnections from the branches BRNC to the memory interfaces I/F are connected by the private, public, or common bus interconnections according to the available interconnection resources.

<Vertical Direction (Y direction, Second Direction) Write Data Bus Interconnections>

Figure 34:
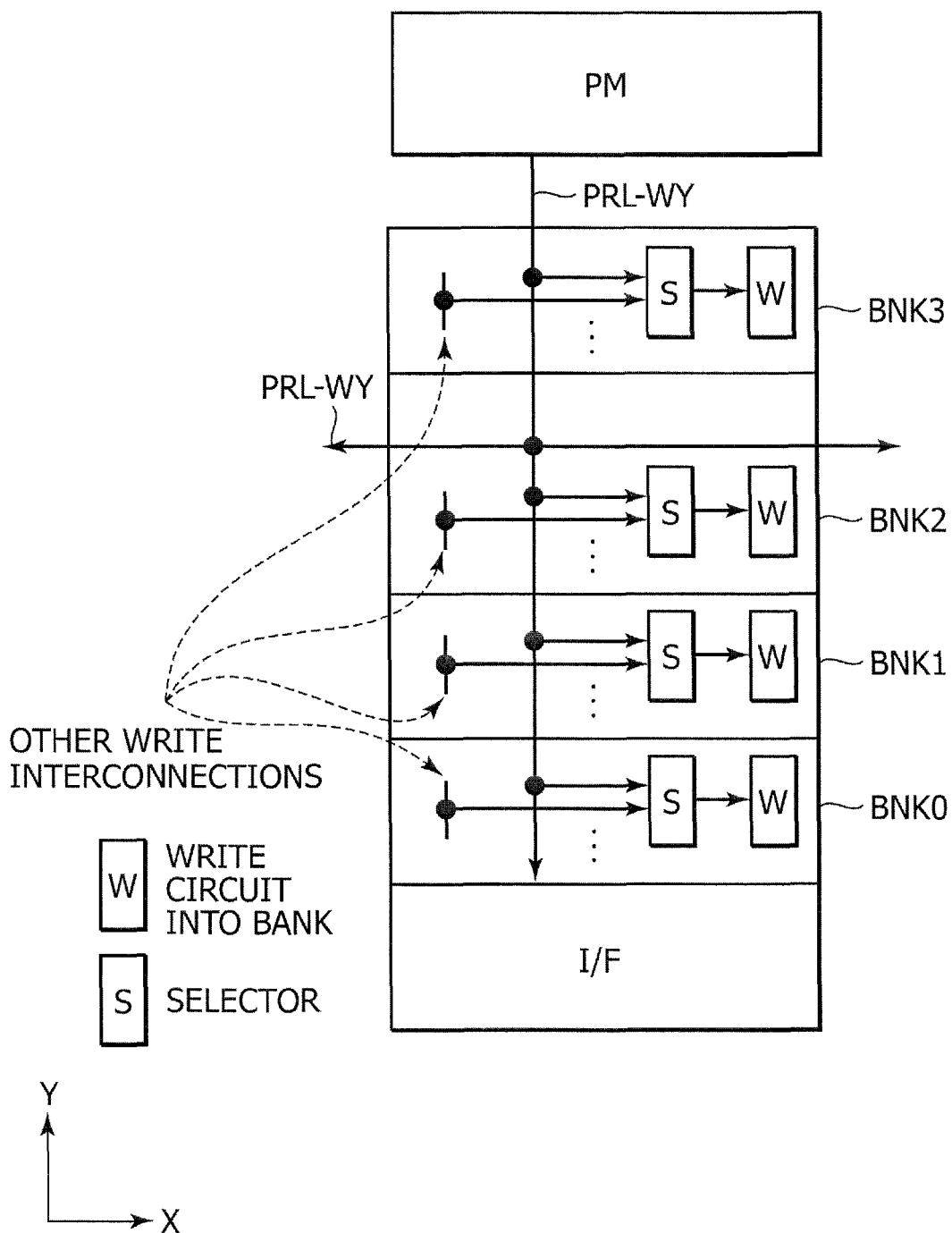
FIG. 34 is a diagram for describing the write data bus interconnection in the vertical direction (Y direction, second direction), and also is a diagram for describing the write data bus in the vertical direction (Y direction, first direction) from a processing module to a memory interface I/F immediately therebeneath.

The write data buses in the vertical direction (Y direction, first direction) from the processing module PM to the memory interface I/F immediately therebeneath are configured to be connected by the private bus PRL-WY, as shown in FIG. 34.

The private write data buses PRL-WY are directly connected to the write data bus PRL-WX wired in the horizontal direction (X direction, second direction) (second bank BNK2 of the banks from top in FIG. 34).

Figure 35:
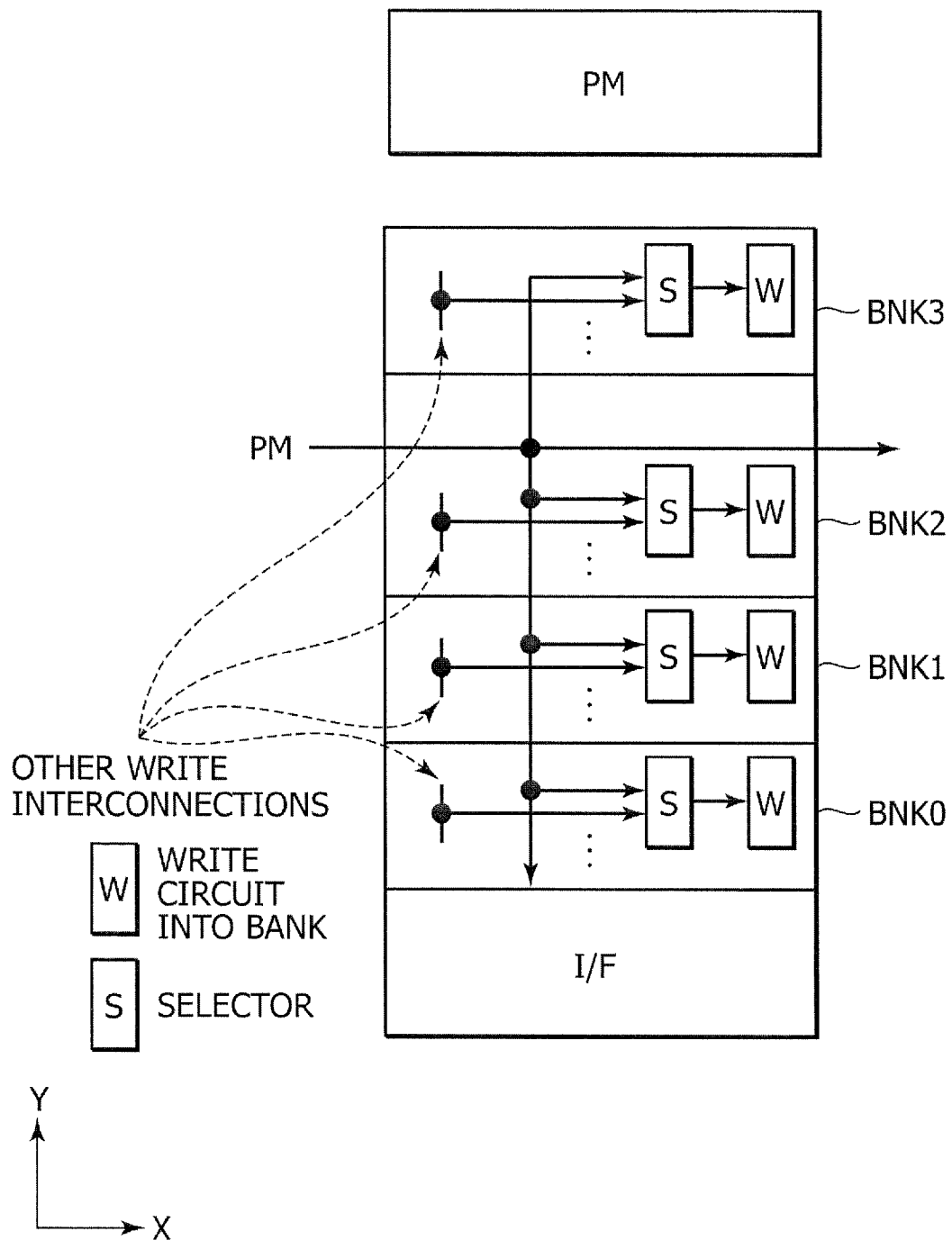
FIG. 35 is a diagram for describing the write data bus interconnection in the vertical direction (Y direction, second direction), and also is a diagram for describing the write data buses in the vertical direction (Y direction, first direction) other than that immediately therebeneath from the processing module.

The private vertical interconnections other than that immediately beneath the processing module PM are directly connected to the write data bus for transferring the data from the horizontal direction (X direction), as shown in FIG. 35. The write data is transferred therefrom to the vertical direction (Y direction).

The vertical direction write buses crossing over the memory interfaces I/F are not to be connected with the horizontal direction interconnections.

Figure 36:
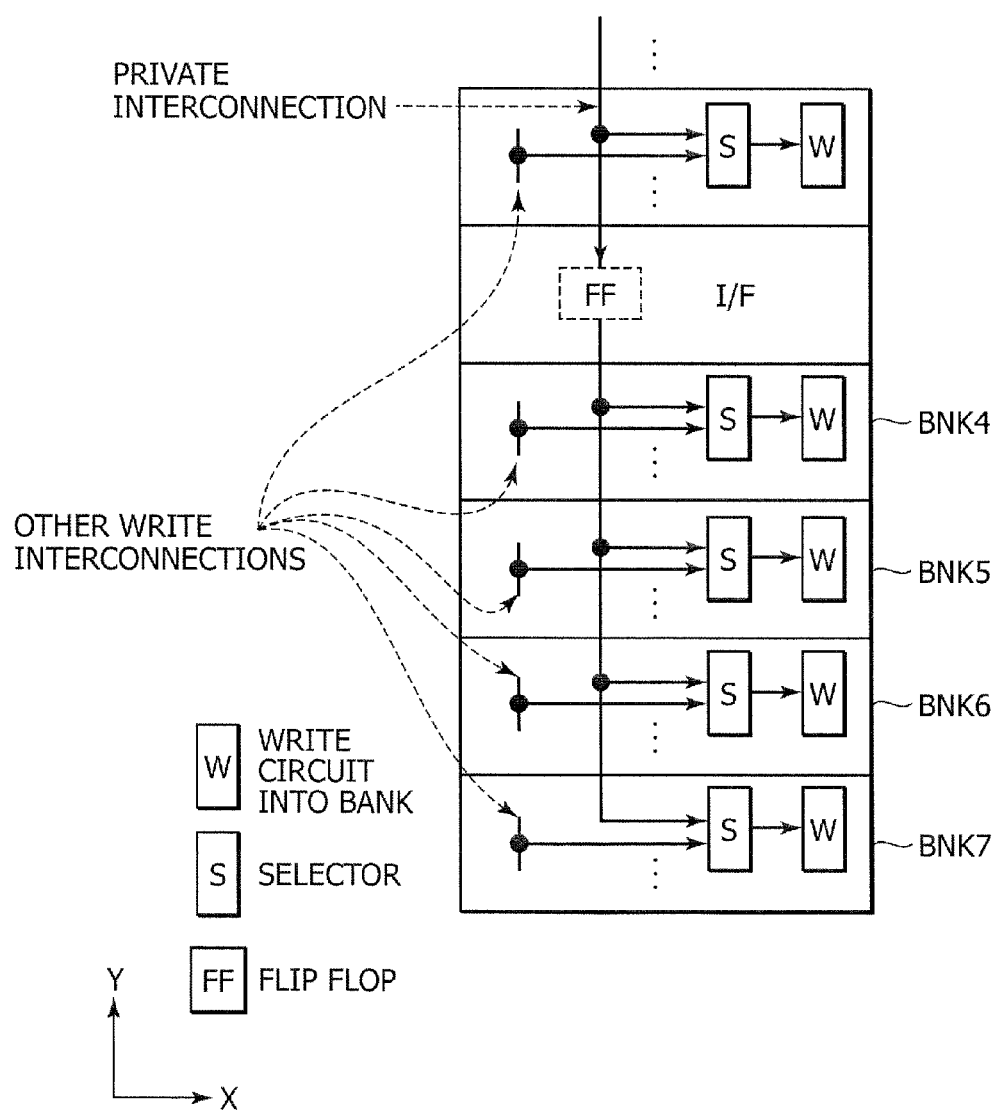
FIG. 36 is a diagram showing an example in which depending on a delay level, a flip-flop FF is provided in the memory interface I/F.

As shown in FIG. 36, depending on a delay level, the write data is once latched by the flip-flop FF in the memory interface I/F, and thereafter, the resultant data is transferred.

Figure 37:
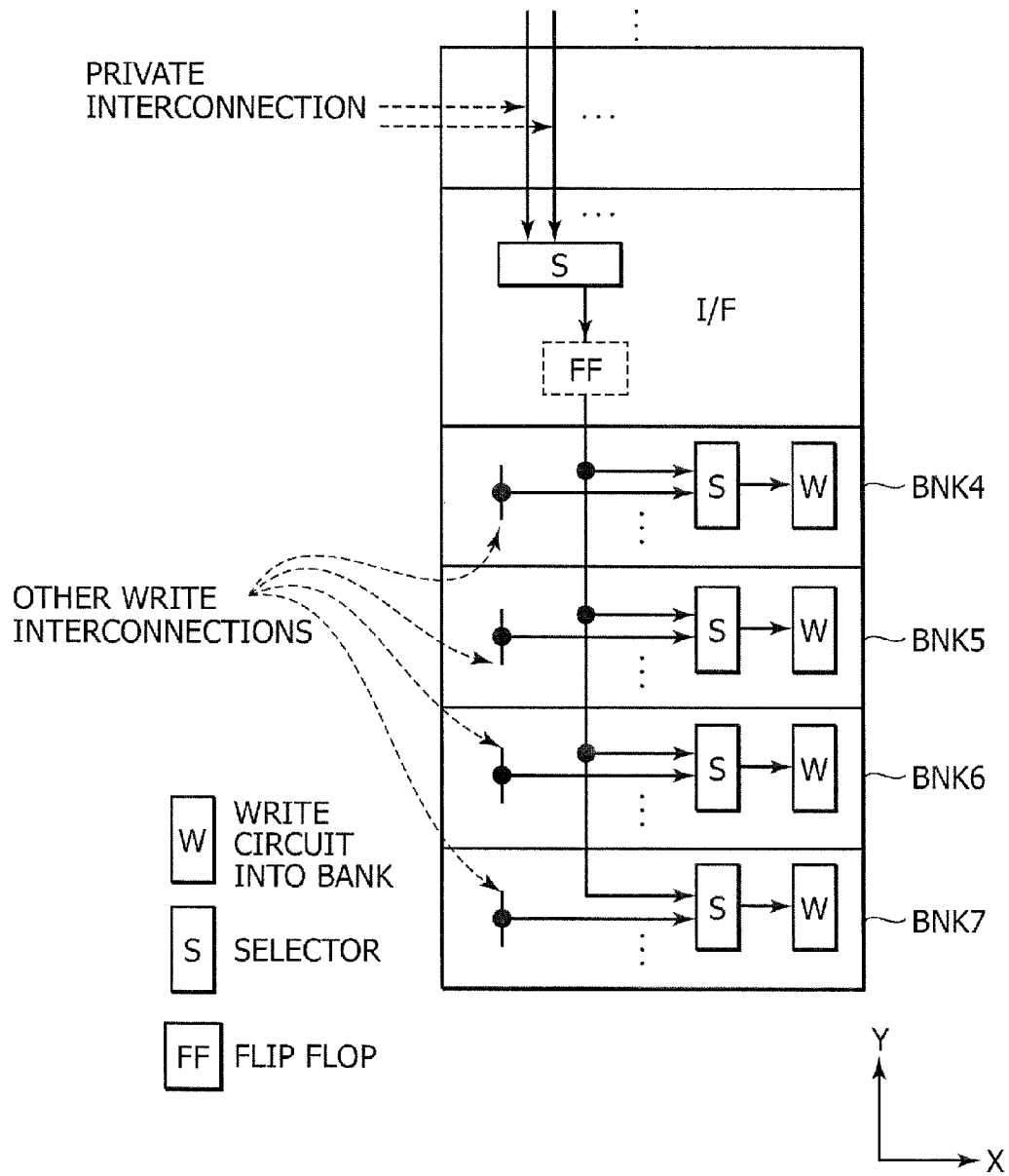
FIG. 37 is a diagram for describing the write data bus interconnection in the vertical direction (Y direction, second direction), and also is a diagram showing an example in which according to an interconnection resource situation, a plurality of private interconnections before the memory interface I/F are selected and formed by the public interconnections.

When crossing over the memory interface I/F, as shown in FIG. 37, according to a situation of the interconnection resources, a plurality of private interconnections before the memory interface I/F are selected by the selectors S and formed by the public interconnections.

The private interconnections are those dedicated to the processing module PM, and thus, when the number of processing modules PM increases, an enormous amount of interconnection resources may become necessary when the connections are made all privately. In this case, the common connection mode is used for the interconnections other than that immediately beneath the processing modules.

<Horizontal Direction (X direction, Second Direction) Read Data Bus Interconnections>

Figure 38:
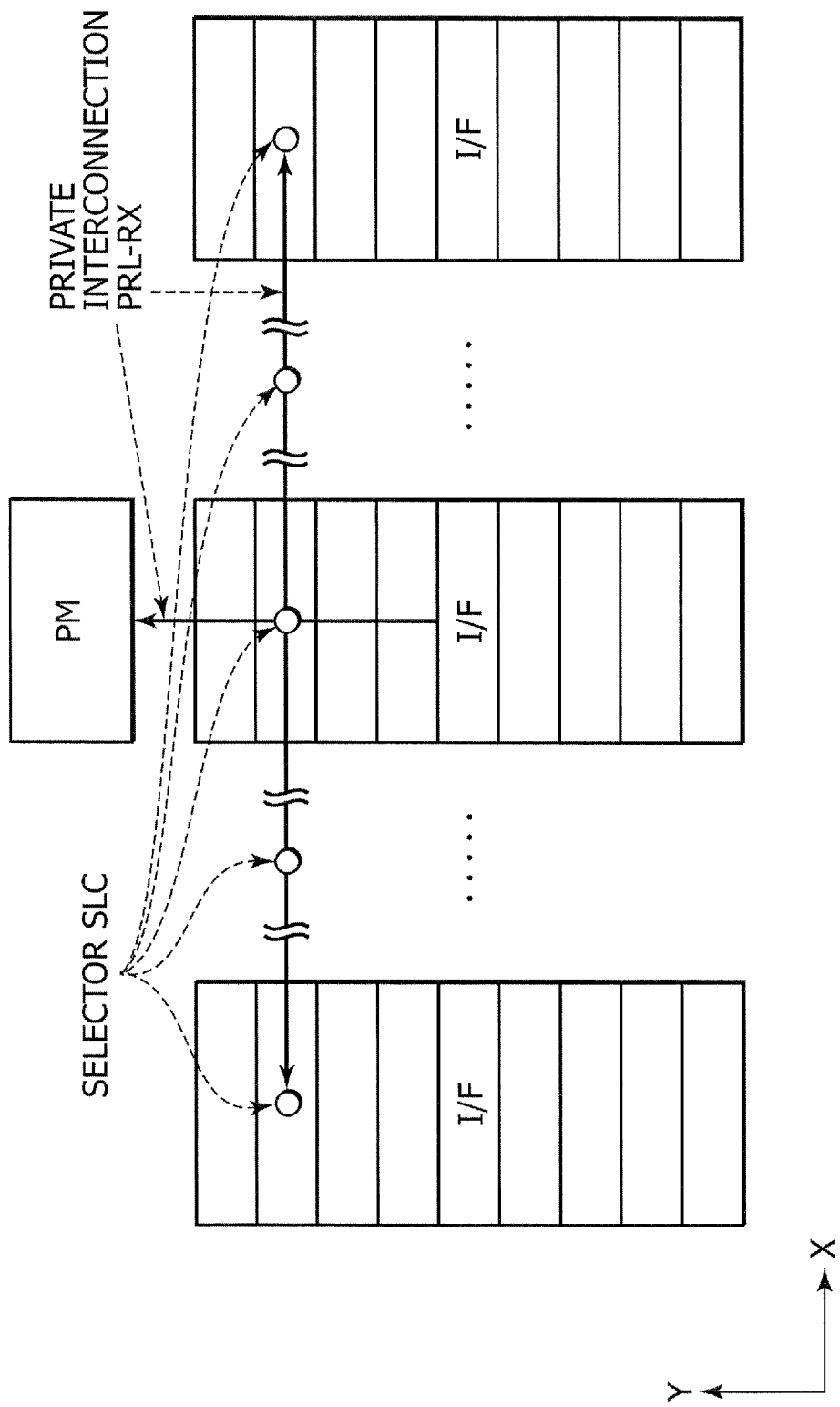
FIG. 38 is a diagram for describing a read data bus interconnection in the horizontal direction (X direction, second direction)

To the memory interfaces I/F immediately beneath the processing modules PM, the read data buses are connected by the private interconnections PRL-RX, as shown in FIG. 38. The read data bus interconnections in the horizontal direction (X direction) are private, and the read data bus interconnections are not connected by P2P for each access destination, but are common.

As shown in FIG. 38, connection portions with the vertical direction (Y direction, second direction) interconnections are configured by selectors SLC which select the data transferred from the horizontal direction (X direction) and that transferred from the vertical direction (Y direction).

<Vertical Direction (Y direction, First Direction) Read Data Bus Interconnections>

Figure 39:
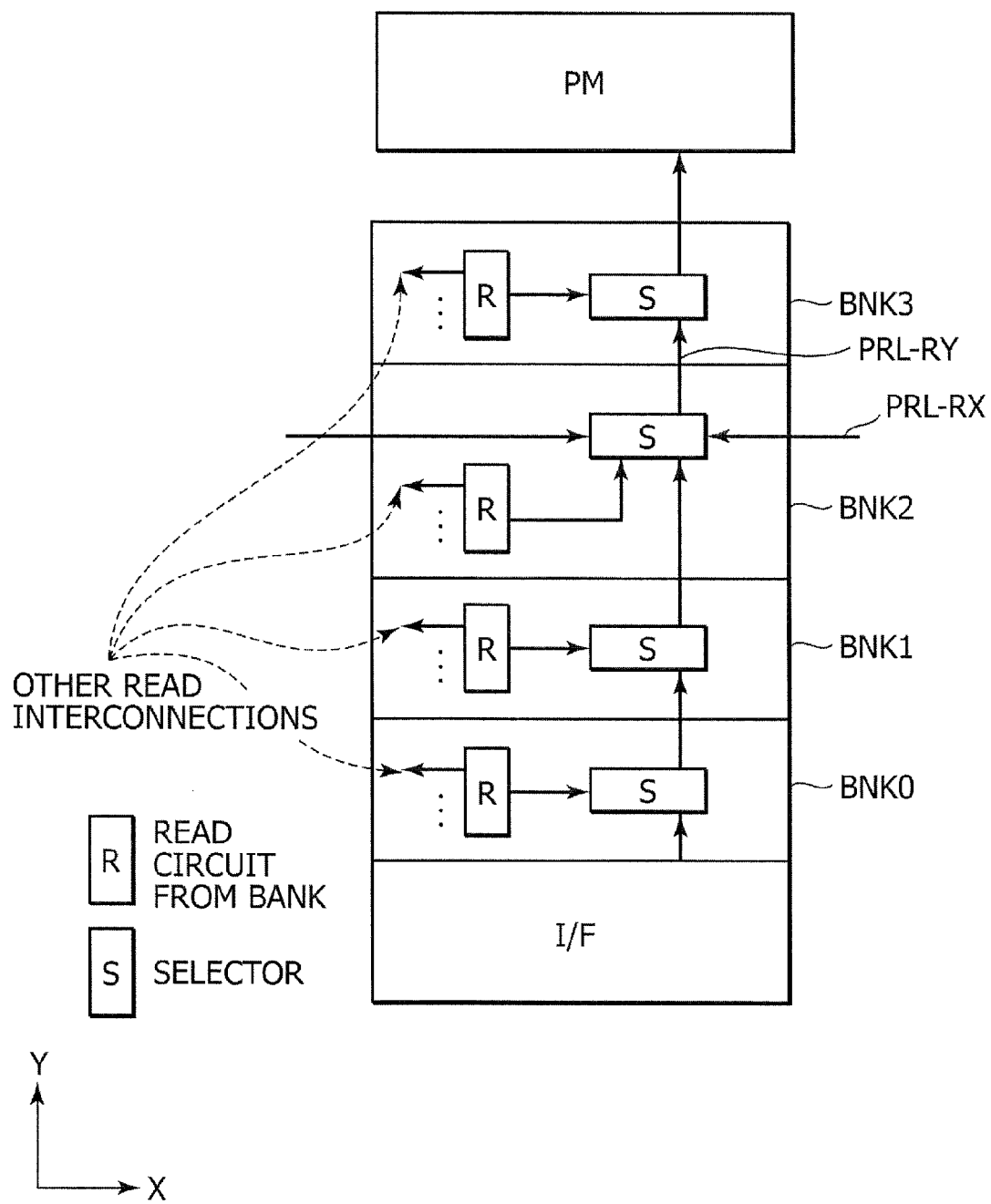
FIG. 39 is a diagram for describing a read data bus interconnection in the vertical direction (Y direction, second direction), and also is a diagram for describing the read data bus in the vertical direction (Y direction, first direction) from a processing module to a memory interface I/F immediately therebeneath.

The vertical direction (Y direction) read data buses from the processing modules PM to the memory interfaces I/F immediately therebeneath are configured to be connected by the private buses PRL-RY, as shown in FIG. 39.

The private read data buses PRL-RY are connected with the read data buses PRL-RX wired in the horizontal direction (X direction) by the selectors S (second bank BNK2 of the banks from top in FIG. 39).

Figure 40:
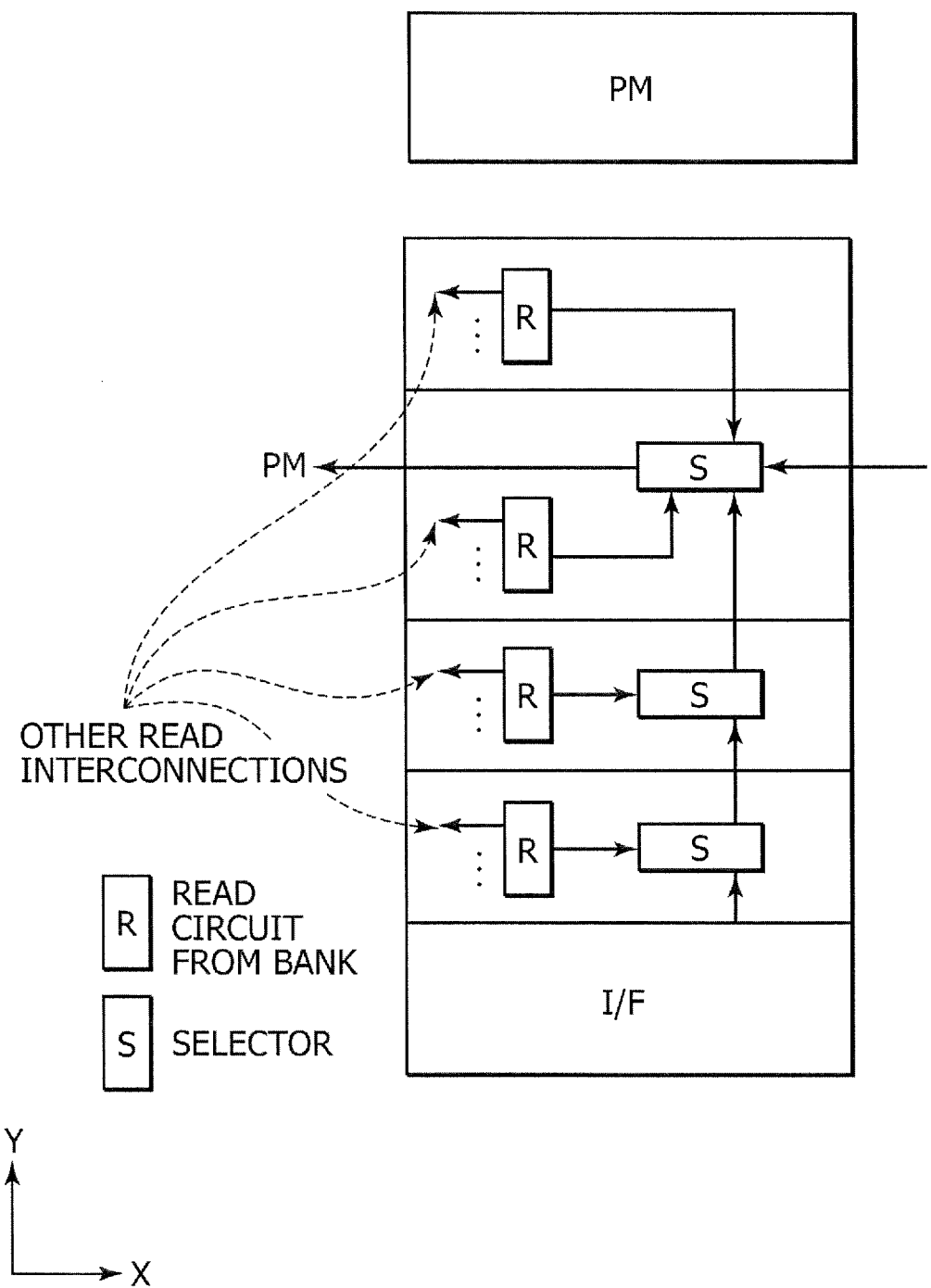
FIG. 40 is a diagram for describing the read data bus interconnection in the vertical direction (Y direction, second direction), and also is a diagram for describing the read data buses in the vertical direction (Y direction, first direction) other than that immediately therebeneath from a processing module.

The private vertical interconnections other than that immediately beneath the processing modules PM are, as shown in FIG. 40, connected with the read data buses PRL-RX through which the data is transferred from the horizontal direction (X direction) by the selectors S. The read data is selectively transferred therefrom to a subsequent horizontal direction (X direction).

The read data buses in the vertical direction (Y direction) crossing over the memory interfaces I/F are not to be connected with the horizontal direction (X direction) interconnections.

Figure 41:
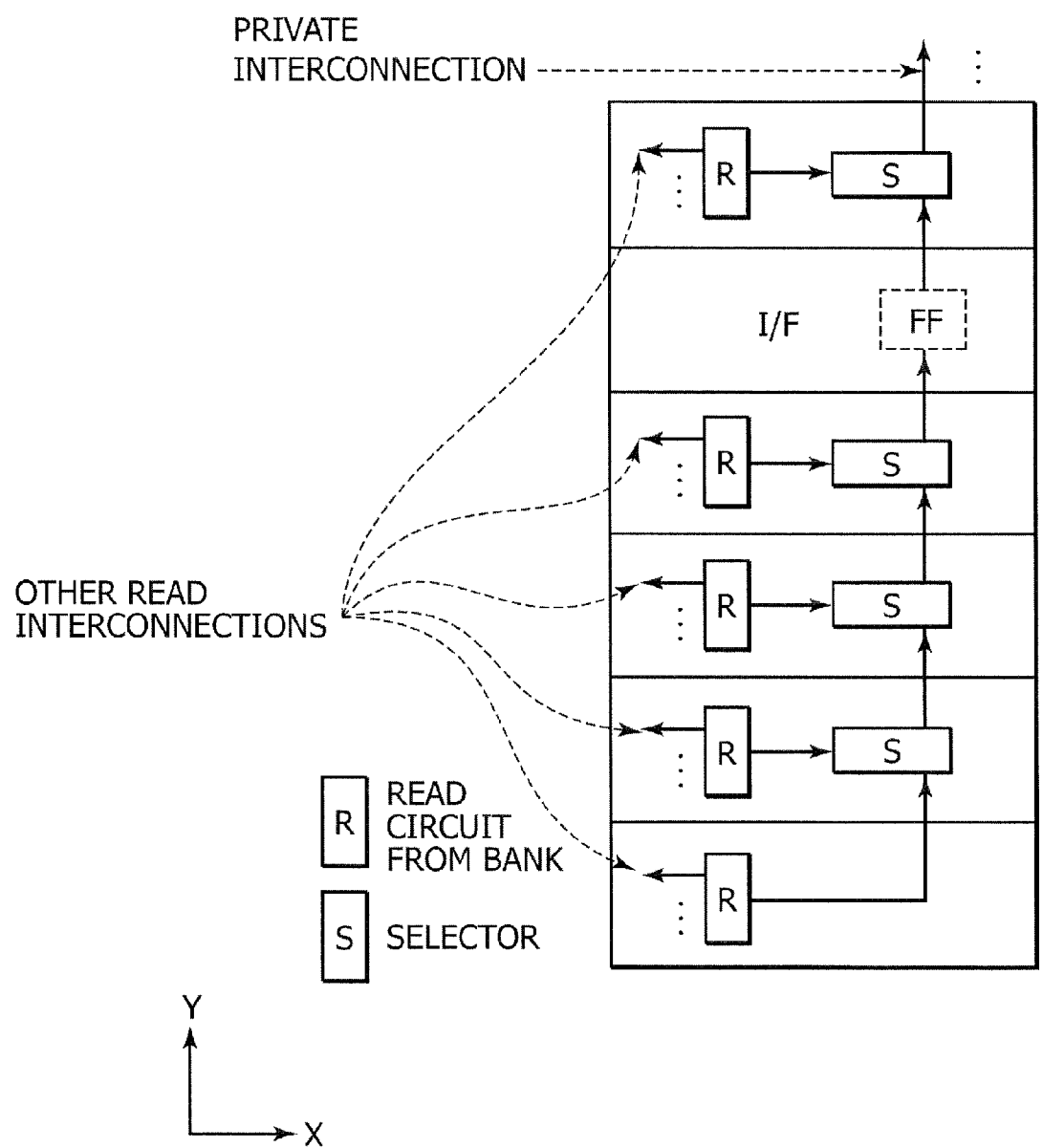
FIG. 41 is a diagram showing an example in which depending on a delay level, a flip-flop FF is provided in the memory interface I/F.

As shown in FIG. 41, depending on a delay level, the read data is once latched by the flip-flop FF in the memory interface I/F, and thereafter, the resultant data is transferred.

Figure 42:
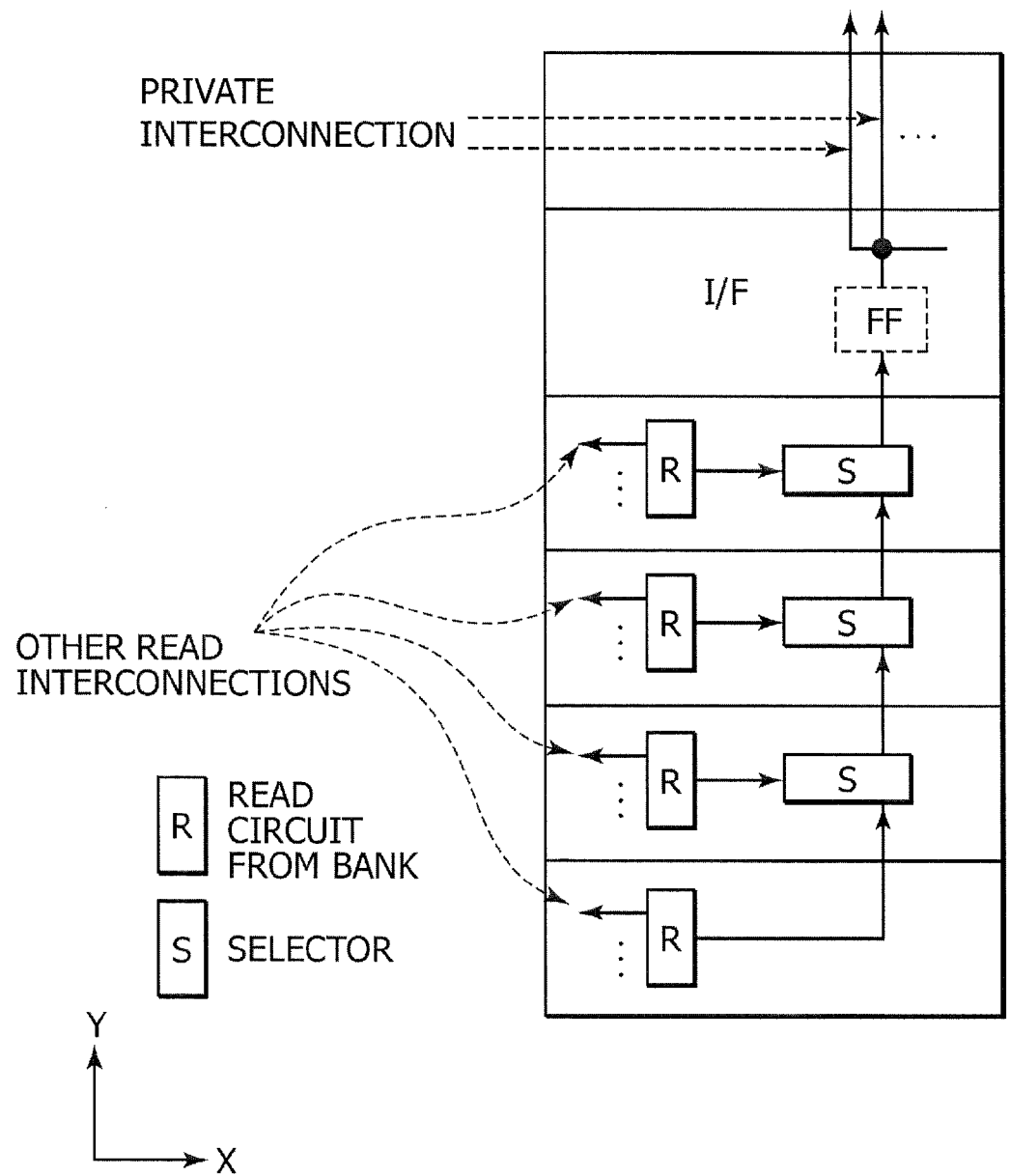
FIG. 42 is a diagram for describing the read data bus interconnection in the vertical direction (Y direction, second direction), and also is a diagram showing an example of dividing into a plurality of private interconnections before the memory interface I/F according to an interconnection resource situation, and forming by the public interconnections.

When crossing over the memory interface I/F, as shown in FIG. 42, according to a situation of the interconnection resources, the read data buses are divided into a plurality of private interconnections before the memory interface I/F and formed by the public interconnections.

The private interconnections are those dedicated to the processing module PM, and thus, when the number of processing modules PM increases, an enormous amount of interconnection resources may become necessary when the connection is made all privately. In this case, the common connection mode is used for the interconnections other than that immediately beneath the processing modules.

<Vertical Direction (Y direction, First Direction) Data Bus Interconnections (Common)>

When the interconnection resources of the data buses in the vertical direction (Y direction) are limited, it may reduce an amount of interconnections by the common interconnections.

Figure 43:
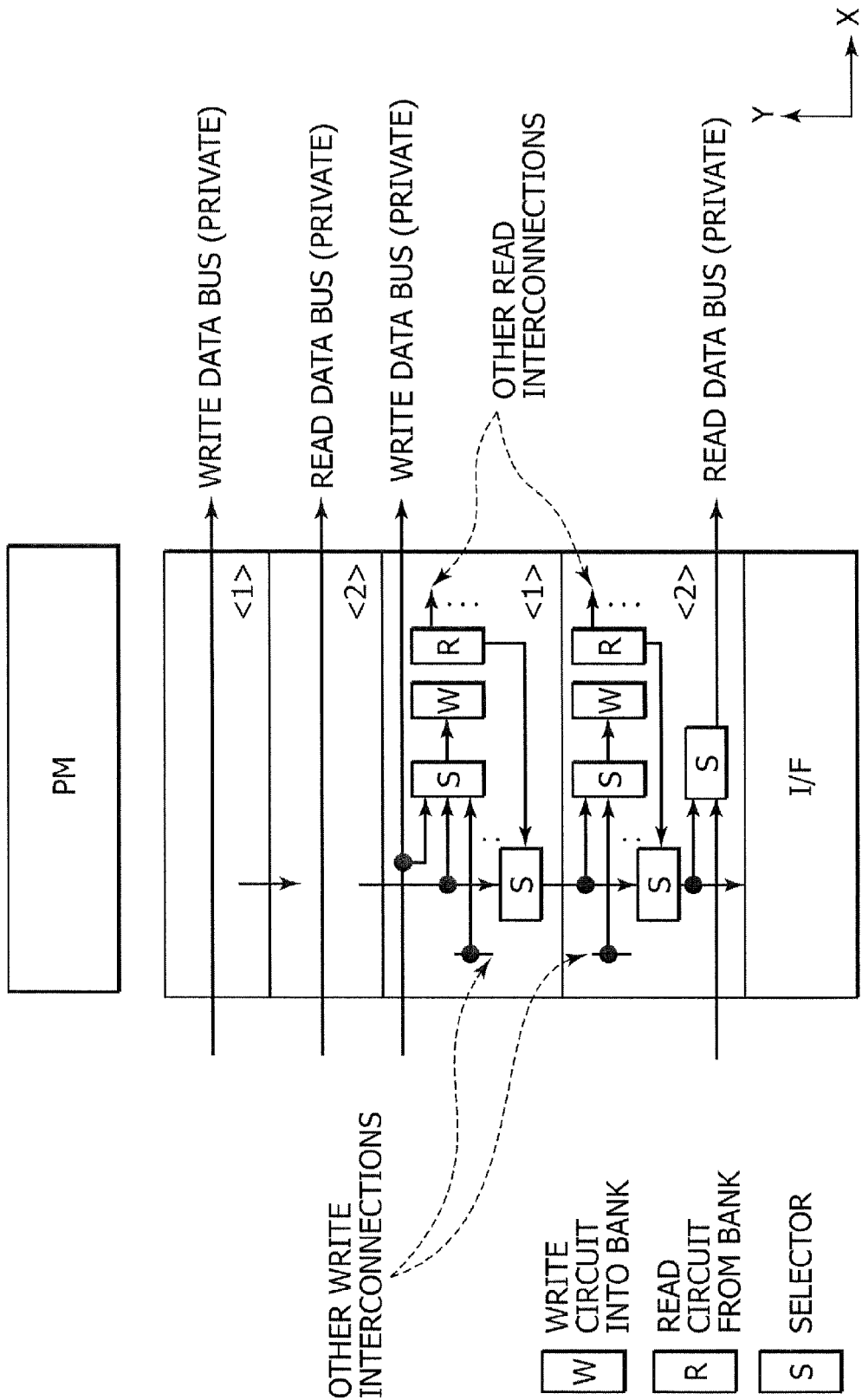
FIG. 43 is a diagram for describing a data bus interconnection (common) in an up direction in the vertical direction (Y direction, first direction)
Figure 44:
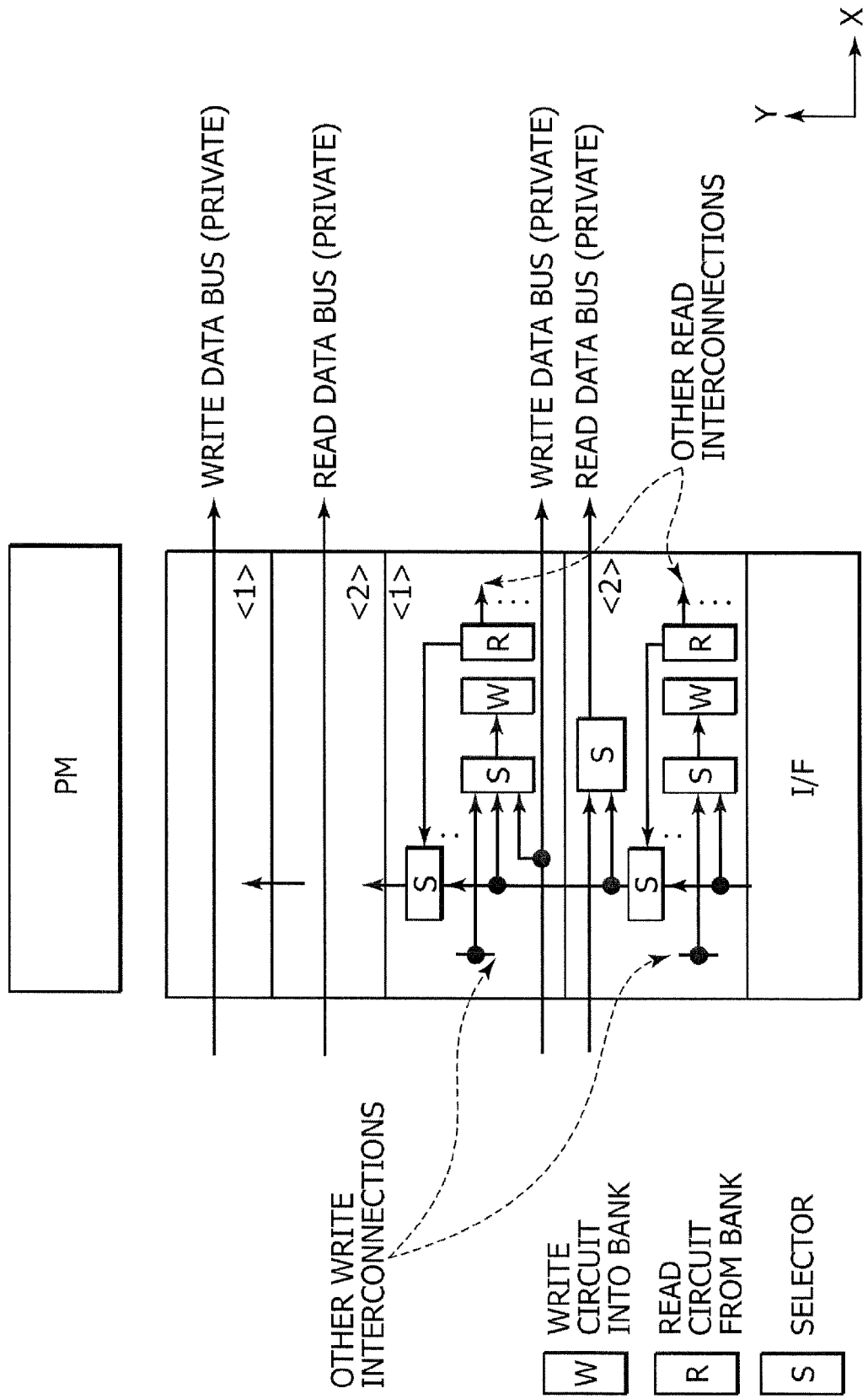
FIG. 44 is a diagram for describing a data bus interconnection (common) in a down direction in the vertical direction (Y direction, first direction)

The common interconnections are not differentiated between read interconnections and write interconnections, but as shown in FIG. 43 and FIG. 44, the interconnections are formed in directions in which the data flows. For the sake of convenience, a direction toward the memory interface I/F is called an "up" while a direction away from the memory interface I/F is called a "down".

When the write data buses are wired in the horizontal direction (X direction), the common interconnections adopt a configuration shown in <1> of FIG. 43 and that shown in <1> of FIG. 44.

When the read data buses are wired in the horizontal direction (X direction), the common interconnections adopt a configuration shown in <2> of FIG. 43 and that shown in <2> of FIG. 44.

<I/F Configuration>

The memory interface I/F performs a process for arbitrating a command sent from the respective processing modules PM and issuing the command when resources of the banks in the macro are available.

Figure 45:
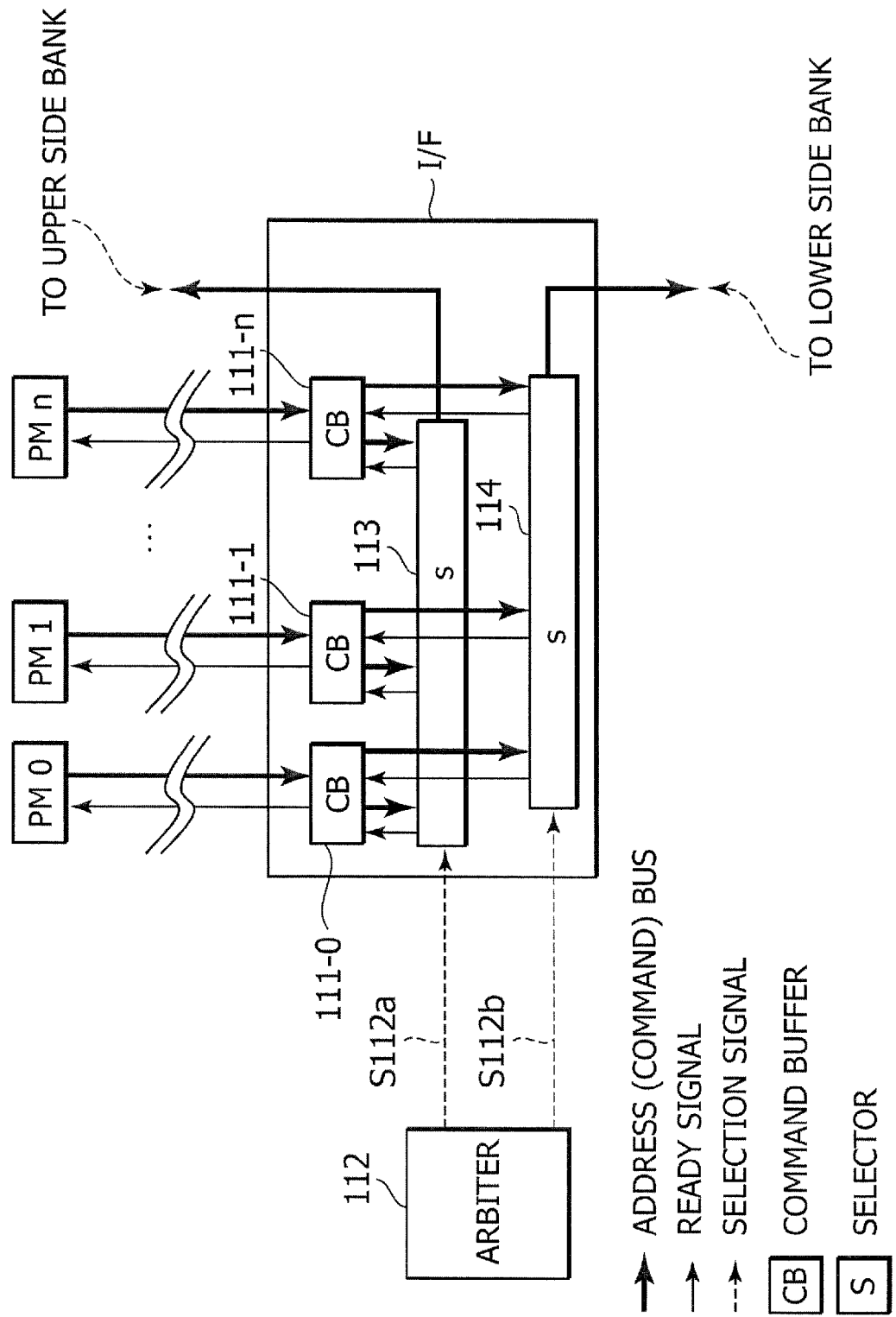
FIG. 45 is a diagram showing a basic configuration of a memory interface I/F according to an embodiment of the present invention.

As a basic configuration, as shown in FIG. 45, there are provided: at least each one of command buffers (hereinafter, abbreviated as "CB") 111-0 to 111-n corresponding to the respective processing modules PM; an arbiter 112; and selectors (S) 113 and 114.

The arbiter 112 selects an issuable command, out of commands in the CB 111-0 to CB 111-n, by selection signals S112a and S112b, and issues the selected command. The arbiter 112 is capable of simultaneously issuing commands to the banks of the memory system on an upper side (first side) in the Y direction (first direction) from the center, i.e., the memory interface I/F, and those of the memory system on a lower side (second side) therefrom.

Figure 46:
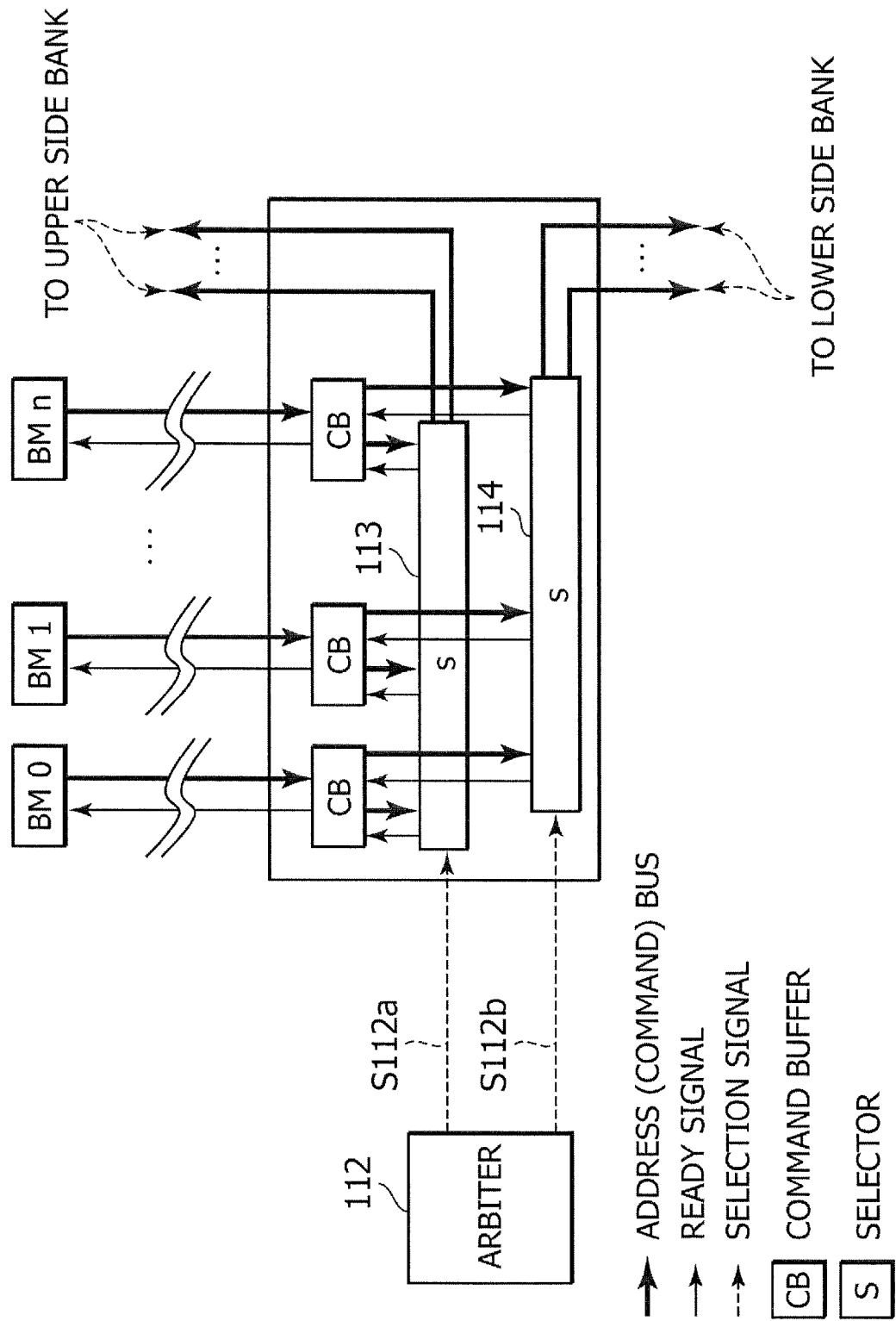
FIG. 46 is a diagram showing another configuration example of the memory interface I/F according to an embodiment of the present invention.

As shown in FIG. 46, the interconnection resources permitting, a plurality of command interconnections may be wired (laid) to each of the upper side and lower side.

Figure 47:
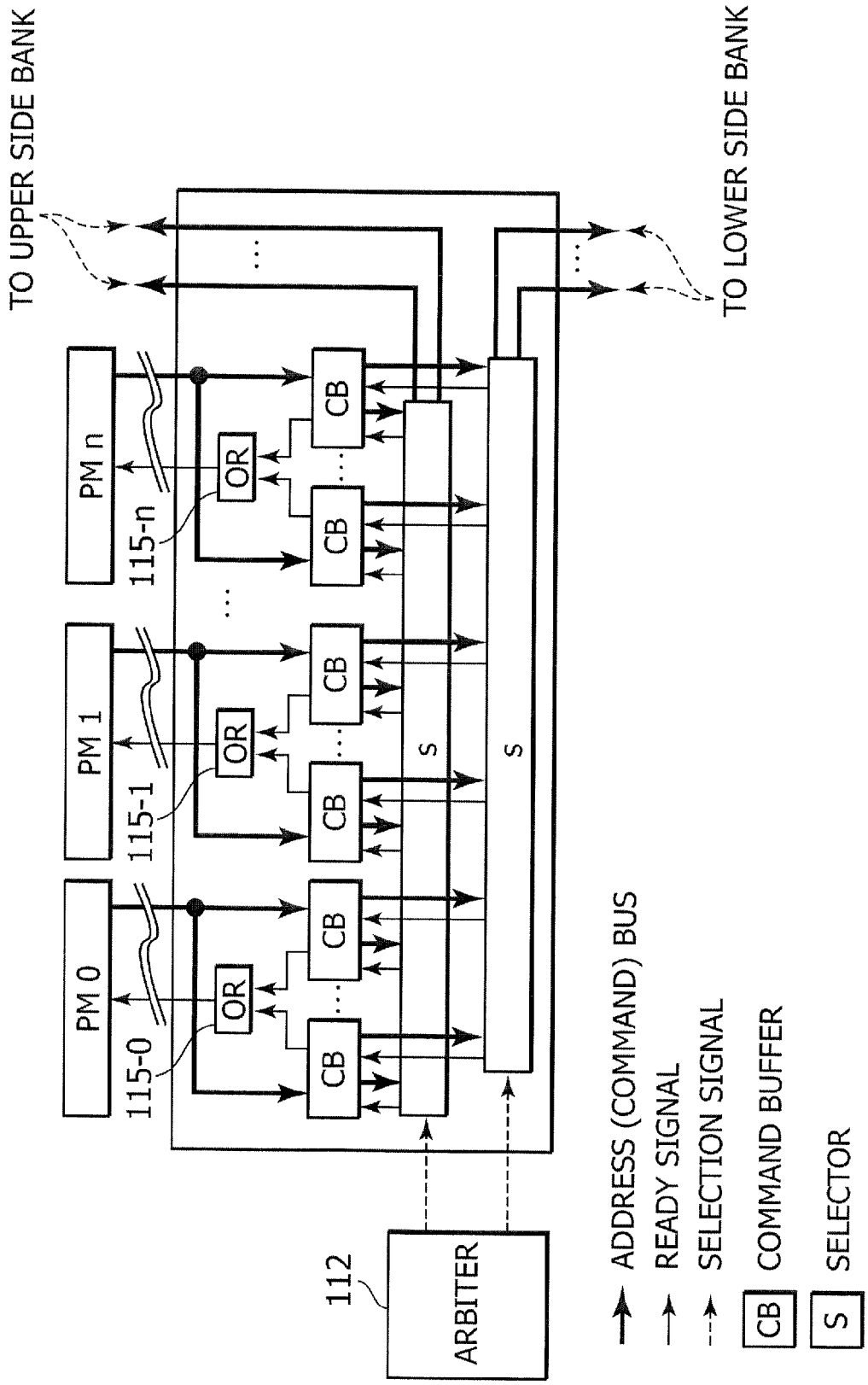
FIG. 47 is a diagram showing still another configuration example of the memory interface I/F according to an embodiment of the present invention.

Further, the area permitting, as shown in FIG. 47, it may also be possible to provide a plurality of CBs. In this case, OR gates 115-0 to 115-n are provided in a transfer route to the upper side processing modules PM, for example.

<Vertical Direction (Y direction, First Direction) Address Bus Interconnections>

Figure 48:
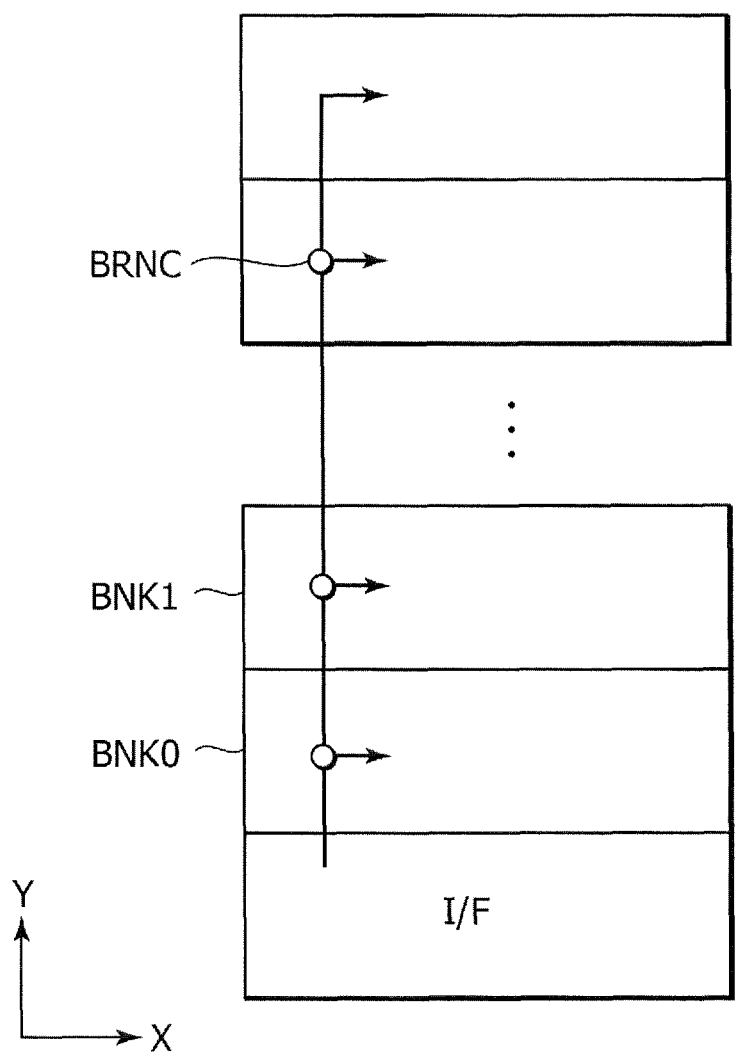
FIG. 48 is a diagram for describing a basic command address bus interconnection in the vertical direction (Y direction, first direction)

As shown in FIG. 48, basically, an address (command) issued from the memory interface I/F is transferred in the vertical direction (Y direction), and branched at the branch BRNC according to the access-destination bank.

Figure 49:
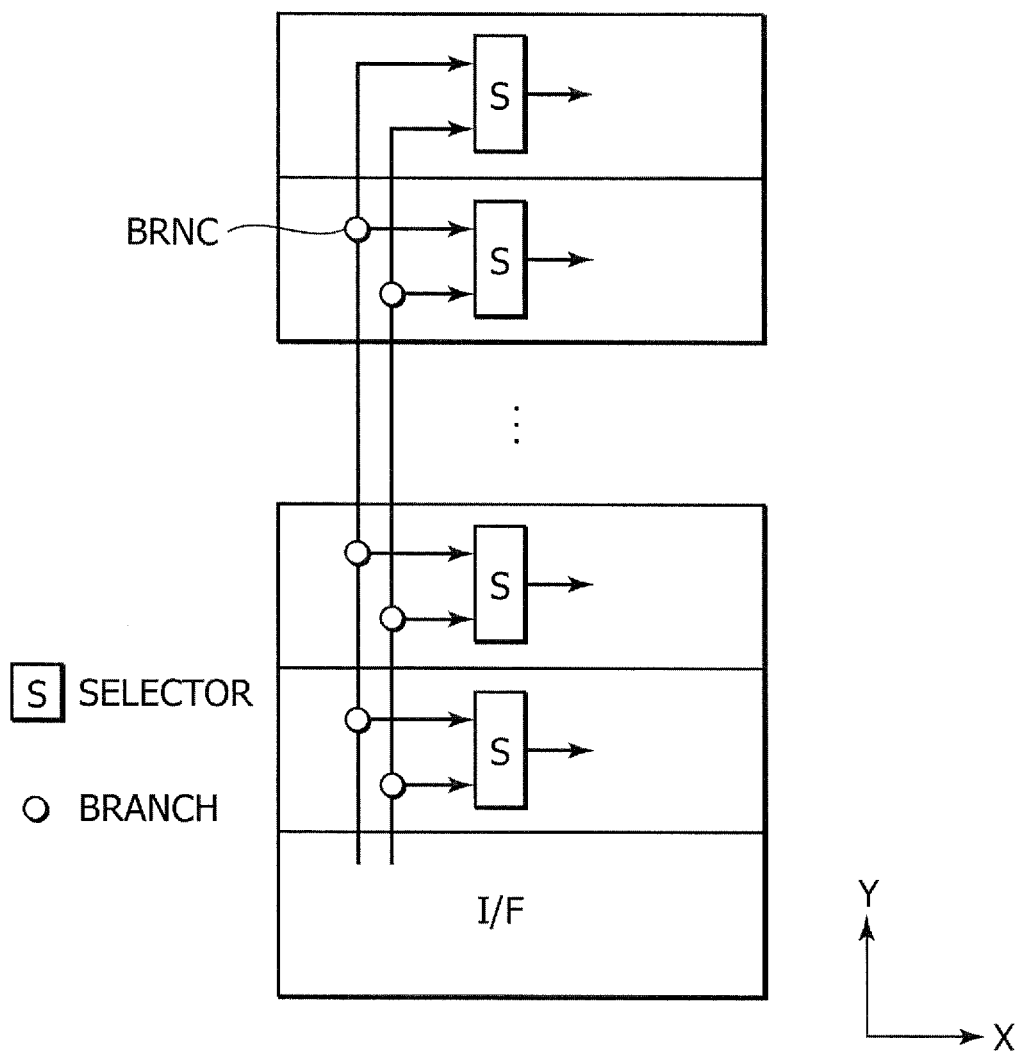
FIG. 49 is a diagram for describing a command address bus interconnection of a plural-issuance configuration in the vertical direction (Y direction, first direction)

As shown in FIG. 46 or FIG. 47, when the interconnection resources are sufficient enough to lay a plurality of address interconnections, the command may be finally inputted to the bank through the selector (S), as shown in FIG. 49.

FIG. 50 is a diagram collectively showing the basic configuration of the integrated device and the characteristics of the connecting interconnections, according to embodiments of the present invention described above.

In FIG. 50, CMD indicates a command system interconnection; WDT indicates a write data system interconnection; and RDT indicates a read data system interconnection, respectively.

The basic configuration of the integrated device and characteristics (1) to (9) of the connecting interconnections according to embodiments of the present invention are as follows:

(1): The X-direction (horizontal) interconnections of the data are private interconnections to avoid a conflict with other processing modules PM in the horizontal direction;

(2): When there is a target before the memory interface I/F, direct access is made. As a result, the latency may be shortened, which may result in a reduction of a resource conflict;

(3): Whether to make the Y direction (vertical) interconnections of the data private or bundled is determined by the interconnection resources. As a result, a higher interconnection-resource efficiency may be achieved;

(4): The resources permitting, a command issuance from the memory interface I/F is plural. As a result, improvement on a throughput may be implemented;

(5): The commands in both of the Y direction (vertical direction) and the X direction (horizontal direction) are issued through the private interconnections. As a result, a conflict with the other processing modules PM may be avoided;

(6): The Y-(vertical) direction interconnections immediately beneath the processing module PM of the data are the private interconnections. As a result, a conflict with the other processing modules PM may be avoided;

(7): The memory interface I/F is placed at a center in the Y direction (first direction). As a result, the interconnection resources may be effectively utilized twice as much;

(8): The data interconnections in the X-(horizontal) direction may be used for a horizontal transfer mode. Thus, improvement on a memory-to-memory transfer performance may be implemented; and (9): The processing module PM may be imparted with a plurality of ports. Thus, the improvement on a throughput may be implemented.

As described above, according to embodiments of the present invention, the data processing device 2 and the memory macros 3-0 to 3-3 are laid out so that the memory address and the power consumption have a correlation, and the data having a large number of accesses is placed in (near) an area which consumes a power less than a power consumed by an area for the data having a small number of accesses. Thus, the reduction in power consumption may be achieved.

That is, according to embodiments of the present invention, in the integrated device in which the distance (data transmission distance) to one arbitrary data processing device such as a processor is previously determined and various predetermined distances exist corresponding to each of the physical addresses, a logical address accessed by a subject application is allocated to a physical address of which the predetermined distance is as short as possible according to the number of accesses. Thus, a power saving may be achieved.

As a result, it may take into consideration even a physical location within a memory hierarchy, and also to take into consideration even a physical power load of an individual access, thereby achieving a detailed power optimization.

According to embodiments of the present invention, in the memory system embedded therein with a plurality of memory banks, the bus systems are constructed on the memory macros to enable execution of a higher-speed (higher throughput) memory access than a shared memory system using usual X-bars, etc.

When the interconnections of the bus system configured as in FIG. 20, etc., are utilized to construct buses between the memory banks, a high-speed memory-to-memory data transfer may be achieved with nearly no increase of the circuit scale.

The interconnections are wired on the memory macros, and thus, a direct access may be possible when the interconnection passes over the access-destination bank. Therefore, a low latency may be executed.

A system which changes a method of wiring interconnections by a tradeoff between the required performance and wireability, i.e., a system according to the number of processing modules PM, the interconnection resources, and the required performance, may be constructed.

When one processing module PM is imparted with a plurality of ports with the memory system, it may become possible to achieve a system in which a higher performance is constructed without consuming the resources (areas).

Although when the number of processing modules PM increases, the number of interconnections also increases. However, it may construct a system which changes the bus configuration according to a bus width.

According to embodiments of the present invention, it may take into consideration even a physical location within a memory hierarchy, and to take into consideration even a physical power load of an individual access, thereby achieving a detailed power optimization.

It should be noted that embodiments of the present invention are not restricted to those described above but can be variously modified by those skilled in the art without departing from the scope of the invention.

The methods described above in detail may be configured to be formed as a program according to the above-described procedure so as to be executed by a computer such as a CPU.

Further, such a program may be configured to be recorded in a recording medium, such as a semiconductor memory, a magnetic disk, an optical disk, a floppy (registered trademark) disk, etc., and to be accessed by a computer which is set up with this recording medium, whereby the above-described program is executed.

What is claimed is:

1. A method of assigning physical memory addresses to logical memory addresses, the method comprising:

assigning the physical memory addresses to the logical memory addresses based on power consumption information regarding power consumed by accessing the physical memory addresses and access information regarding accesses of the logical memory addresses, wherein the power consumption information regarding the power consumed by accessing the physical memory addresses comprises information relating to power consumption of one or more interconnections during accesses of memory areas corresponding to the physical memory addresses.

2. The method of claim 1, further comprising obtaining the access information, wherein obtaining the access information comprises estimating a first number of accesses of a first logical memory address, and estimating the first number of accesses of the first logical memory address comprises compiling a program and/or profiling an execution of the program on one or more processing devices.

3. The method of claim 2, wherein estimating the first number of accesses of the first logical memory address further comprises estimating a number of iterations of a loop within the program and/or a direction of a branch instruction.

4. The method of claim 1, further comprising obtaining the access information, wherein obtaining the access information comprises counting a first number of accesses of a first logical memory address during execution of a program on one or more processing devices.

5. The method of claim 1, wherein the accesses of the memory areas comprise data transfers between the memory areas and one or more processing devices.

6. The method of claim 5, wherein the information relating to the power consumption of the one or more interconnections comprises information relating to a length, width, and/or material of the one or more interconnections.

7. The method of claim 1, wherein assigning the physical memory addresses to the logical memory addresses based on the power consumption information and the access information comprises assigning a first physical memory address with a first power consumption lower than a second power consumption of a second physical memory address to a first logical memory address with a first number of accesses higher than a second number of accesses of a second logical memory address.

8. The method of claim 5, wherein the one or more processing devices comprise a first processing device and a second processing device, assigning the physical memory addresses to the logical memory addresses based on the power consumption information and the access information comprises assigning a first plurality of the physical memory addresses to a first plurality of the logical memory addresses that corresponds to local parameters before assigning a second plurality of the physical memory addresses to a second plurality of the logical memory addresses that corresponds to shared parameters, the local parameters comprise a first local parameter that is local to the first processing device or to the second processing device, and the shared parameters comprise a first shared parameter that is accessible to both the first processing device and the second processing device.

9. The method of claim 1, wherein assigning the physical memory addresses to the logical memory addresses based on the power consumption information and the access information comprises assigning a first plurality of the logical memory addresses corresponding to a stack area to a first plurality of the physical memory addresses having lowest power consumption among the physical memory addresses.

10. The method of claim 1, wherein the power consumption information regarding the power consumed by accessing the physical memory addresses comprises first and second power dissipation information associated with respective first and second physical memory addresses, the first and second physical memory addresses corresponding to memory areas within a same level of a memory hierarchy, the first power dissipation information differing from the second power dissipation information.

11. An integrated circuit device comprising:

a processing device configured to assign physical memory addresses to logical memory addresses based on power consumption information regarding power consumed by accessing the physical memory addresses and access information regarding accesses of the logical memory addresses, wherein the power consumption information regarding the power consumed by accessing the physical memory addresses comprises information relating to power consumption of one or more interconnections during accesses of memory areas corresponding to the physical memory addresses.

12. The integrated circuit device of claim 11, further comprising the memory areas corresponding to the physical memory addresses, wherein the processing device comprises a virtual address controlling unit.

13. The integrated circuit device of claim 12, wherein:

the virtual address controlling unit is configured to: count accesses of the logical memory addresses during execution of a program, and assign the physical memory addresses to the logical memory addresses during the execution of the program, and wherein the execution of the program occurs on the processing device or on a second processing device.

14. The integrated circuit device of claim 12, wherein the information relating to the power consumption of the one or more interconnections comprises information relating to a length, width, and/or material of the one or more interconnections.

15. The integrated circuit device of claim 12, further comprising a correlation table that correlates the physical memory addresses and the power consumption information, wherein the virtual address controlling unit is configured to obtain the power consumption information by accessing the correlation table.

16. A computer-readable medium containing a program which, when executed, causes a computer to perform a method of assigning physical memory addresses to logical memory addresses, the method comprising:

assigning the physical memory addresses to the logical memory addresses based on power consumption information regarding power consumed by accessing the physical memory addresses and access information regarding accesses of the logical memory addresses, wherein the power consumption information regarding the power consumed by accessing the physical memory addresses comprises information relating to power consumption of one or more interconnections during accesses of memory areas corresponding to the physical memory addresses.

17. The computer-readable medium of claim 16, wherein:
the information relating to the power consumption of the one or more interconnections comprises information relating to a length, width, and/or material of the one or more interconnections.

\* \* \* \* \*